US011689247B2

(12) United States Patent
Scherer et al.

(10) Patent No.: US 11,689,247 B2
(45) Date of Patent: Jun. 27, 2023

(54) PATCH CORD INCLUDING WIRELESS COMPONENTS

(71) Applicant: MERTEK INDUSTRIES, LLC, Austin, TX (US)

(72) Inventors: Christopher B. Scherer, Austin, TX (US); Jon Sholtis, Austin, TX (US)

(73) Assignee: MERTEK INDUSTRIES, LLC, Austin, TX (US)

( * ) Notice: Subject to any disclaimer, the term of this patent is extended or adjusted under 35 U.S.C. 154(b) by 13 days.

(21) Appl. No.: 16/743,820

(22) Filed: Jan. 15, 2020

(65) Prior Publication Data

US 2020/0228166 A1 Jul. 16, 2020
US 2021/0218438 A9 Jul. 15, 2021

Related U.S. Application Data

(60) Provisional application No. 62/845,595, filed on May 9, 2019, provisional application No. 62/793,110, filed on Jan. 16, 2019.

(51) Int. Cl.
*H04B 5/00* (2006.01)
*H01R 13/66* (2006.01)
(Continued)

(52) U.S. Cl.
CPC ....... *H04B 5/0037* (2013.01); *H01R 13/6675* (2013.01); *H01R 13/6691* (2013.01);
(Continued)

(58) Field of Classification Search
CPC ... H02J 50/80; H02J 50/10; H02J 7/02; H04B 5/0037; H04B 1/04; H04B 5/0075; H01R 13/6675; H01R 13/6691; H01R 13/70
See application file for complete search history.

(56) References Cited

U.S. PATENT DOCUMENTS 3,960,428 A 6/1976 Naus et al.
4,761,720 A 8/1988 Solow
(Continued)

FOREIGN PATENT DOCUMENTS

CN 1331505 1/2002
CN 1738108 2/2006
(Continued)

OTHER PUBLICATIONS

International Search Report and Written Opinion dated Aug. 27, 2012 for PCT/US2012/039126.
(Continued)

*Primary Examiner* — Nhan T Le
(74) *Attorney, Agent, or Firm* — Norton Rose Fulbright US LLP

(57) ABSTRACT

Disclosed are network cable connectors with components such as wireless transceivers, wireless power receivers, displays, and printed circuit with controllers. The disclosed network cable connector may be wirelessly coupled to an external power source. The printed circuit of the cable connector may receive power for the wireless transceiver and/or the display from the external power source. The printed circuit of the cable connector may communicate information about the network cable and/or devices connected thereto via the wireless transceiver to an external device, output the information via the display, or a combination thereof.

19 Claims, 34 Drawing Sheets

(51) Int. Cl.
  *H01R 13/717* (2006.01)
  *H02J 50/80* (2016.01)
  *H02J 50/10* (2016.01)
  *H02J 7/02* (2016.01)
  *H01R 13/70* (2006.01)

(52) U.S. Cl.
  CPC ......... *H01R 13/70* (2013.01); *H01R 13/7175* (2013.01); *H02J 7/02* (2013.01); *H02J 50/10* (2016.02); *H02J 50/80* (2016.02)

(56) References Cited

U.S. PATENT DOCUMENTS

| | | |
|---|---|---|
| 4,762,388 A | 8/1988 | Tanaka et al. |
| 4,764,129 A | 8/1988 | Jones et al. |
| 4,837,488 A | 6/1989 | Donahue |
| 4,840,451 A | 6/1989 | Sampson et al. |
| D323,143 S | 1/1992 | Ohkura et al. |
| 5,159,316 A | 10/1992 | Lazzara |
| 5,212,752 A | 5/1993 | Stephenson et al. |
| 5,317,663 A | 5/1994 | Beard et al. |
| 5,348,487 A | 9/1994 | Marazzi et al. |
| 5,444,806 A | 8/1995 | deMarchi et al. |
| 5,481,634 A | 1/1996 | Anderson et al. |
| 5,506,922 A | 4/1996 | Grois et al. |
| 5,570,445 A | 10/1996 | Chou et al. |
| 5,588,079 A | 12/1996 | Tanabe et al. |
| 5,666,453 A | 9/1997 | Dannenmann |
| 5,684,903 A | 11/1997 | Kyomasu et al. |
| 5,687,268 A | 11/1997 | Stephenson et al. |
| 5,741,152 A | 4/1998 | Boutros |
| 5,764,043 A | 6/1998 | Czosnowski et al. |
| 5,885,111 A | 3/1999 | Yu |
| 5,888,100 A | 3/1999 | Bofill et al. |
| 5,937,130 A | 8/1999 | Amberg et al. |
| 5,956,444 A | 9/1999 | Duda et al. |
| 5,971,626 A | 10/1999 | Knodell et al. |
| 6,002,331 A | 12/1999 | Laor |
| 6,041,155 A | 3/2000 | Anderson et al. |
| 6,080,007 A | 6/2000 | Dupuis et al. |
| 6,099,345 A | 8/2000 | Milner et al. |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,235 B1 | 5/2001 | Shavit et al. |
| 6,244,908 B1 | 6/2001 | Hammond et al. |
| 6,247,849 B1 | 6/2001 | Liu |
| 6,280,232 B1 | 8/2001 | Beecher et al. |
| 6,394,853 B1 | 5/2002 | Hammond et al. |
| 6,454,611 B1 | 9/2002 | Francis |
| 6,461,054 B1 | 10/2002 | Iwase |
| 6,478,472 B1 | 11/2002 | Anderson et al. |
| 6,524,128 B2 | 2/2003 | Marowsky et al. |
| 6,532,328 B1 | 3/2003 | Kline |
| 6,551,117 B2 | 4/2003 | Poplawski et al. |
| 6,558,204 B1 | 5/2003 | Weatherley |
| 6,568,953 B1 | 5/2003 | AbuGhazaleh et al. |
| 6,577,243 B1 | 6/2003 | Dannenmann et al. |
| 6,579,014 B2 | 6/2003 | Melton et al. |
| 6,626,697 B1 | 9/2003 | Martin |
| 6,648,520 B2 | 11/2003 | McDonald et al. |
| 6,710,254 B2 | 3/2004 | Yueh |
| 6,790,096 B2 | 9/2004 | Lin |
| 6,798,183 B2 | 9/2004 | Bohley et al. |
| 6,808,116 B1 | 10/2004 | Eslambolchi et al. |
| 6,811,445 B2 | 11/2004 | Caveney et al. |
| 6,854,894 B1 | 2/2005 | Yunker et al. |
| 6,975,242 B2 | 12/2005 | Dannenmann et al. |
| 7,021,808 B2 | 4/2006 | Currie et al. |
| 7,049,937 B1 | 5/2006 | Zweig et al. |
| 7,080,945 B2 | 7/2006 | Colombo et al. |
| 7,081,808 B2 | 7/2006 | Colombo et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,165,728 B2 | 1/2007 | Durrant et al. |
| 7,168,994 B2 | 1/2007 | Caveney et al. |
| 7,198,409 B2 | 4/2007 | Smith et al. |
| 7,207,724 B2 | 4/2007 | Gurreri |
| D543,146 S | 5/2007 | Chen et al. |
| 7,221,284 B2 | 5/2007 | Scherer et al. |
| 7,226,217 B1 | 6/2007 | Benton et al. |
| 7,258,493 B2 | 8/2007 | Milette |
| 7,281,859 B2 | 10/2007 | Mudd et al. |
| 7,299,305 B2 | 11/2007 | Kim |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,327,278 B2 | 2/2008 | Dannenman et al. |
| 7,329,137 B2 | 2/2008 | Martin et al. |
| 7,335,066 B2 | 2/2008 | Carroll et al. |
| 7,336,883 B2 | 2/2008 | Scholtz |
| 7,354,291 B2 | 4/2008 | Caveney et al. |
| 7,374,458 B2 | 5/2008 | Caveney et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,513,787 B2 | 4/2009 | AbuGhazaleh et al. |
| 7,544,909 B2 | 6/2009 | Dhir |
| 7,547,150 B2 | 6/2009 | Downie et al. |
| 7,549,886 B2 | 6/2009 | Herring et al. |
| 7,556,536 B2 | 7/2009 | Caveney et al. |
| 7,561,775 B2 | 7/2009 | Lin et al. |
| 7,572,071 B1 | 8/2009 | Wu |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,651,361 B2 | 1/2010 | Henry et al. |
| 7,674,126 B2 | 3/2010 | Below et al. |
| 7,695,199 B2 | 4/2010 | Teo et al. |
| 7,699,533 B2 | 4/2010 | Milette |
| 7,760,094 B1 | 7/2010 | Kozischek et al. |
| 7,772,975 B2 | 8/2010 | Downie et al. |
| 7,782,202 B2 | 8/2010 | Downie et al. |
| 7,824,113 B2 | 11/2010 | Wong et al. |
| 7,910,833 B2 | 3/2011 | McGinley et al. |
| 7,910,834 B2 | 3/2011 | McGinley et al. |
| 7,920,764 B2 | 4/2011 | Kewitsch |
| 7,940,182 B2 | 5/2011 | Lange et al. |
| 7,960,648 B2 | 6/2011 | McGinley et al. |
| 7,965,186 B2 | 6/2011 | Downie et al. |
| D641,708 S | 7/2011 | Yamaguchi |
| 7,972,183 B1 | 7/2011 | Lin |
| 8,043,124 B2 | 10/2011 | Caveney et al. |
| 8,070,531 B1 | 12/2011 | Ku et al. |
| 8,113,723 B2 | 2/2012 | Togami et al. |
| 8,172,466 B2 | 5/2012 | Uemura et al. |
| 8,210,755 B2 | 7/2012 | Lavranchuk |
| 8,251,733 B2 | 8/2012 | Wu |
| 8,264,355 B2 | 9/2012 | Kozischek et al. |
| 8,277,260 B2 | 10/2012 | Caveney et al. |
| 8,465,317 B2 | 6/2013 | Gniadek et al. |
| 8,556,645 B2 | 10/2013 | Crain |
| 8,585,426 B2 | 11/2013 | Zerebilov et al. |
| 8,606,972 B2 | 12/2013 | Abuelsaad et al. |
| 8,611,234 B1 | 12/2013 | Gershman |
| 8,620,123 B2 | 12/2013 | Dean, Jr. et al. |
| 8,624,577 B2 | 1/2014 | Bradley, II |
| 8,692,683 B2 | 4/2014 | Dove |
| 8,702,453 B2 | 4/2014 | Caveney et al. |
| 8,708,724 B2 | 4/2014 | Patel et al. |
| 8,747,141 B2 | 6/2014 | Crain |
| 8,757,895 B2 | 6/2014 | Petersen |

(56) References Cited

U.S. PATENT DOCUMENTS

| | | | |
|---|---|---|---|
| 8,827,748 B2 | 9/2014 | Scherer et al. | |
| 8,851,905 B2 * | 10/2014 | Soubh | H01R 43/205 |
| | | | 439/76.1 |
| 9,196,975 B2 | 11/2015 | Scherer et al. | |
| 9,230,416 B2 | 1/2016 | Ward et al. | |
| 9,246,262 B2 | 1/2016 | Brown et al. | |
| 9,405,080 B2 | 8/2016 | Lambourn | |
| 9,577,904 B2 | 2/2017 | Scherer et al. | |
| 9,810,859 B2 | 11/2017 | Scherer et al. | |
| 9,952,258 B2 | 4/2018 | Scherer et al. | |
| 9,974,284 B2 * | 5/2018 | Harty | A61B 5/0022 |
| 9,995,432 B1 | 6/2018 | Girault | |
| 10,178,005 B2 | 1/2019 | Scherer et al. | |
| 10,215,935 B2 | 2/2019 | Scherer et al. | |
| 2002/0031955 A1 | 3/2002 | Schmidt et al. | |
| 2002/0048990 A1 | 4/2002 | Marowsky et al. | |
| 2003/0031025 A1 | 2/2003 | Huizenga | |
| 2003/0157842 A1 | 8/2003 | Arnett et al. | |
| 2003/0199192 A1 | 10/2003 | Caveney et al. | |
| 2003/0222786 A1 | 12/2003 | Dannenmann et al. | |
| 2003/0224666 A1 | 12/2003 | Yuan-Huei | |
| 2003/0234729 A1 | 12/2003 | Shen | |
| 2004/0038564 A1 | 2/2004 | Yan | |
| 2004/0052473 A1 | 3/2004 | Seo et al. | |
| 2004/0136657 A1 | 7/2004 | Ngo | |
| 2004/0141693 A1 | 7/2004 | Szilagyi et al. | |
| 2004/0160774 A1 | 8/2004 | Lionetti et al. | |
| 2004/0161958 A1 | 8/2004 | Togami et al. | |
| 2005/0037672 A1 | 2/2005 | Caveney et al. | |
| 2005/0124209 A1 | 6/2005 | Currie et al. | |
| 2005/0224585 A1 | 10/2005 | Durrant et al. | |
| 2005/0275412 A1 | 12/2005 | Kwong et al. | |
| 2006/0057876 A1 | 3/2006 | Dannenmann et al. | |
| 2006/0089049 A1 | 4/2006 | Sedor | |
| 2006/0134996 A1 | 6/2006 | Caveney et al. | |
| 2006/0162947 A1 | 7/2006 | Bolouri-Saransar et al. | |
| 2006/0232385 A1 | 10/2006 | Scherer et al. | |
| 2006/0269194 A1 | 11/2006 | Luther et al. | |
| 2007/0105453 A1 | 5/2007 | Caveney et al. | |
| 2007/0116411 A1 | 5/2007 | Benton et al. | |
| 2007/0149062 A1 | 6/2007 | Long et al. | |
| 2007/0190863 A1 | 8/2007 | Caveney et al. | |
| 2007/0197094 A1 | 8/2007 | Velleca | |
| 2007/0222426 A1 * | 9/2007 | Waffenschmidt | H02J 50/80 |
| | | | 323/355 |
| 2007/0230874 A1 | 10/2007 | Lin | |
| 2007/0232115 A1 | 10/2007 | Burke et al. | |
| 2007/0243749 A1 | 10/2007 | Wu | |
| 2007/0296391 A1 | 12/2007 | Bertin et al. | |
| 2008/0020658 A1 | 1/2008 | Provost | |
| 2008/0044137 A1 | 2/2008 | Luther et al. | |
| 2008/0069501 A1 | 3/2008 | Mudd et al. | |
| 2008/0099313 A1 | 5/2008 | Dhir | |
| 2008/0101757 A1 | 5/2008 | Lin et al. | |
| 2008/0102689 A1 | 5/2008 | Dhir | |
| 2008/0122579 A1 | 5/2008 | German et al. | |
| 2008/0220658 A1 | 9/2008 | Caveney et al. | |
| 2008/0226237 A1 | 9/2008 | O'Riorden et al. | |
| 2008/0267566 A1 | 10/2008 | Lin et al. | |
| 2009/0022306 A1 | 1/2009 | Wang et al. | |
| 2009/0028507 A1 | 1/2009 | Jones et al. | |
| 2009/0042431 A1 | 2/2009 | Herring et al. | |
| 2009/0214162 A1 | 8/2009 | O'Riorden et al. | |
| 2009/0220197 A1 | 9/2009 | Gniadek | |
| 2009/0269972 A1 | 10/2009 | Zhou et al. | |
| 2009/0269973 A1 | 10/2009 | Caveney et al. | |
| 2009/0275228 A1 | 11/2009 | Henry et al. | |
| 2010/0034502 A1 | 2/2010 | Lu et al. | |
| 2010/0048064 A1 | 2/2010 | Peng | |
| 2010/0079248 A1 | 4/2010 | Greveling | |
| 2010/0098425 A1 | 4/2010 | Kewitsch | |
| 2010/0322561 A1 | 12/2010 | Lin et al. | |
| 2011/0043333 A1 | 2/2011 | German | |
| 2011/0044588 A1 | 2/2011 | Larson et al. | |
| 2011/0116748 A1 | 5/2011 | Smrha et al. | |
| 2011/0131801 A1 | 6/2011 | Nelson et al. | |
| 2011/0177710 A1 | 7/2011 | Tobey | |
| 2011/0222819 A1 | 9/2011 | Anderson et al. | |
| 2012/0058689 A1 | 3/2012 | Caveney et al. | |
| 2012/0064750 A1 | 3/2012 | Wu | |
| 2013/0039624 A1 | 2/2013 | Scherer et al. | |
| 2013/0052860 A1 | 2/2013 | Caveney et al. | |
| 2013/0164968 A1 | 6/2013 | Bishop et al. | |
| 2014/0035755 A1 | 2/2014 | Ward et al. | |
| 2014/0313042 A1 | 10/2014 | Scherer et al. | |
| 2015/0118898 A1 * | 4/2015 | Paynter | H01R 9/0503 |
| | | | 333/24 C |
| 2015/0340818 A1 | 11/2015 | Scherer et al. | |
| 2016/0020975 A1 | 1/2016 | Scherer et al. | |
| 2016/0054527 A1 | 2/2016 | Tang et al. | |
| 2016/0209604 A1 | 7/2016 | Scherer et al. | |
| 2017/0293102 A1 | 10/2017 | Bauco et al. | |
| 2018/0014145 A1 * | 1/2018 | Seaman | H04W 4/023 |
| 2018/0261918 A1 * | 9/2018 | Lelchuk | H04B 1/0064 |
| 2018/0287302 A1 * | 10/2018 | Kim | H01R 13/6471 |
| 2019/0235816 A1 * | 8/2019 | Adolfsson | G06F 3/0488 |

FOREIGN PATENT DOCUMENTS

| | | |
|---|---|---|
| CN | 2836038 Y | 11/2006 |
| CN | 101299502 | 11/2008 |
| CN | 101572363 | 11/2009 |
| CN | 101572369 | 11/2009 |
| CN | 201383588 | 1/2010 |
| CN | 102394402 | 3/2012 |
| CN | 102859807 | 1/2013 |
| DE | 202006011910 | 3/2007 |
| DE | 102006019335 | 10/2007 |
| EP | 1074868 | 7/2001 |
| EP | 1566674 | 8/2005 |
| JP | 2009/229545 | 10/2009 |
| JP | 2009/276493 | 11/2009 |
| TW | 2012236293 | 9/2012 |
| WO | WO 2001/79904 | 10/2001 |
| WO | WO 2008/112986 | 9/2008 |
| WO | WO 2009/135787 | 11/2009 |
| WO | WO 2011/139341 | 11/2011 |

OTHER PUBLICATIONS

International Search Report and Written Opinion Issued in Corresponding PCT Patent Application No. PCT/US2014/011823, dated May 30, 2014.

International Search Report and Written Opinion issued in International Application No. PCT/US2011/000738, dated Nov. 25, 2011.

International Search Report and Written Opinion issued in International Patent Application No. PCT/IB2017/053533, dated Sep. 25, 2017.

International Search Report and Written Opinion issued in PCT/US2012/061967, dated Mar. 25, 2013.

International Search Report and Written Opinion issued in PCT/US2014/052040, dated Dec. 8, 2014.

International Search Report and Written Opinion of the International Searching Authority, dated Apr. 27, 2012, from Counterpart Foreign Application PCT/US2011/058799, International Filing Date Nov. 1, 2011.

Office Action issued in Australian Patent Application No. 2012323998, dated Mar. 2, 2016.

Office Action Issued in Australian Patent Application No. 2012323998, dated Jun. 30, 2014.

Office Action issued in Chinese Application No. 201480014200, dated Jan. 16, 2017.

* cited by examiner

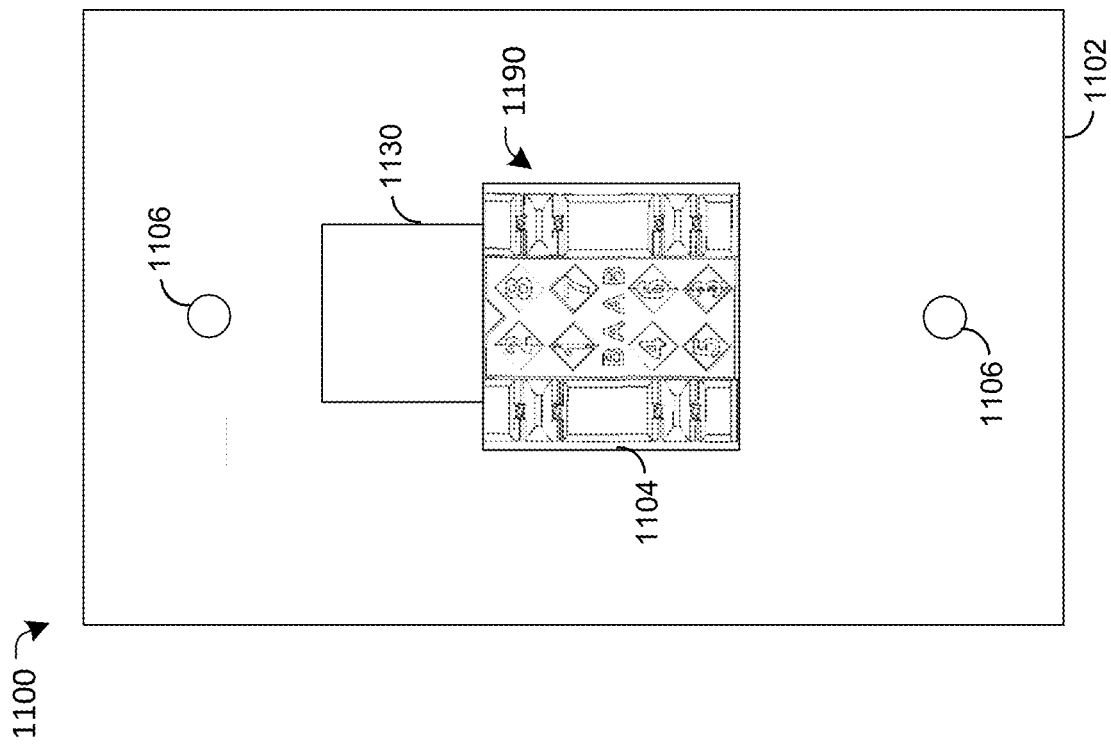
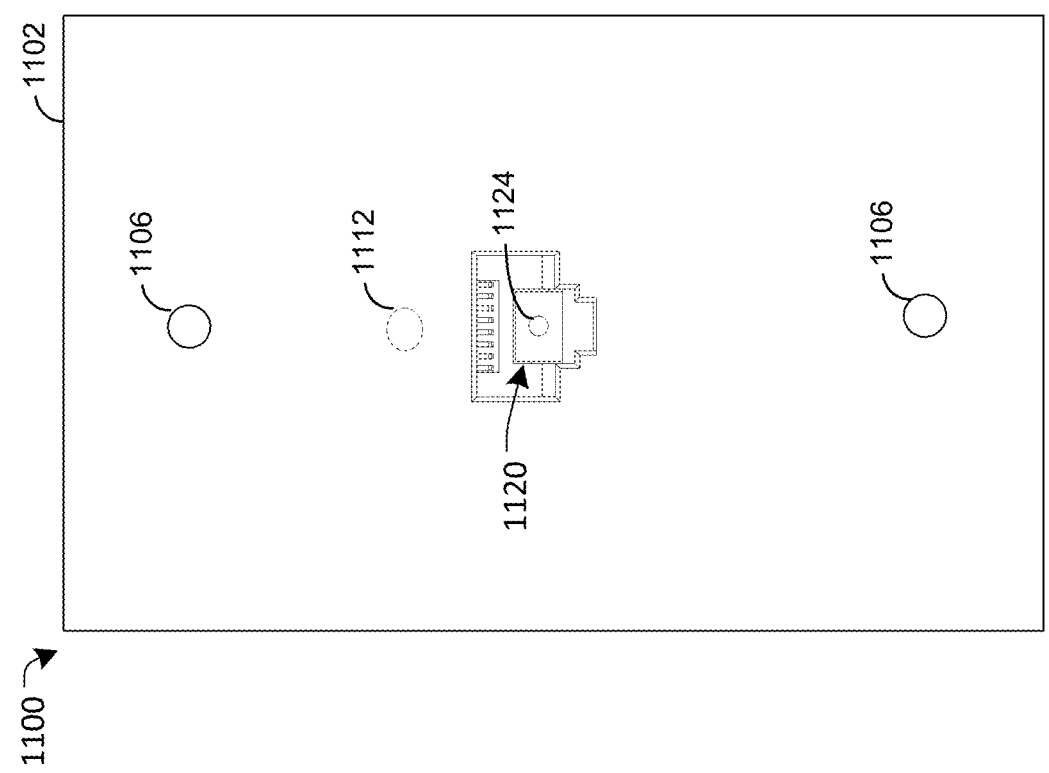
FIG. 11B
FIG. 11A

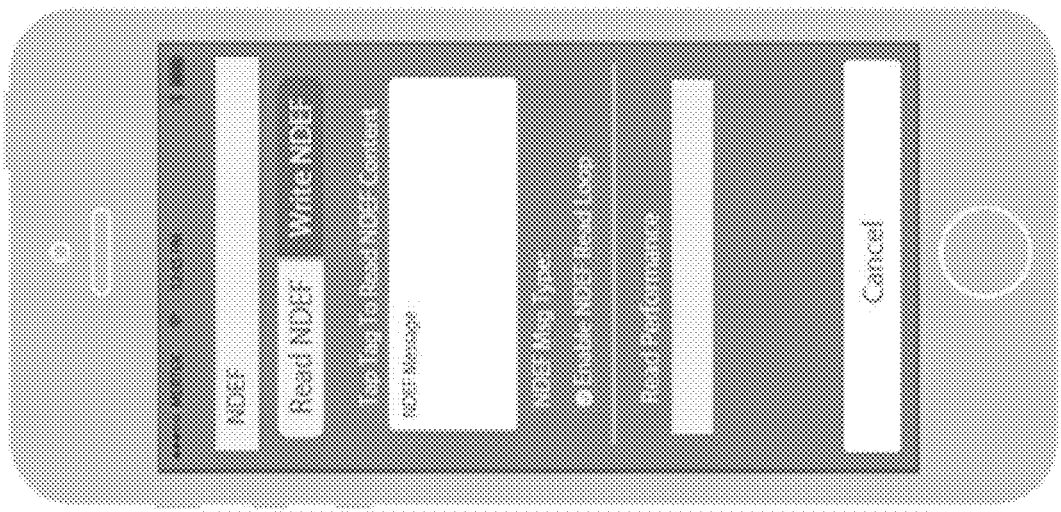
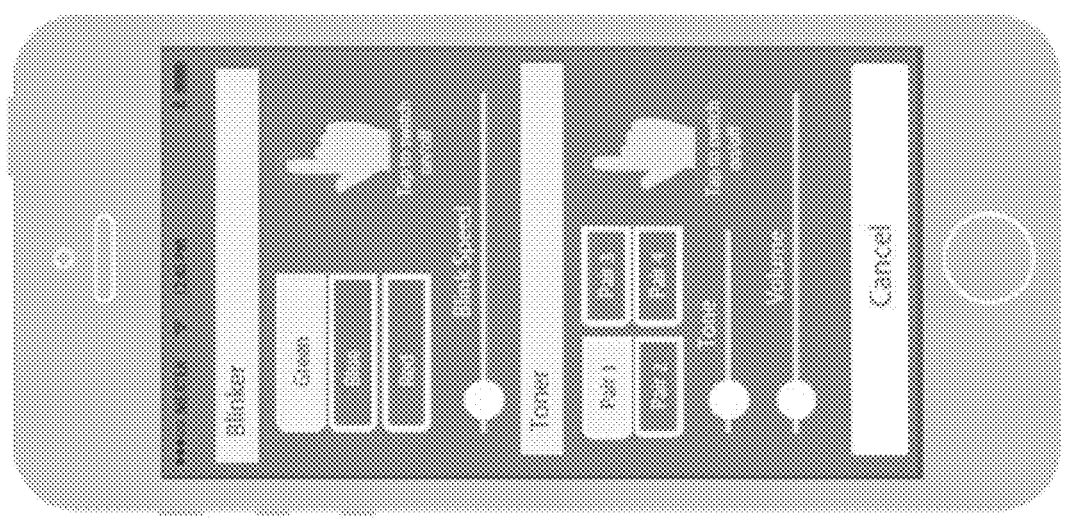
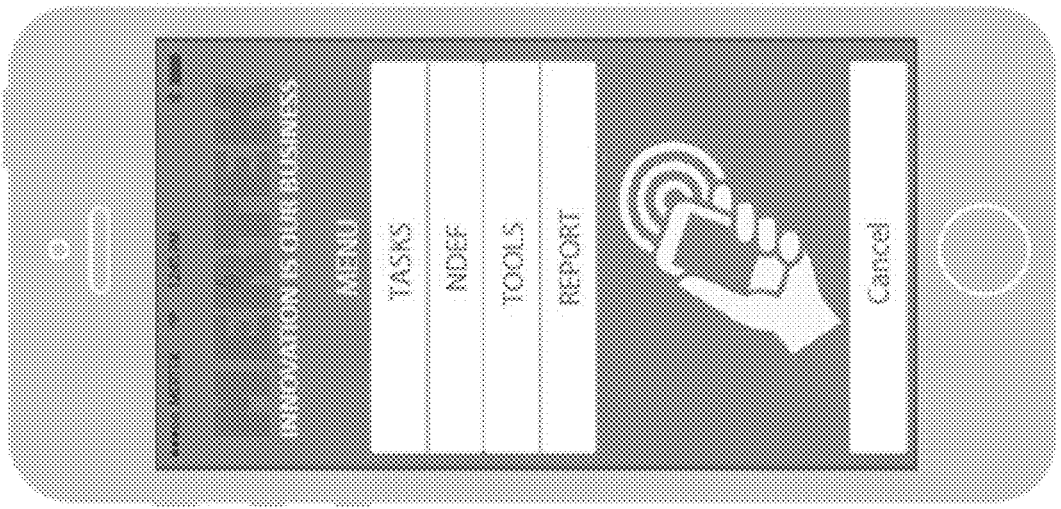
FIG. 15C
FIG. 15B
FIG. 15A

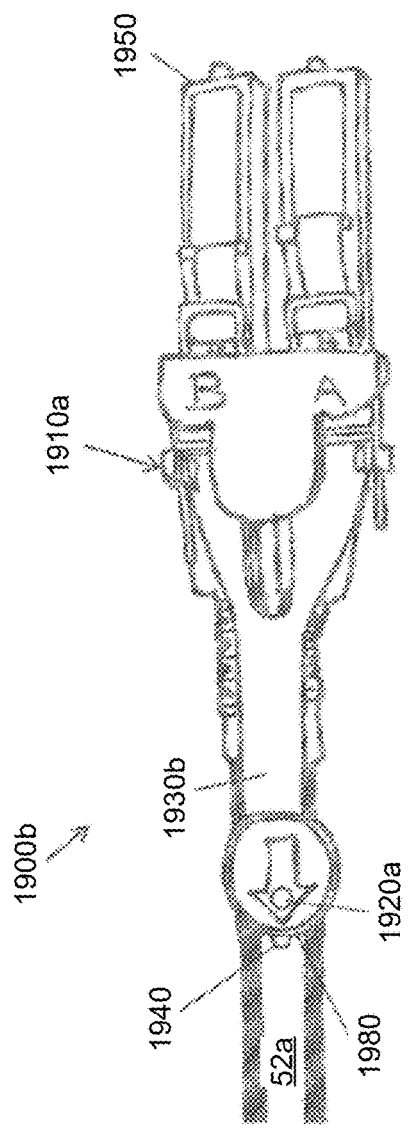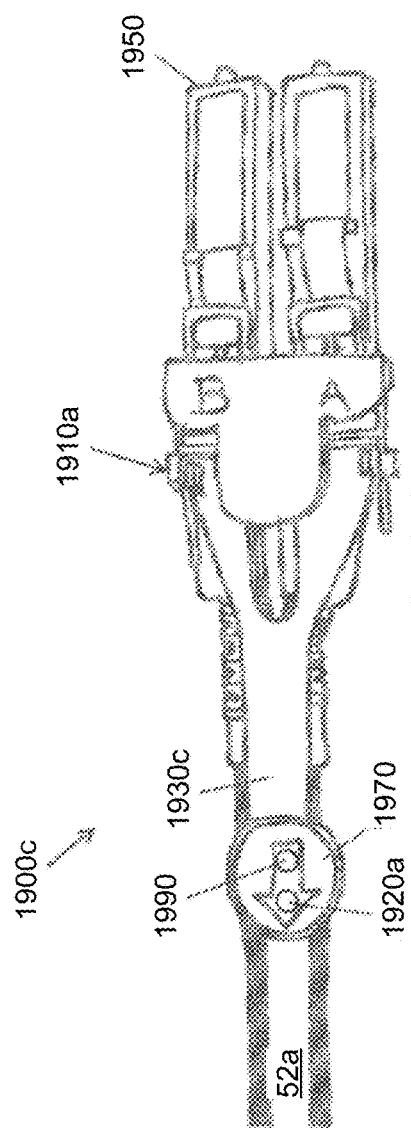

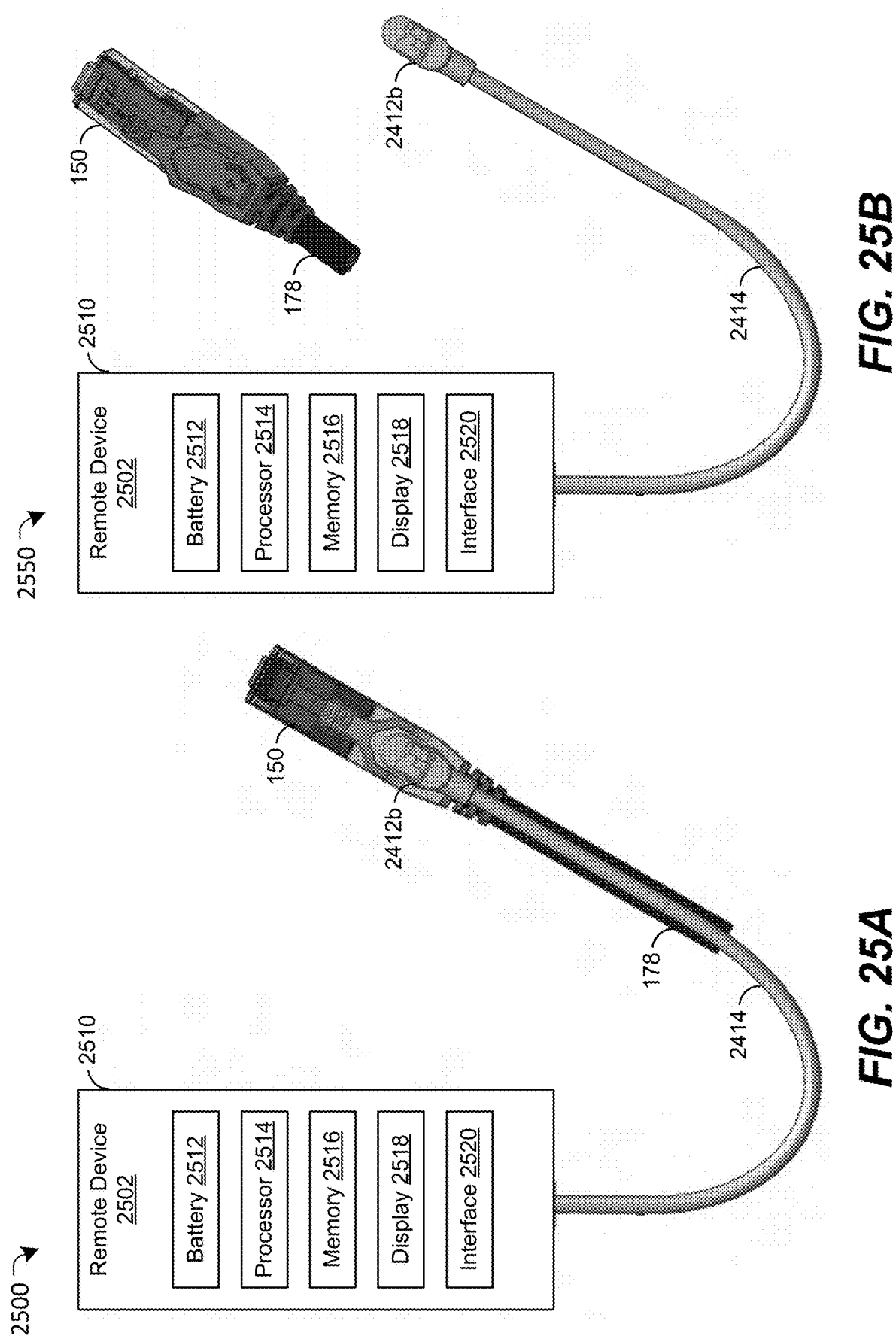

PATCH CORD INCLUDING WIRELESS COMPONENTS

CROSS-REFERENCE TO RELATED APPLICATIONS

This application claims the benefit of priority to U.S. Provisional Patent Application No. 62/793,110, filed Jan. 16, 2019, and U.S. Provisional Patent Application No. 62/845,595, filed May 9, 2019, the entire contents of each of which applications are hereby incorporated by reference in their entirety.

TECHNICAL FIELD

The present disclosure relates generally to cables, and more particularly, but not by way of limitation, to network cable connectors with wireless communication and/or wireless power receiving capability.

BACKGROUND

A networking cable is configured to carry signals from one electronic device to another. The term signals can mean data signals, power, or telephone communications. Electronic devices include but are not limited to terminals, personal computers, printers, workstations, hubs, switches, storage devices, tape drives, routers, telephone switches, and servers. Networking cables, frequently referred to, as "jumper cables", "patch cables", "patch cords", or simply "cables", typically are multiple pair copper wires packaged in an outer flexible sheath. Networking cables are designed to interconnect an electronic device with another electronic device. Such networking cables often are used in systems where there are many networking cables connected to frames, panels, or electronic devices, each of which may have many connecting cables and which may be located closely adjacent other similar frames, panels, or electronic devices, sometimes without carefully regimented management of the cables. The connections of each cable may be remote from one another, even being in separate rooms or spaces, and the networking cables may be of substantial length.

A network cable connector, such as a jack connector (e.g., a receptacle) or a plug connector, associated with a network cable may have a battery to enable display of network related information. An example of such a network cable connector is described in U.S. Pat. No. 8,827,748. In such situations, the batteries eventually run out of power and need to be replaced. This results in system downtime and lack of functionality, which results in system inefficiency.

SUMMARY

The present disclosure describes a network cable connector and systems and methods for using and producing the network cable connector. The network cable connector includes one or more components, such as a wireless communication means, a wireless power receiving means, a display, a circuit (e.g., a printed circuit of a printed circuit board or a flex circuit), a connection hood (e.g., a hood), or a combination thereof. The disclosed network cable connector can wirelessly transmit and/or receive data. For example, the network cable connector include an RFID tag (e.g., NFC chip) and can communicate with an RFID device (e.g., NFC reader) of a mobile device, such as a smartphone. Additionally, or alternatively, the disclosed network cable connector may be configured to receive power from the mobile device. For example, an electronic field generated by an RFID device can be used to power the network cable, such as to provide power to enable wireless communication between the network cable connector and the mobile device. In a particular implementation, the power received from the electric field can be used to charge a battery.

As another example, the disclosed network cable connector can provide information via the display responsive to data and/or power transmitted by the mobile device. For example, the disclosed network cable connector receives power from an electric field or magnetic field generated by an mobile device and provides power to an LED to produce a visual indication, such as blink, change colors, etc.

Thus, the disclosed network cable connector may provide information about the disclosed network cable connector without using battery power and/or without being connected to a power sourcing equipment (PSE), such as power over Ethernet (POE) PSE. Such information may include information relevant to the connector and/or a networked environment, and may comprise at least one of: an operating status of the connector, a power connection status of the connector, a security setting of the connector, an Internet protocol (IP) address of a device coupled to the connector, and a media access control (MAC) address of a device coupled to the connector, type of equipment coupled to the connector, location of a far end device, connector security settings, security lock-out status, etc.

Although described in the context of network cables, the disclosed wireless communication means and wireless power receiving means can be used in electric power cables, fiber optic cables, audio cables, video cables, video and audio cables (e.g., HDMI and display port) and/or other components of the networked environment.

Some embodiments of the present network cable connectors comprise: a hood defining an opening configured to receive a plug; and a printed circuit incorporated into the hood and configured to wirelessly communicate with an external device. In some implementations, the printed circuit includes an inductor configured to receive and transmit data signals. In some such implementations, the inductor is further configured to receive power signals from the external device, the power signals configured to power at least a portion of the printed circuit. In other such implementations, the printed circuit include a second inductor configured to receive power signals from the external device, the power signals configured to power at least a portion of the printed circuit.

In some implementations, the printed circuit is configured to wirelessly transmit information to the external device. Additionally, or alternatively, the network cable connector further comprises a display incorporated into the hood, the display coupled to the printed circuit and configured to display information. In some such implementations the information indicates an operating status of the connector, a power connection status of the connector, a security setting of the connector, an Internet protocol (IP) address of a device coupled to the connector, a media access control (MAC) address of a device coupled to the connector, or a combination thereof.

In some implementations, the printed circuit includes an RFID tag. Additionally, or alternatively, the printed circuit includes a first controller configured to receive data signals from the external device via an inductor, to process the data signal to generate data, to provide the data to a second controller, and to transmit second data to the external device; and the second controller configured to process the data and to provide the second data to the first controller. In some implementations, the network cable connector further comprises a switch coupled to the printed circuit and incorporated into the hood, where the switch is configured to connect or disconnect at least one component of the printed circuit to or from the external device or a power source.

Some embodiments of the present network cable connectors comprise: a hood defining an opening configured to receive a plug; and wireless communication means for wirelessly communicating with an external device.

Some embodiments of the present network cable connectors comprise: a hood defining an opening configured to receive a plug; and a printed circuit incorporated into the hood and configured to wirelessly couple to an external power source via an inductor, wherein one or more components of the printed circuit receive power from the external power source. In some implementations, the network cable connector further comprises a display incorporated into the hood and configured to be powered by the external power source, wherein the display is coupled to the printed circuit and configured to display information. In some implementations, the external power source comprises a mobile device, and the network cable connector further comprises a power management unit coupled to the inductor and configured to provide power to the printed circuit based on power induced in the inductor.

Some embodiments of the present network cable connectors comprise: a hood defining an opening configured to receive a plug; and wireless power receiving means for wirelessly receiving power from a magnetic or electric field.

Some embodiments of a system that includes an embodiment of the present network cable connectors comprise: a mobile device including an RFID device; and the network cable connector. In some implementations, the RFID device comprises an NFC device including an NFC reader.

Some embodiments of the present cable comprise: a sheath including one or more conductor wires; one or more connectors coupled to the sheath; and a printed circuit coupled to the sheath and configured to wirelessly communicate with an external device, wirelessly receive power from the external device, or both. In some implementations, the cable comprises a network cable, a power cable, a fiber optic cable, a video cable, an audio cable, or a video and audio cable.

Some embodiments of a method of making a network component comprise: providing the network component defining an opening configured to receive a printed circuit; and incorporating the printed circuit into the network component, the printed circuit configured to wirelessly communicate with an external device.

Some embodiments of a method of making a network cable comprise: providing a hood defining an opening configured to receive a plug; and incorporating a printed circuit into the hood, the printed circuit configured to wirelessly communicate with an external device. In some implementations, the method further comprises incorporating a display into the hood and coupling the display to the printed circuit, wherein the display is configured to display information relevant to the connector. In some implementations, the method further comprises coupling a battery to the printed circuit. In some implementations, the method further comprises coupling a sheath and a boot to the hood, the sheath including one or more conductor wires.

Some embodiments of a method of attaching a printed circuit including an RFID tag to a network cable comprise: locating the network cable; and attaching the printed circuit to the network cable via a tag or a sticker. In some implementations the method further comprises programing the printed circuit with information that indicates a security setting of the cable, an Internet protocol (IP) address of a device coupled to the cable, a media access control (MAC) address of a device coupled to the cable, a location of a connector of the cable, or a combination thereof. In some implementations, the tag or the sticker is attached to a connector of the network cable.

Some embodiments of a method of making a network cable comprise: providing a sheath defining an opening configured to receive a printed circuit; and incorporating the printed circuit into the sheath, the printed circuit configured to wirelessly communicate with an external device.

Some embodiments of a method of making a network cable comprise: providing an extender of a connector of the network cable defining an opening configured to receive a printed circuit; and incorporating the printed circuit into the extender, the printed circuit configured to wirelessly communicate with an external device.

Some embodiments of a method of operating a network cable comprise: wirelessly receiving, at a printed circuit of the network cable, data from an external device; and providing, via a display coupled to the printed circuit, a visual indication responsive to the data. In some implementations, the display comprises a light emitting diode (LED), and wherein the visual indication includes blinking, color changes, or a combination thereof.

Additionally, or alternatively, the display comprises an LED display or a liquid crystal display (LCD), and wherein the LED display or the LCD is configured to display information relevant to the network cable, which comprises at least one of: an operating status of the network cable, a power connection status of the network cable, a security setting of the network cable, an Internet protocol (IP) address of a device coupled to the network cable, and a media access control (MAC) address of a device coupled to the network cable. In some implementations, the method further comprises: capturing energy from an electric field used to transmit the data; and charging a battery with the energy captured from the electric field.

Some embodiments of a method of operating a network cable comprise: wirelessly receiving, at a printed circuit of the network cable, data from an external device; and wirelessly transmitting, from the printed circuit of the network cable, second data indicating information relevant to the network cable. In some implementations, the method further comprises providing, via a display coupled to the printed circuit, a visual indication responsive to the data. In some implementations, the display comprises an LED, and wherein the visual indication includes blinking, color changes, or a combination thereof.

Additionally, or alternatively, the display comprises an LED display or an LCD, and wherein the display LED or the LCD is configured to display information relevant to the network cable, which comprises at least one of: an operating status of the network cable, a power connection status of the network cable, a security setting of the network cable, an Internet protocol (IP) address of a device coupled to the network cable, and a media access control (MAC) address of a device coupled to the network cable. In some implementations, the method further comprises: capturing energy from an electric field used to transmit the data; and charging a battery with the energy captured from the electric field.

Some embodiments of a method of operating a network cable comprise: wirelessly receiving, at a printed circuit of the network cable, power from an external device; and providing, via a display coupled to the printed circuit, a visual indication based on the power from the external device. In some implementations, the display comprises an LED, and wherein the visual indication includes blinking, color changes, or a combination thereof. Additionally, or alternatively, the display comprises an LED display or LCD, and wherein the LED display or the LCD is configured to display information relevant to the network cable, which comprises at least one of: an operating status of the network cable, a power connection status of the network cable, a security setting of the network cable, an Internet protocol (IP) address of a device coupled to the network cable, and a media access control (MAC) address of a device coupled to the network cable.

Some embodiments of a method of operating a network cable comprise: wirelessly receiving, at a printed circuit of the network cable, data from an external device; and adjusting operation of the network cable based on the data received from the external device. In some implementations, adjusting the operation of the network cable includes adjusting a security access control, enabling or disabling Internet of Things (IoT) device access, turning off or on service (e.g., POE power), enabling or disabling read and/or write access, enabling or disabling read and/or write controls, or a combination thereof.

Some embodiments of a kit for a networked environment comprise: one or more printed circuits configured to wirelessly communicate with an external device, wirelessly receive power from the external device, or both; and one or more components selected from the group comprising: connectors, sheaths, hoods, boots, tags, stickers, clips, extenders, cables, or any combination thereof.

Some embodiments of the present power cable connectors comprise: a hood defining an opening configured to receive a plug; and a printed circuit incorporated into the hood and configured to wirelessly communicate with an external device. In some implementations, the printed circuit includes an inductor configured to receive and transmit data signals. In some such implementations, the inductor is further configured to receive power signals from the external device, the power signals configured to power at least a portion of the printed circuit. In other such implementations, the printed circuit include a second inductor configured to receive power signals from the external device, the power signals configured to power at least a portion of the printed circuit.

Some embodiments of the present optical cable (e.g., fiber optic cable) connectors comprise: a hood defining an opening configured to receive a plug; and a printed circuit incorporated into the hood and configured to wirelessly communicate with an external device. In some implementations, the printed circuit includes an inductor configured to receive and transmit data signals. In some such implementations, the inductor is further configured to receive power signals from the external device, the power signals configured to power at least a portion of the printed circuit. In other such implementations, the printed circuit include a second inductor configured to receive power signals from the external device, the power signals configured to power at least a portion of the printed circuit.

Some embodiments of the present power cables comprise: a cable; a hood defining an opening configured to receive a plug; and a printed circuit coupled to the cable or the hood and configured to wirelessly communicate with an external device. In some implementations, the printed circuit includes an inductor configured to receive and transmit data signals. In some such implementations, the inductor is further configured to receive power signals from the external device, the power signals configured to power at least a portion of the printed circuit. In other such implementations, the printed circuit include a second inductor configured to receive power signals from the external device, the power signals configured to power at least a portion of the printed circuit.

Some embodiments of the present optical cables (e.g., fiber optic cables) comprise: a cable; a hood defining an opening configured to receive a plug; and a printed circuit coupled to the cable or the hood and configured to wirelessly communicate with an external device. In some implementations, the printed circuit includes an inductor configured to receive and transmit data signals. In some such implementations, the inductor is further configured to receive power signals from the external device, the power signals configured to power at least a portion of the printed circuit. In other such implementations, the printed circuit include a second inductor configured to receive power signals from the external device, the power signals configured to power at least a portion of the printed circuit. The embodiments of the present power cable connectors, optical cable connectors, power cables, and optical cable connectors may include the components and the functionality described above with reference to the networking cable connectors and networking cables.

Some embodiments of the present peripheral devices comprise: a first connector configured to couple to a mobile device including a wireless transmitter; a second connector coupled to the first connector and configured to wirelessly couple to a printed circuit coupled cable, and wherein the second connector is configured to transmit data, power, or both, received from the mobile device to the printed circuit.

Some embodiments of the present systems comprise a mobile device including an RFID device; and an embodiment of the peripheral device described above. In some implementations, the systems further comprise a cable connector as described above.

Some embodiments of the present remote devices comprise: a battery; a processor; a memory coupled to the processor; a display; an interface; a housing including, the battery, the processor, the memory, the display, and the interface; and a wireless transmitter coupled to the processor via the interface and remote from the housing, the wireless transmitter configured to wirelessly communicate with a printed circuit coupled to a cable. In some implementations, the wireless transmitter comprises a NFC transmitter, and the wireless transmitter is configured to transmit data, power, or both, to the printed circuit.

Any embodiment of any of the present cables, systems, apparatuses, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Some details associated with the embodiments are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

FIG. 11A illustrates a front view of a plate that includes a network cable connector according to one aspect of the present disclosure.

FIG. 11B illustrates a rear view of the plate of FIG. 11A.

FIG. 15A illustrates a diagram of a user interface of an application for controlling RFID tags associated with network components.

FIG. 15B illustrates a diagram of another user interface of an application for controlling RFID tags associated with network components.

FIG. 15C illustrates a diagram of another user interface of an application for controlling RFID tags associated with network components.

FIG. 21 is a plan view of a second embodiment of a dual-fiber optic cable connector hood with a remote release tab.

FIG. 22 is a plan view of a third embodiment of a dual-fiber optic cable connector hood with a remote release tab.

FIGS. 25A and 25B are perspective views of a remote device which can interact with and control RFID tags.

DESCRIPTION OF ILLUSTRATIVE EMBODIMENTS

Figure 1:
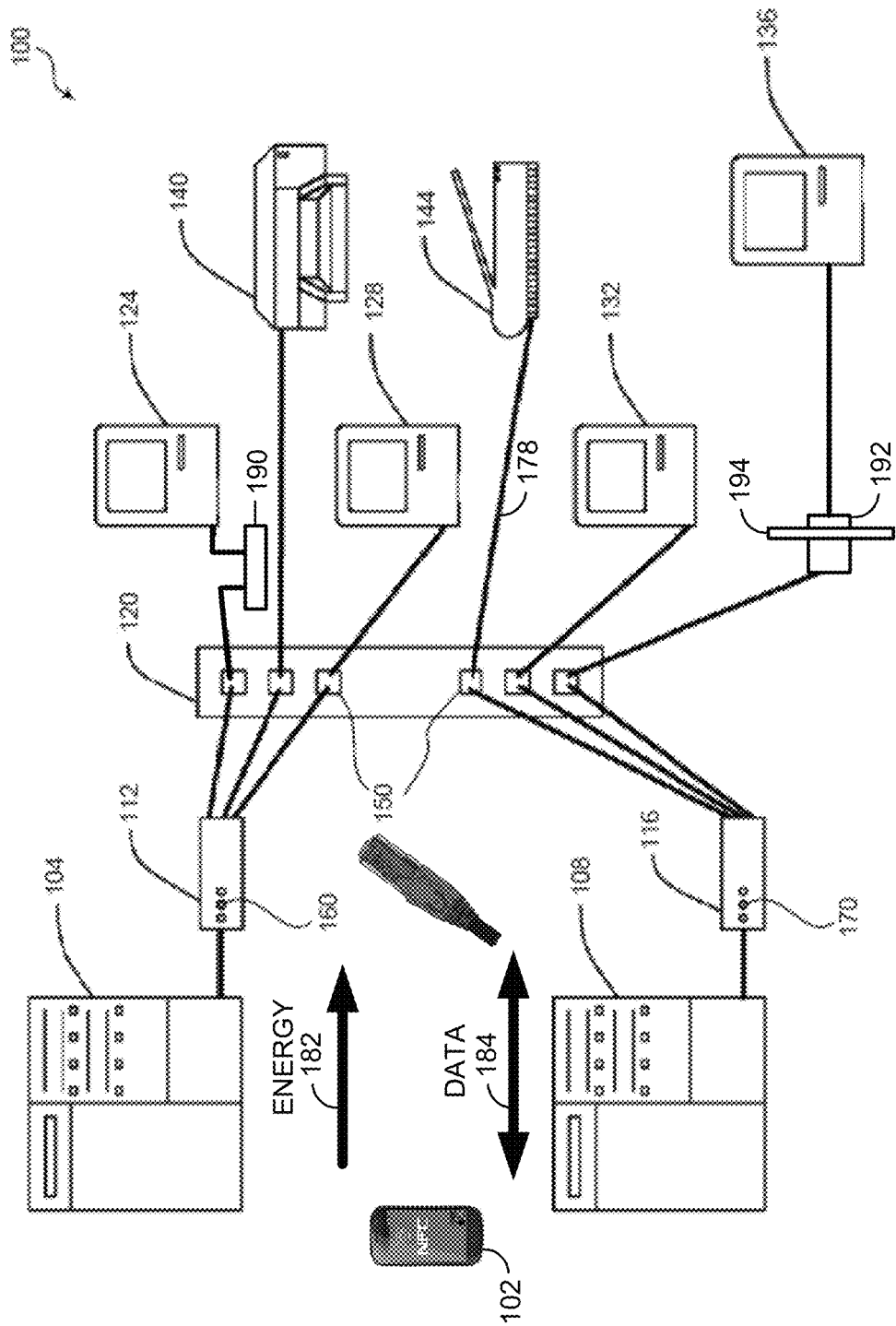
FIG. 1 illustrates a schematic view of a networked computer environment.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system or apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps. Additionally, it will be understood that the term "wherein" may be used interchangeably with "where."

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a structure (e.g., a component of an apparatus, such as a cable) that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

FIG. 1 illustrates an example of a networked environment 100 and a mobile device 102 external to the networked environment 100, such as an external device and/or external power source. Mobile device 102 is configured to communicate with one or more components of networked environment 100. For example, mobile device 102 is configured to transmit energy 182 and data 184 to a particular component of networked environment 100. The particular component is configured to provide information about the networked environment 100 to the mobile device 102 via wireless communication or to output the information via a display of the particular component. Additionally, the particular component can use the energy 182 transmitted by the mobile device 102 to provide or output the information. For example, the particular component may use the energy 182 to receive data 184, process data 184, send data 184, power the display, or a combination thereof.

In FIG. 1, networked environment 100 includes servers, computers, hubs, peripheral devices, and a cable panel, each of which may include one or more connectors (e.g., a network cable connector). As shown, computers 124, 128, 132, and 136 are each connected by network cables to a cable panel 120 via cable connectors 150. As shown, each cable connector 150 includes one or more cable connectors that are each configured to receive a corresponding jack associated with a network cable, such as a representative network cable 178. Network cable 178 may include one or more wires (e.g. conductors), such as one or more insulated wires. Each wire may be configured to communicate data signals, power signals, or both. The computers can be at multiple locations, such as in different rooms and/or buildings. To illustrate, computer 128 may be located in a first room, on a first floor, of a building and computer 132 may be located in a second room, on a second floor, of the building.

Also attached to panel 120 by network cables via connectors 150 are peripheral devices, such as printer 140 and scanner 144 as illustrative, non-limiting examples. Panel 120 is often located at a central room where service personnel can access panel 120. Often, access to the central room that includes panel 120 is restricted. From panel 120, multiple computers and peripheral devices are often linked by networked cables to hubs such as 112 and 116 via connectors 160, 170. Hubs 112 and 116 may be in turn be connected to servers 104 and 108. Multiple servers and hubs may be housed in a room.

Network environment 100 may also include one or more additional cable network connectors, such as network cable connector 190 and network cable connector 192. Examples of network cable connectors 150, 160, 170, 190, and 192 are described further herein at least with reference to FIGS. 2A-2F, 3A-3G, and 4A-4F. Network cable connector 190,

192 may include a plug (associated with an opening) that is configured to receive a jack associated with a network cable. In some implementations, network cable connector 190, 192 comprises a coupler that is configured to communicatively and/or electrically couple two network cables. In particular implementations, one or more of the network cable connectors 150, 160, 170, 190, and 192 includes a keystone jack or a keystone coupler. In some implementations, a network cable connector 190 and 192 may be configured as a wall jack, e.g., attached to a plate (e.g., a wall plate) or a support structure. For example, as shown, network cable connector is coupled (e.g., mounted) to or incorporated in a plate, such as a wall plate 194. Examples of plates are described further herein at least with reference to FIGS. 10A-10B, 11A-11B, and 12A-12B.

In some implementations, one or more network cable connector 150, 160, 170, 190, and 192 may comply with one or more interface standards. For example, a network cable connector may be configured to be compatible with 8P8C connector interfaces, such as RJ-45, RJ-48, or RJ-61 interfaces. As another example, a network cable connector may be configured to be compatible for 10P10C connector interfaces, such as RJ-50 interfaces.

For example one or more network cable connector 150, 160, 170, 190, and 192 may comply with one or more of the following interface standards categories: 5 (which generally includes four insulated twisted copper wires encased in a flexible outer jacket layer), 5A, 5E, 6 (e.g., for Gigabit Ethernet and/or other network protocols). Later standards (e.g., Cat-6) are often backward compatible with earlier standards (e.g., CAT 5, CAT 3). Relative to Cat-5, Cat-6 specifications are generally more stringent for crosstalk and system noise. Cat-6, for example, provides performance of up to 250 MHz, and may be suitable for 10BASE-T, 100BASE-TX (Fast Ethernet), 1000BASE-T/1000BASE-TX (Gigabit Ethernet) and 10GBASE-T (10-Gigabit Ethernet). Cat-6 has a relatively lower maximum length when used for 10GBASE-T, Cat-6A cable, or Augmented Cat-6, is characterized for 500 MHz and has further improved alien crosstalk characteristics, allowing 10GBASE-T to be run for the same maximum cable length as other protocols. Several other standards are in use, and may be used in embodiments of the present traceable networking cables. In some embodiments, one or more (e.g., two in a conductor wire pair) additional conductor wires (which may be referred to as tracer wires or indicator wires) can be added to or included in a networking cable (e.g., a Cat-5 or Cat-6 cable) such that the additional conductor wire(s) are used in the tracing function described herein. For example, the use of a cable 52 with ten wires or conductors with eight-wire RJ-45 connectors allows one of the five conductor-wire pairs to be used as a continuous continuity path between electrically activated telltales (e.g., light) at the end of the cable. Cables, conductor wires, conductor wire pairs, and/or conductors in the present embodiments may be coaxial, twin-axial, twisted, untwisted, shielded, unshielded, and/or bonded, as is known in the art.

In some implementations, a server (e.g., 104, 108), a hub (e.g., 112, 116), and/or a panel (e.g., 120) also represent an external power source that provides power to another device devices (e.g., 124, 128, 132, 136, 140, 144). In such implementations, at least some of the cables extending between the various devices and panel 120 may include or be configured to operate as power cables, audio cable, video cables, video and audio cables, fiber optic cables, or pull-tab cables. In a particular implementation, a server (e.g., 104, 108), a hub (e.g., 112, 116), and/or a panel (e.g., 120) configured to operate as an external power source may be referred to as power sourcing equipment (PSE). The PSE may be configured to provide power over Ethernet (POE) to one or more devices referred to herein as one or more powered devices (PDs). The external power source (e.g., PSE) may be complaint with POE standards or technical specifications, such as IEEE 802.3af, IEEE 802.3.at, Cisco Inline Power, etc., and configured to draw power from a POE PSE.

Various protocols (e.g., Ethernet) can be used to support data transfer between computers and servers. The example shown in FIG. 1 is relatively a small network, and networks may often be much larger. In addition to the devices shown in FIG. 1, networks can include, for example, other electronic devices such as mobile devices, workstations, switches, tape drives, storage devices, telephone switches, voice over Internet protocol (VOIP) devices, routers, and/or any other device that may be connected to a network (e.g., a camera), as illustrative, non-limiting examples. With large networks, the total number of network cables may be very large, and routine maintenance functions (e.g., the addition or change of computers) can require significant time and manpower to trace connections throughout the network.

In a particular implementation, a printed circuit is included in or attached to at least one of the components of the networked environment 100 and is configured to wirelessly communicate with mobile device 102. For example, the printed circuit includes an RFID device (e.g., RFID tag, reader, or both) and is configured to receive energy 182 and/or data 184 from the mobile device 102. The printed circuit can be included in cables, plates, extenders, couplers, connector, jacks, ports, and tags or stickers affixed to any of the preceding of the networked environment 100. An example the printed circuit is described further with reference to FIGS. 5 and 14. The printed circuit can communicate information about the networked environment 100 and/or components thereof to the mobile device 102 or output the information visually, such as via a display coupled to the printed circuit. By communicating or outputting information about the networked environment 100 and/or components thereof, a technician can service a network more quickly and easily and with reduced downtime.

Figure 2A:
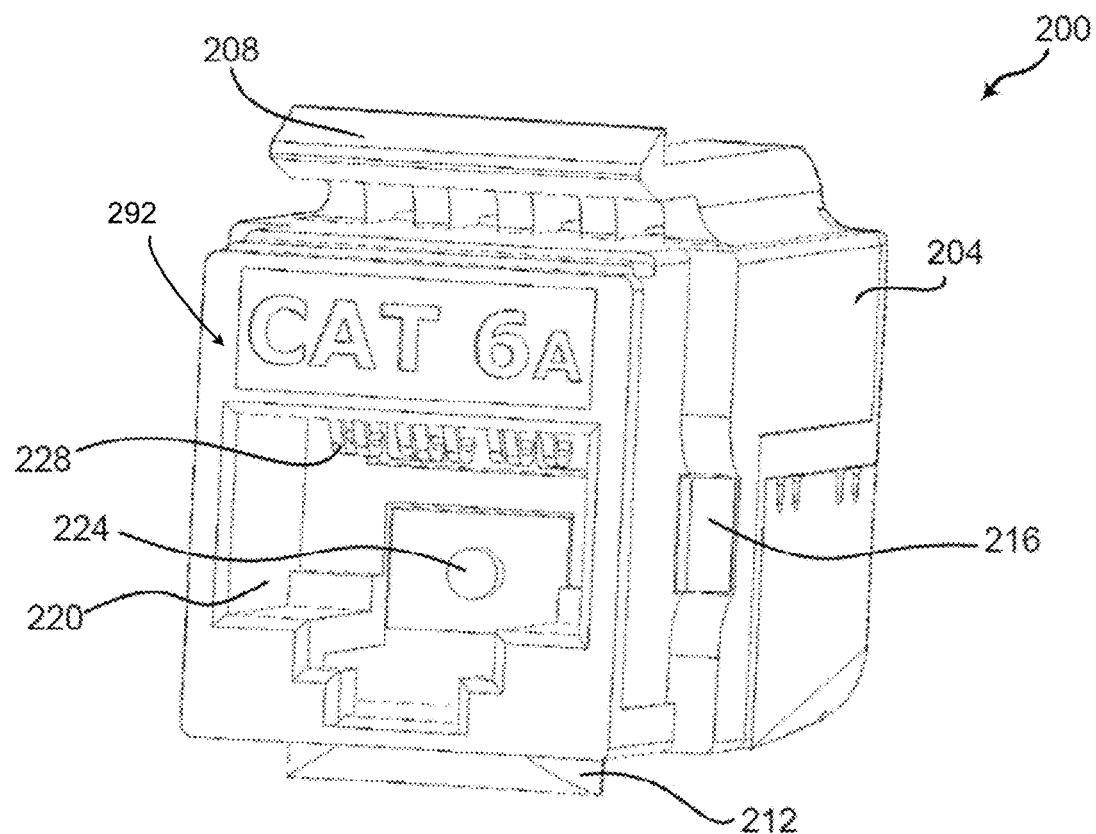
FIG. 2A illustrates a front, upper perspective view of a network cable connector according to one aspect of the present disclosure.
Figure 2B:
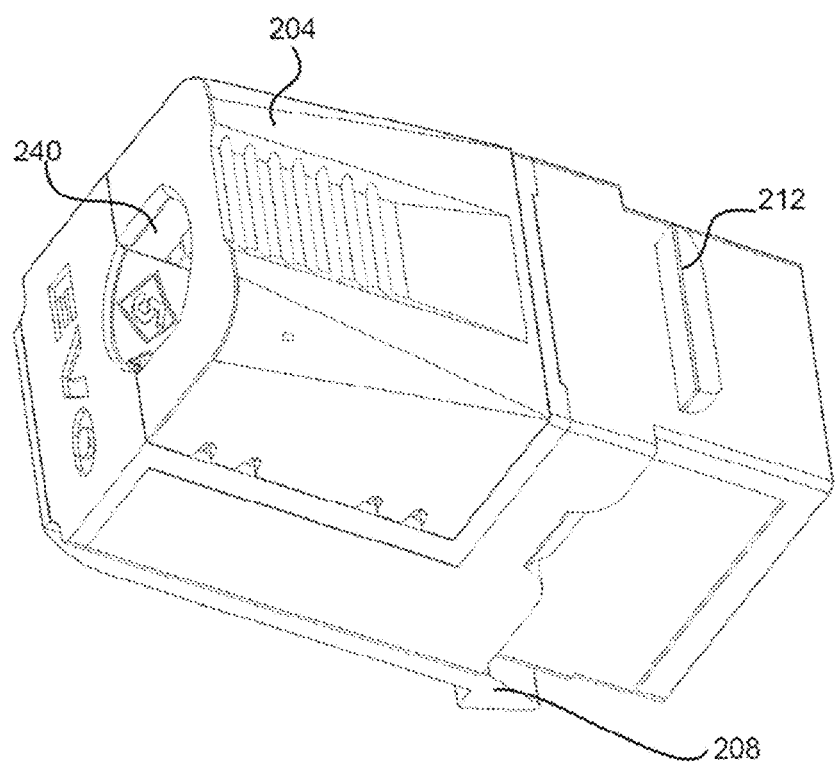
FIG. 2B illustrates a back, lower perspective view of a network cable connector according to one aspect of the present disclosure.
Figure 2C:
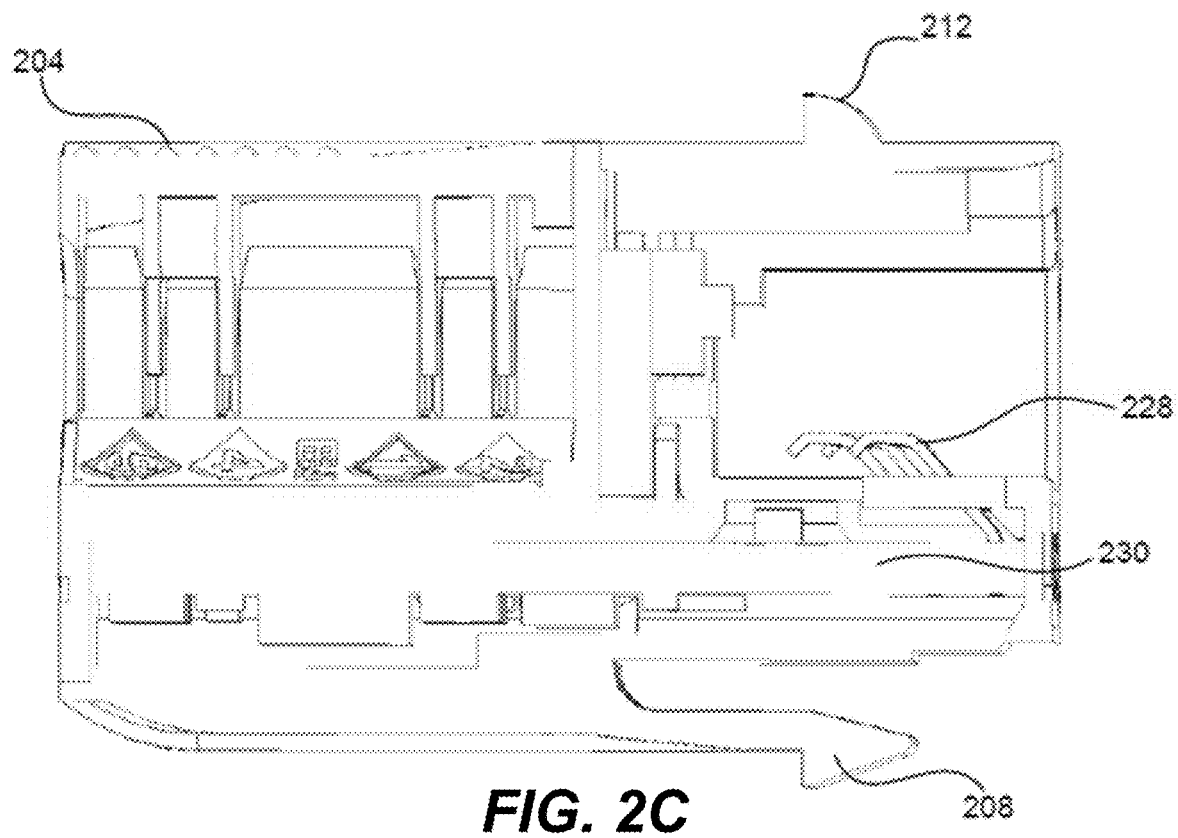
FIG. 2C illustrates a side cross-sectional view of a network cable connector according to one aspect of the present disclosure.
Figure 2D:
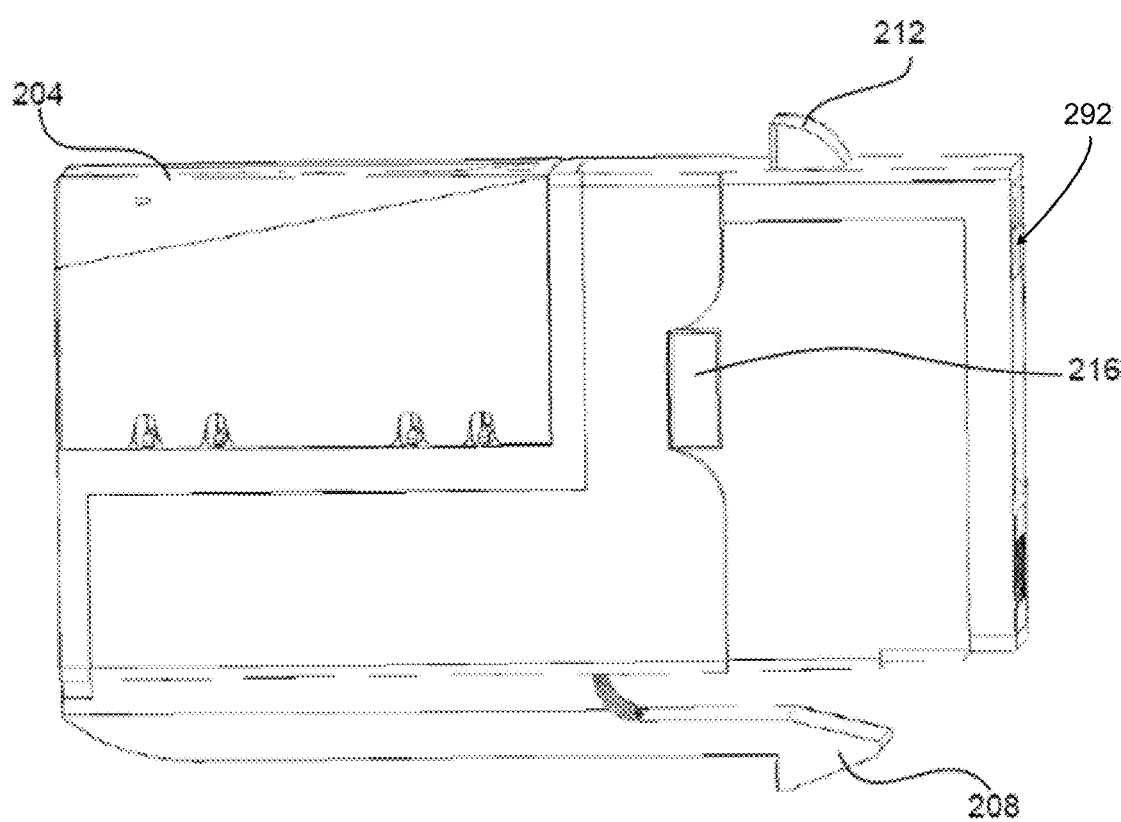
FIG. 2D illustrates a side view of a network cable connector according to one aspect of the present disclosure.
Figure 2E:
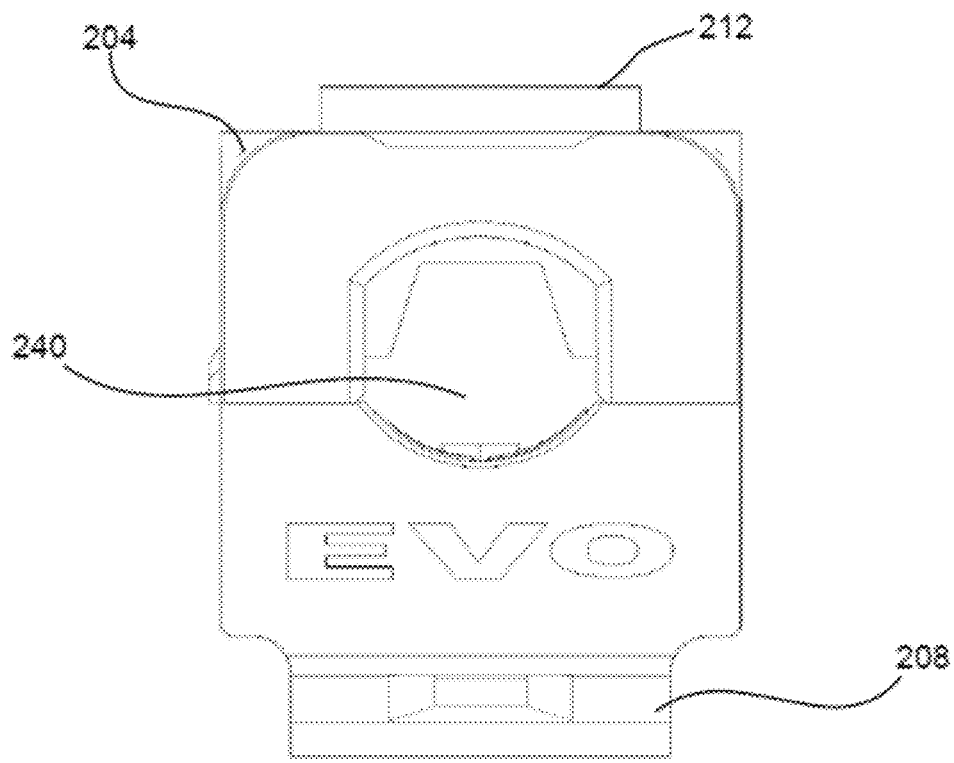
FIG. 2E illustrates a back view of a network cable connector according to one aspect of the present disclosure.
Figure 2F:
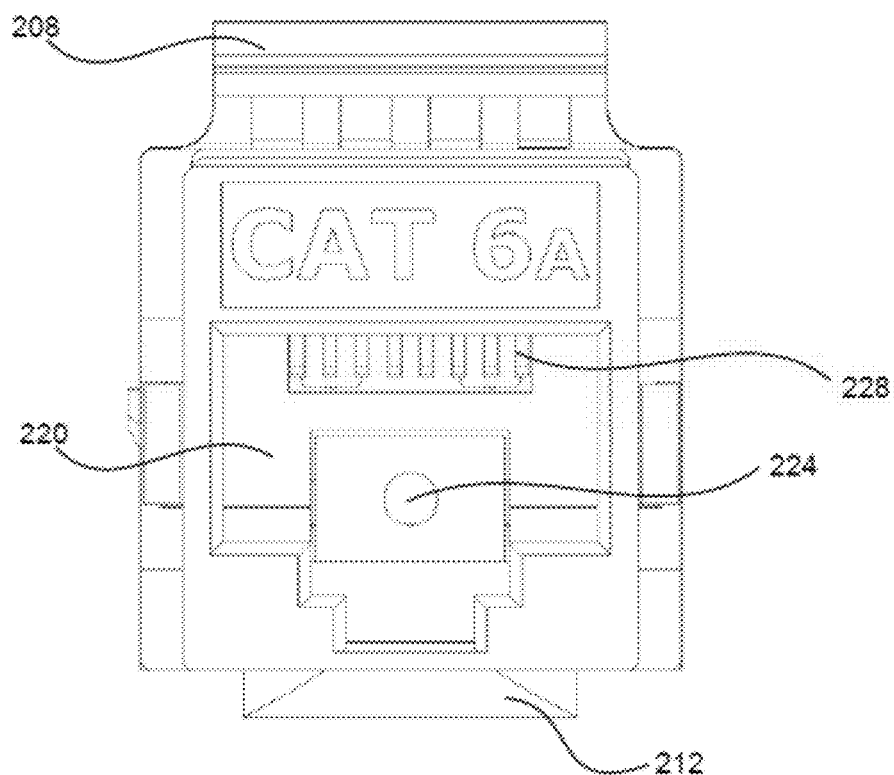
FIG. 2F illustrates a front view of a network cable connector according to one aspect of the present disclosure.
Figure 2G:
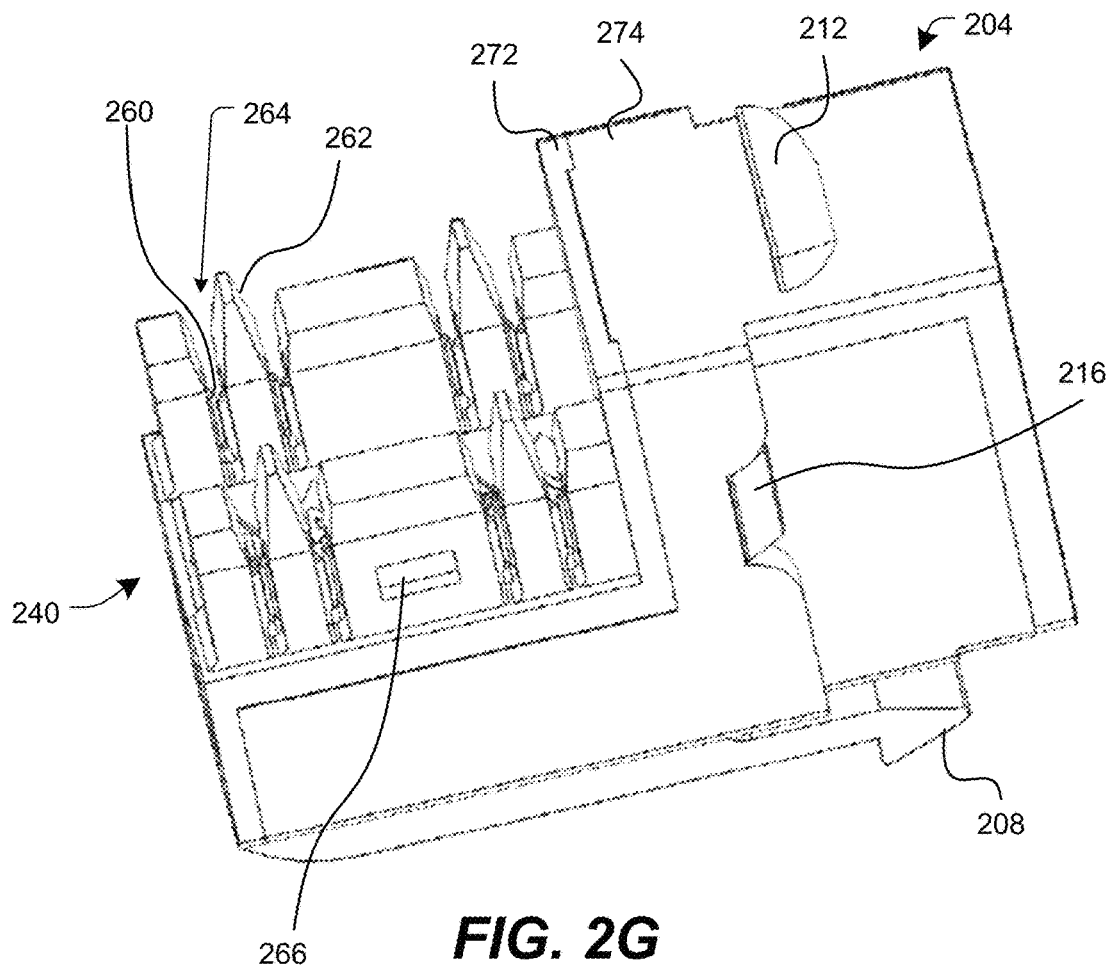
FIG. 2G illustrates a cross-section of a side, upper perspective view of network cable connector without a portion of the hood according to one aspect of the present disclosure.
Figure 2H:
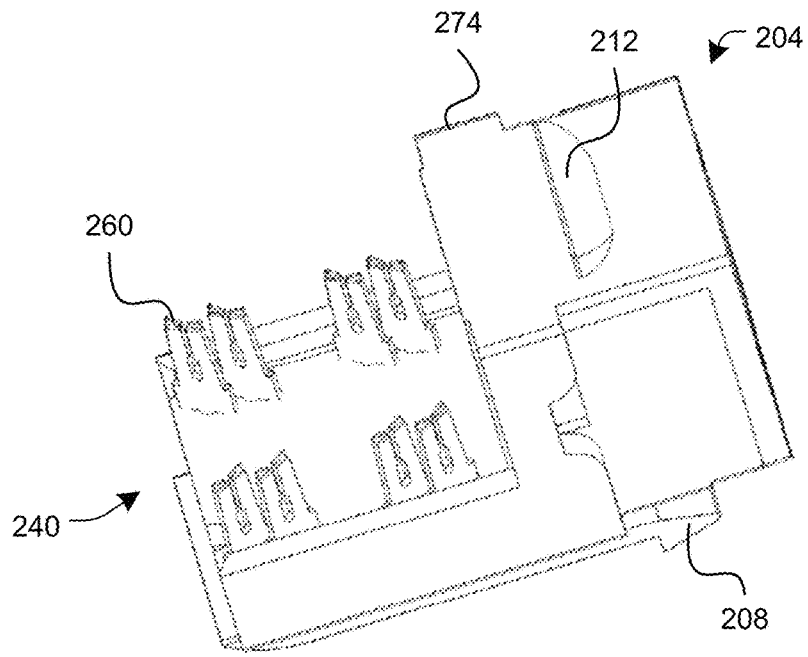
FIG. 2H illustrates a cross-section of a side, upper perspective view of a network cable connector without portions of the hood according to one aspect of the present disclosure.
Figure 2I:
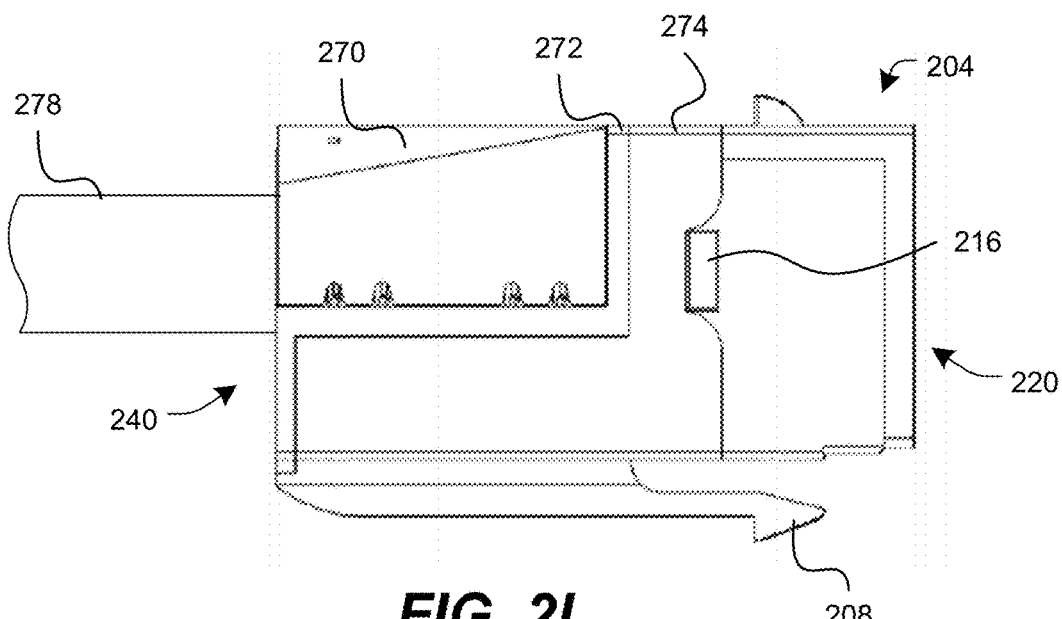
FIG. 2I illustrates a cross-section of a side view of a network cable connector that is coupled to a network cable according to one aspect of the present disclosure.
Figure 2J:
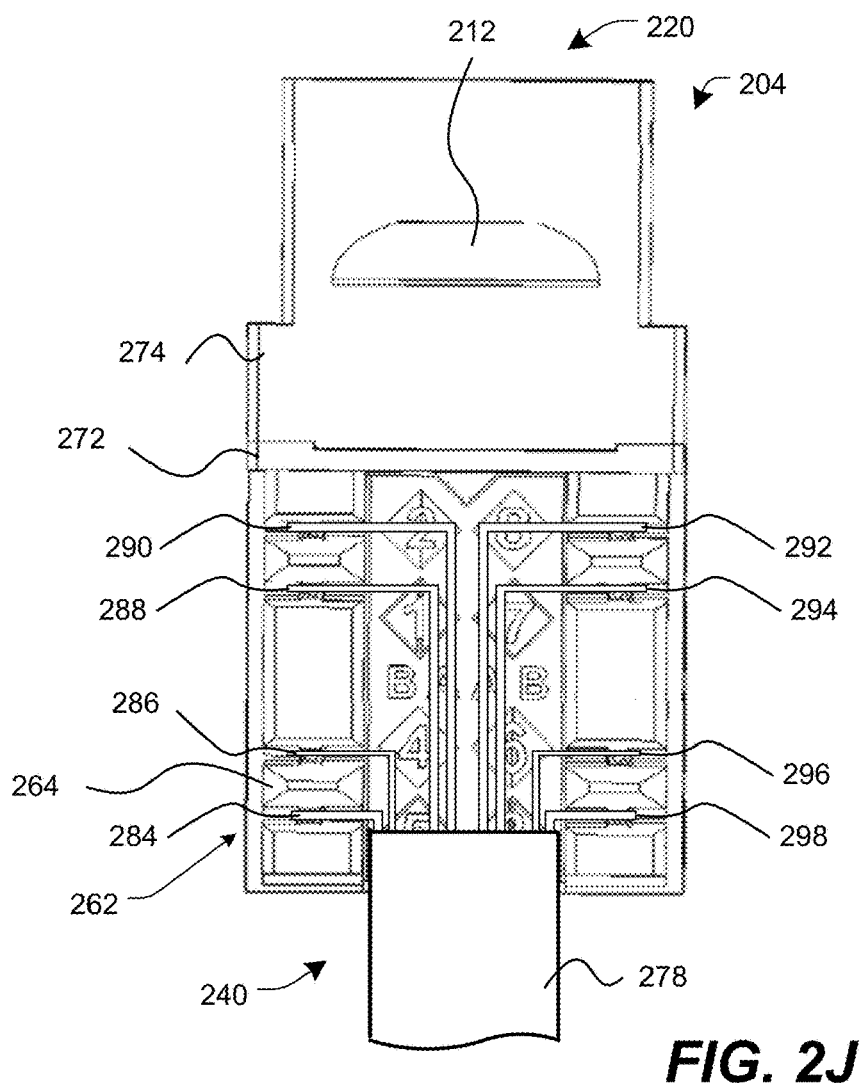
FIG. 2J illustrates a cross-section of a top view of a network cable connector without a portion of the hood and that is coupled to a network cable according to one aspect of the present disclosure.

FIGS. 2A-2F each show a different view of an example of a network cable connector 200. FIG. 2A illustrates a front, upper perspective view, FIG. 2B illustrates a back, lower perspective view, FIG. 2C illustrates a side cross-sectional view, FIG. 2D illustrates a side view, FIG. 2E illustrates a back view, FIG. 2F illustrates a front view, FIG. 2G illustrates side, upper perspective view, FIG. 2H illustrates a side, upper perspective view, FIG. 2I illustrates a side view, and FIG. 2J illustrates a top view. Network cable connector 200 may be used in the networked environment of FIG. 1 or other similar networked environment. For example, network cable connector 200 may include or correspond to 150, 160, 170, 190, 192 of FIG. 1.

As depicted in FIGS. 2A-2J, network cable connector 200 includes a hood 204 (e.g., a housing) with a first opening 220 and a second opening 240 deposed on two sides of network cable connector 200. First opening 220 may be configured to receive a plug, such as a network cable plug. Second opening 240 may be configured to receive a network cable, which may connect network cable connector 200 to another device, such as an external power source, another network device, etc. Thus, network cable connector 200 may be configured to connect one device to another, like cable connectors 150, 160 on panel 120 or hubs 112, 116 described in FIG. 1. In some implementations, network cable connector 200 may include or correspond to a keystone jack.

In some embodiments, network cable connector 200 may also be configured as a wall jack (e.g., receptacle). For example, network cable connector 200 may be attached to a plate, such as a wall plate (e.g., 194). Network cable connector 200 may include a clip 208 configured to lock the connector when inserted into a wall plate or other devices, such as a hub, a router, a panel, etc. Network cable connector 200 may further include one or more side latches 216 to secure the connector to another device, such as a wall plate, a panel, a hub, etc. and/or to couple portions of hood 204. Additionally, or alternatively, network cable connector 200 may be connected to a power over Ethernet (POE) powered device (PD) through first opening 220 and to a power sourcing equipment (PSE) through second opening 240, such that the PD may request power from PSE over Ethernet cables.

A circuit 230 (e.g., a printed circuit), as shown in FIG. 2C, may be housed in hood 204 of network cable connector 200. Printed circuit 230 may have a similar layout, circuitry, and/or functionality as printed circuit 500 shown and described with reference to FIG. 5 or a printed circuit 1400 as shown and described with reference to FIG. 14. For example, printed circuit 230 can be configured to receive energy (e.g., 182) from and communicate data (e.g., 184) with a mobile device (e.g., 102). Circuit 230 (e.g., a printed circuit) may include a flex circuit and/or a circuit included in a printed circuit board. In a particular implementation, printed circuit 230 includes a flexible circuit or flex circuit that is affixed to and/or molded into hood 204.

An array of contact pins 228 may be coupled to printed circuit 230 and configured to be connected to a plug received via opening 220. In some embodiments, contact pins 228 may include 8 pins, making network cable connector 200 compatible with 8P8C connector interfaces, such as RJ-45, RJ-48, or RJ-61 interfaces. In some embodiments, contact pins 228 may include 10 pins, making connector 200 compatible for 10P10C connector interfaces, such as RJ-50 interfaces.

Connector 200 may also include a switch 224 incorporated into hood 204. As shown, switch 224 is exposed to first opening 220. In some embodiments, switch 224 may be configured to be easily detached from hood 204 and replaced. For example, switch 224 may be a modular component (having electrical contacts) that can be physically coupled and decoupled to hood 204 (having corresponding electrical contacts). Switch 224 may include any type of switch, such as a wirelessly operated switch, a push button switch, a toggle switch, a manual switch, a magnetic switch, an electromechanical switch, etc., as illustrative non-limiting examples. In implementations in which switch 224 is a wirelessly operated switch, operation of switch 224 may be controlled via an infrared signal, a wireless protocol signal (e.g., infrared, Bluetooth, Zigbee, etc.). Additionally, in implementations in which switch 224 is a wirelessly operated switch, printed circuit 230 may include wireless communication/control circuitry.

Switch 224 may be coupled to printed circuit 230 and configured to connect one or more components of printed circuit 230 to another device, or disconnect such one or more components from the device. Switch 224 may be manually operated by pressing, for example, pressed with a finger or pressed with a plug when the plug is inserted into first opening 220. The connecting and/or disconnecting of one or more components of the printed circuit via the operation of switch 224 is similar to the operation of switch 1432 in FIG. 14 described below. In some implementations, switch 224 may be positioned on hood 204 outside of first opening. To illustrate, switch 224 may be located on surface 292 of hood 204. In such an implementation, switch 224 may be manually actuated during insertion of a plug, via first opening 220, into network cable connector 200.

Network cable connector 200 may include a display 212 integrated into hood 204 and coupled to printed circuit 230. In some embodiments, display 212 may be configured to be easily detached from hood 204 and replaced. Display 212 may be a light emitting diode (LED) display, an alphanumeric display, or the like. Display 212 may be configured to display information relevant to network cable connector 200, such as connector operating status, IP address, MAC address, power status, type of equipment coupled to connector 200, location of a far end device, connector security settings, security lock-out status, etc. The information may be obtained by printed circuit 230 and then transmitted to display 212. In some implementations, display 212 may be positioned on surface 292 of hood 204. In a particular implementation, both display 212 and switch 224 are positioned on surface 292. In yet another implementation, display 212 and switch 224 may be configured such that switch is actuated by touching or pressing display 212.

Referring at least to FIGS. 2G-2J, hood 204 includes multiple portions, such as a first portion 270, a second portion 272, and a third portion 274. Each of which is coupled together to form hood 204. As shown, second portion 272 includes one or more side latches 216 that are configured to engage third portion 274 to couple second portion 272 and third portion 274. First portion 270 may be coupled to or otherwise engaged with second portion 272, third portion 274, or both. As shown, second portion 727 includes a recess 266 configured to receive and engage a tab (or protrusion) of first portion 270 to couple first portion 270 to second portion 272.

Referring to FIG. 2G in which first portion 270 has been omitted and FIG. 2H in which first and second portions 270, 272 have been omitted, network cable connector 200 includes connectors 260 (e.g., clips) and dividers 262. Dividers 262 separate connectors 260 and define slots 264 configured to receive wires (e.g., conductors) of a network cable coupled to network cable connector 200 via second opening 240, as described at least with reference to FIGS. 2I-2J. Each connector 260 may be configured to be electrically coupled to and secure a corresponding wire of a network cable. In some implementations, connectors 260 may be configured such that when an insulated wire is inserted into a connector, the connector cuts/breaks the insulation of the wire and makes physical contact with a conductor of the insulated wire. In such implementations, an end of the insulated wire does not need to be prepared to remove a portion of the insulation to expose the conductor prior to inserting the insulated wire (e.g., the conductor) in slot 264. In some implementations, dividers 262 are included in second portion 272 and are configured to provide a non-conductive barrier between adjacent (e.g., neighboring) connectors 260. As shown, network cable connector 200 includes 8 connectors 260. Alternatively, in other implementations, network cable connector 200 may include more than 8 connectors or fewer than 8 connectors.

Referring to FIGS. 2I and 2J, a network cable 278 is coupled to network cable connector 200 via second opening 240. Network cable 278 may include or correspond to a network cable of FIG. 1, such as network cable 178. As shown in FIG. 2J, network cable 278 includes 8 wires 284-298. Each of the wires 284-298 is coupled to a different connector 260 of network cable 200. In some implementations, at least one of the wires 284-298 is configured to communicate power.

Figure 3A:
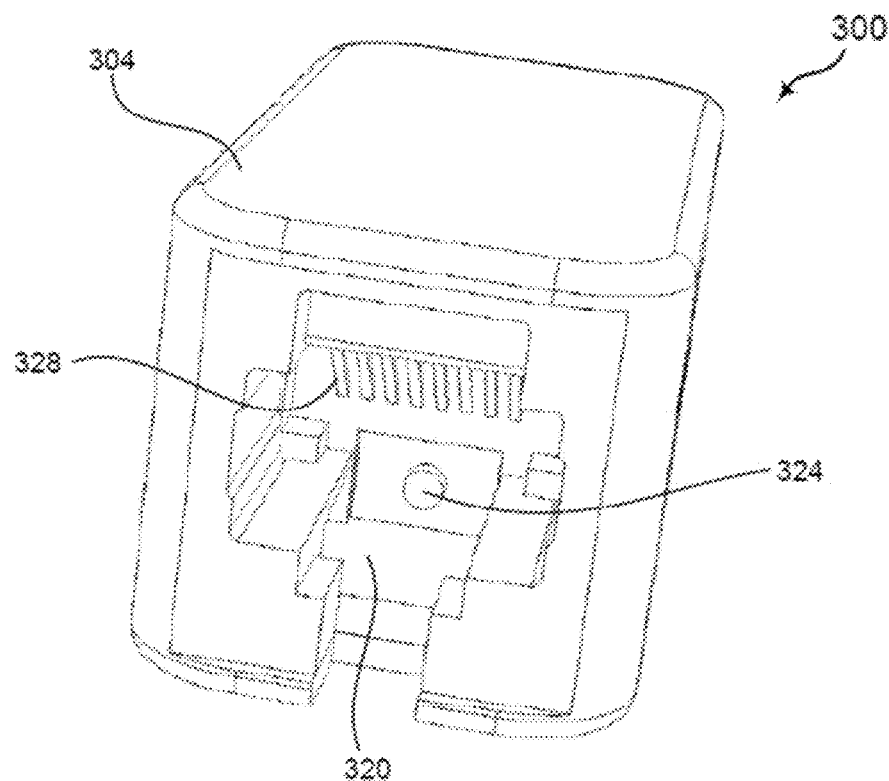
FIG. 3A illustrates a front, upper perspective view of a network cable connector according to one aspect of the present disclosure.
Figure 3B:
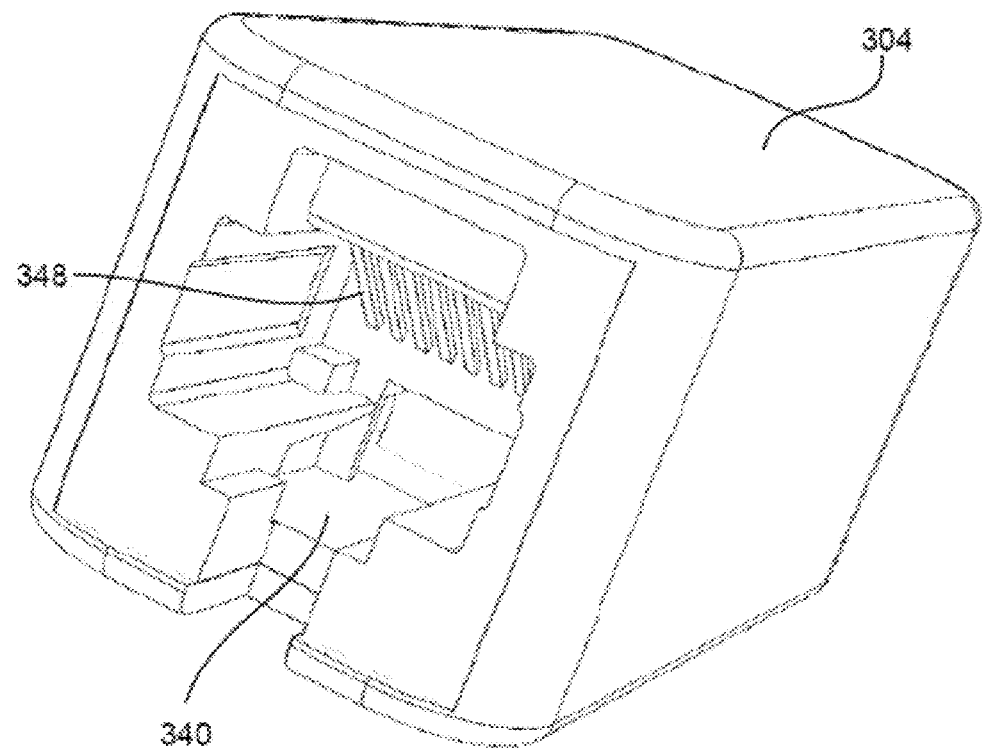
FIG. 3B illustrates a back, lower perspective view of a network cable connector according to one aspect of the present disclosure.
Figure 3C:
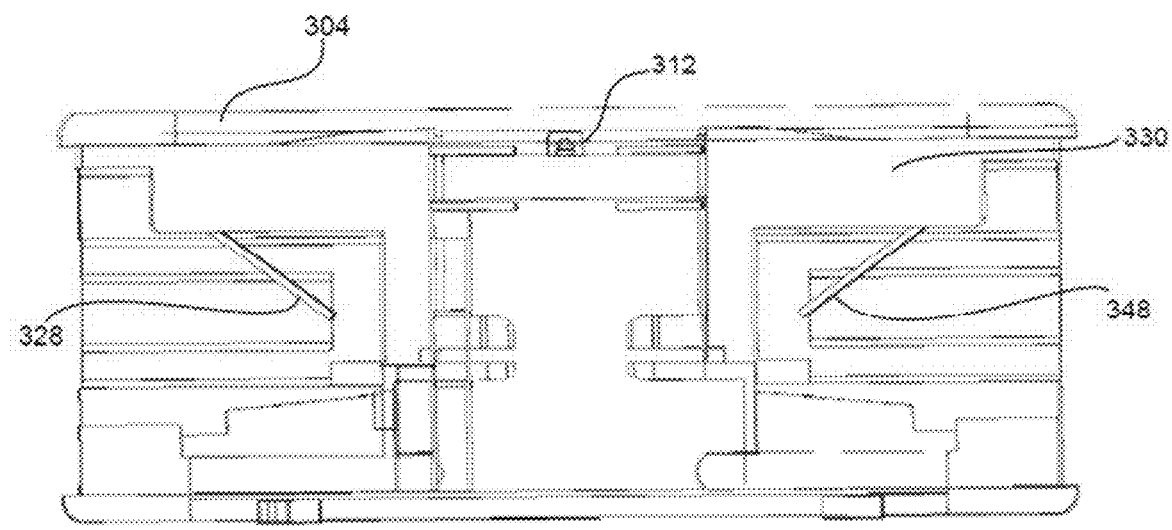
FIG. 3C illustrates a side cross-sectional view of a network cable connector according to one aspect of the present disclosure.
Figure 3D:
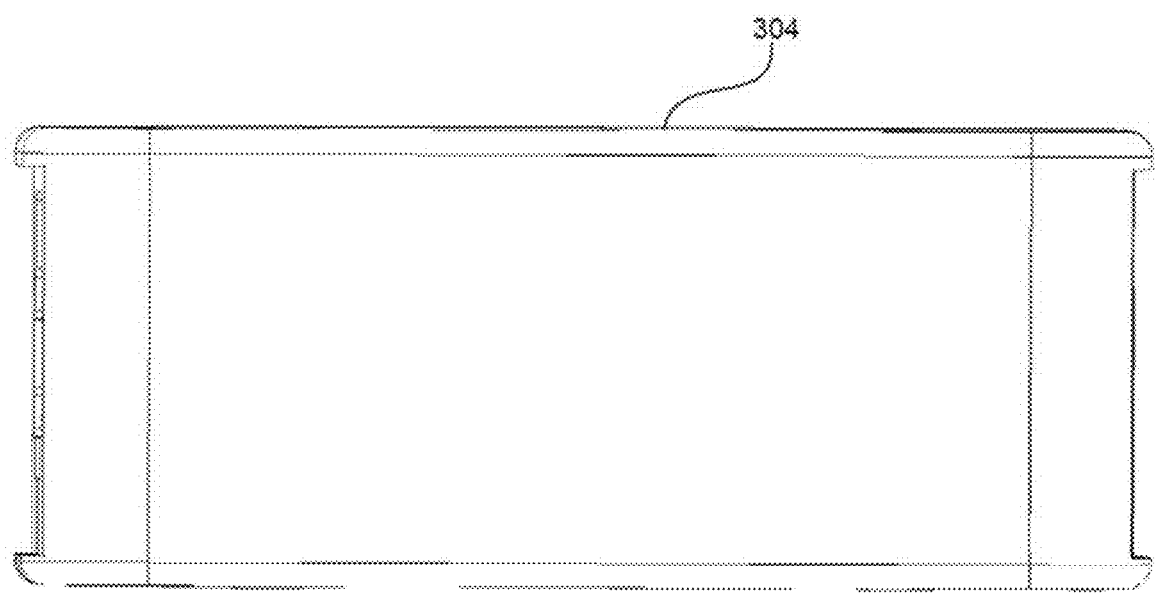
FIG. 3D illustrates a side view of a network cable connector according to one aspect of the present disclosure.
Figure 3E:
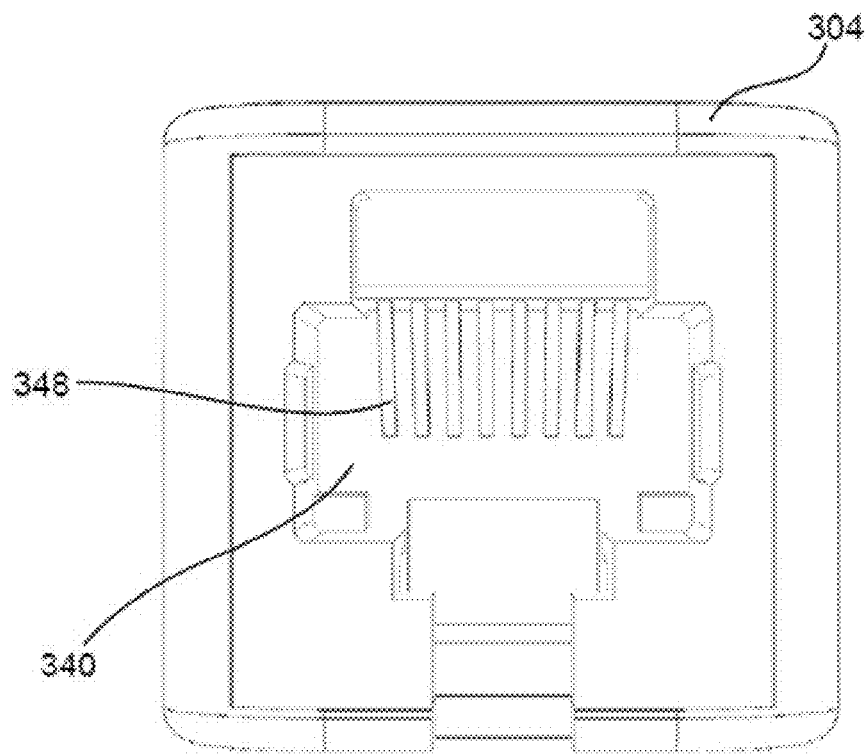
FIG. 3E illustrates a back view of a network cable connector according to one aspect of the present disclosure.
Figure 3F:
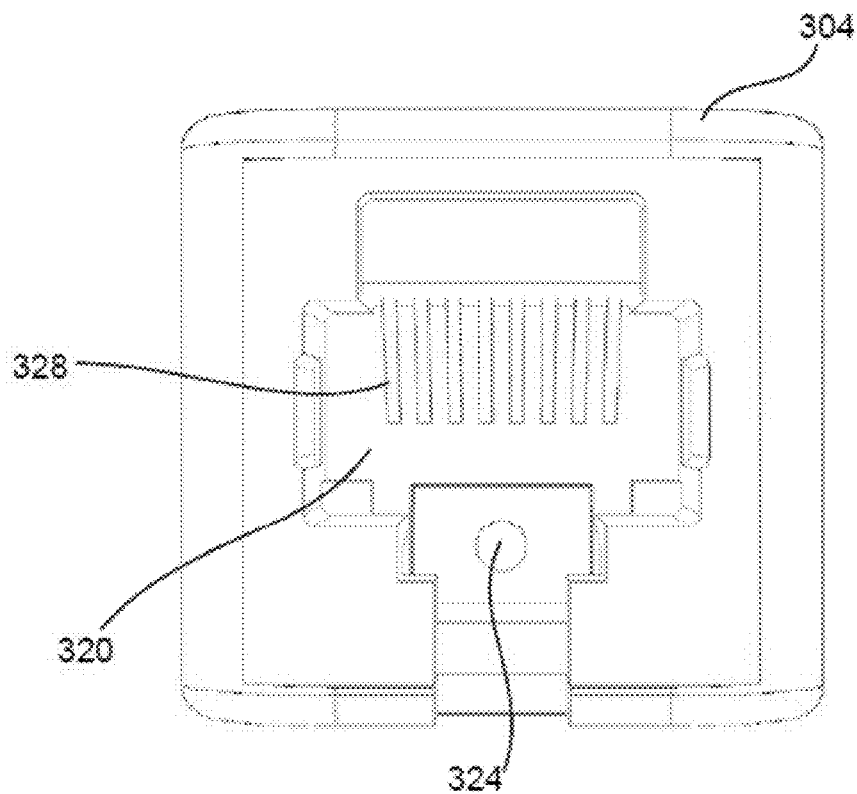
FIG. 3F illustrates a front view of a network cable connector according to one aspect of the present disclosure.
Figure 3G:
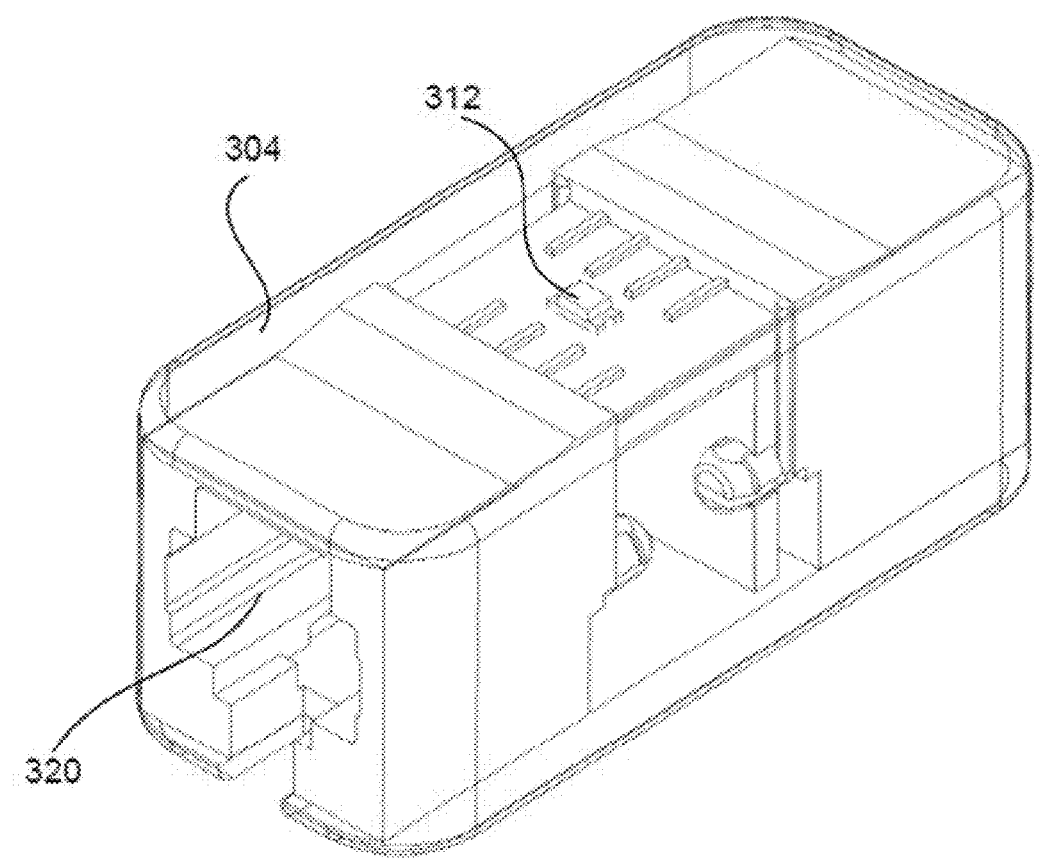
FIG. 3G illustrates a front, upper cross-sectional view of a network cable connector according to one aspect of the present disclosure.

FIGS. 3A-3G depict an embodiment of a network cable connector 300 that may be used in the networked environment of FIG. 1 or other similar networked environment. FIGS. 3A-3G each illustrates a different view of network cable connector 300. FIG. 3A illustrates a front, upper perspective view, FIG. 3B illustrates a back, lower perspective view, FIG. 3C illustrates a side cross-sectional view, FIG. 3D illustrates a side view, FIG. 3E illustrates a back view, FIG. 3F illustrates a front view, and FIG. 3G illustrates a front, upper cross-sectional view. As shown, network cable connector 300 is configured as a coupler to couple two network cables. For example, network cable connector 200 may include or correspond to network cable connector 190 or 192 of FIG. 1.

As depicted in FIGS. 3A-3G, network cable connector 300 includes a hood 304 (e.g., a housing) with a first opening 320 and a second opening 340 deposed on two sides of network cable connector 300. Although first opening 320 and second opening 340 are shown as being on opposite sides of network cable connector 300, in other implementations, first opening 320 and second opening 340 may be positioned on adjacent sides or the same side of network cable connector 300.

First opening 320 and second opening 340 may each be configured to receive a plug, such as a network cable plug. A first array of contact pins 328 and a second array of contact pins 348 may be coupled to two different sides of printed circuit 330. First contact pins 238 may be exposed to first opening 320 and configured to be coupled to a plug inserted into first opening 320. Second contact pins 348 may be exposed to second opening 340 and configured to be coupled to a plug inserted into second opening 340. In some embodiments, first and contact pins 328, 348 may each include 8 pins, making network cable connector 300 compatible with 8P8C connector interfaces, such as RJ-45, RJ-48, or RJ-61 interfaces. In some embodiments, first and second contact pins 328, 348 may each include 10 pins, making network cable connector 300 compatible for 10P10C connector interfaces, such as RJ-50 interfaces. Thus, network cable connector 300 may configured to connect one device to another, like cable connectors 150, 160 on panel 120 or hubs 112, 116 described in FIG. 1.

Devices connected by network cable connector 300 may be external power sources, networking devices (such as routers, hubs, panels, etc.), computers, printers, storage devices, etc., as illustrative, non-limiting examples. For example, network cable connector 300 may be connected to a POE PD through first opening 320 and to a PSE through second opening 340, such that the PD may request power from PSE over Ethernet cables. In some implementations, first opening 320 may be designated and/or configured to be coupled to PSE and second opening 340 may be designated and/or configured to be coupled to PD. Alternatively, in other implementations, first opening 320 may be designated and/or configured to be coupled to PD and second opening 340 may be designated and/or configured to be coupled to PSE. In a particular implementation, network cable connector 300 is configured such that either of first opening 320 and second opening 340 may be coupled to PSE while the other is coupled to PD.

A printed circuit 330, as shown in FIG. 3C, may be housed in hood 304 of network cable connector 300. Printed circuit 330 may have a similar layout, circuitry, and/or functionality as printed circuit 500 shown and described with reference to FIG. 5 or a printed circuit 1400 as shown and described with reference to FIG. 14. For example, printed circuit 330 can be configured to receive energy (e.g., 182) from and communicate data (e.g., 184) with a mobile device (e.g., 102). Printed circuit 330 may include a flex circuit and/or may be included in a printed circuit board. In a particular implementation, printed circuit 330 includes a flexible circuit or flex circuit that is affixed to and/or molded into hood 304.

Network cable connector 300 may also include a switch 324 incorporated into hood 304. As shown, switch 324 may be exposed to first opening 320. In some embodiments, switch 324 may be configured to be easily detached from hood 304 and replaced. For example, switch 324 may be a modular component (having electrical contacts) that can be physically coupled and decoupled to hood 304 (having corresponding electrical contacts). Switch 324 may include any type of switch, such as a wirelessly operated switch, a push button switch, a toggle switch, a manual switch, an electromechanical switch, etc., as illustrative non-limiting examples. In an implementation where switch 324 is a wirelessly operated switch, printed circuit 330 may include wireless communication/control circuitry.

Switch 324 may be coupled to printed circuit 330 and configured to connect one or more components of the printed circuit to another device, or disconnect such one or more components from the device. Switch 324 may be manually operated by pressing, for example, pressed with a finger or pressed by a plug when the plug is inserted into first opening 320. The connecting and/or disconnecting of one or more components of the printed circuit via the operation of switch 324 is similar to the operation of switch 1432 in FIG. 14 described below. In some implementations, switch 324 may be positioned on hood 304 outside of first opening. To illustrate, switch 324 may be located on surface of hood 304 that corresponds to opening 320 or on another surface of hood 304. In such an implementation, switch 224 may be manually actuated during insertion of a plug, via first opening 320 and/or second opening 340, into network cable connector 300.

In some implementations, network cable connector 300 may include a second switch (not shown) that is incorporated into hood 304. For example, the second switch may be exposed to second opening 340. In some embodiments, second switch may be configured to be easily detached from hood 304 and replaced. For example, second switch may be a modular component (having electrical contacts) that can be physically coupled and decoupled to hood 304 (having corresponding electrical contacts). Second switch may be coupled to printed circuit 330 and configured to connect one or more components of the printed circuit to another device, or disconnect such one or more components from the device. Second switch may be manually operated by pressing, for example, pressed with a finger or pressed by a plug when the plug is inserted into second opening 340. The connecting and/or disconnecting of one or more components of the printed circuit via the operation of second switch is similar to the operation of switch 1432 in FIG. 14 described below.

Network cable connector 300 may include a display 312 integrated into hood 304. In some embodiments, display 312 may be configured to be easily detached from hood 304 and replaced. In the depicted embodiment, display 312 is hidden under a surface of hood 304. Alternatively, display 312 may protrude above a surface of hood 304. Display 312 may be a light emitting diode (LED) display, an alphanumeric display, or the like. Display 312 may be configured to display information relevant to network cable connector 300, such as connector operating status, IP address, MAC address, power status, type of equipment coupled to connector 300, location of a far end device, connector security settings, security lock-out status, etc. The information may be obtained by printed circuit 330 and then transmitted to display 312. When display 312 is hidden under a surface of hood 304, the displayed information may be indicated by an on/off status, a color, a blinking pattern, or the like of display 312. Although network cable connector 300 is shown as having a single display 312, in other implementations, network cable connector 300 may include multiple displays.

Figure 4A:
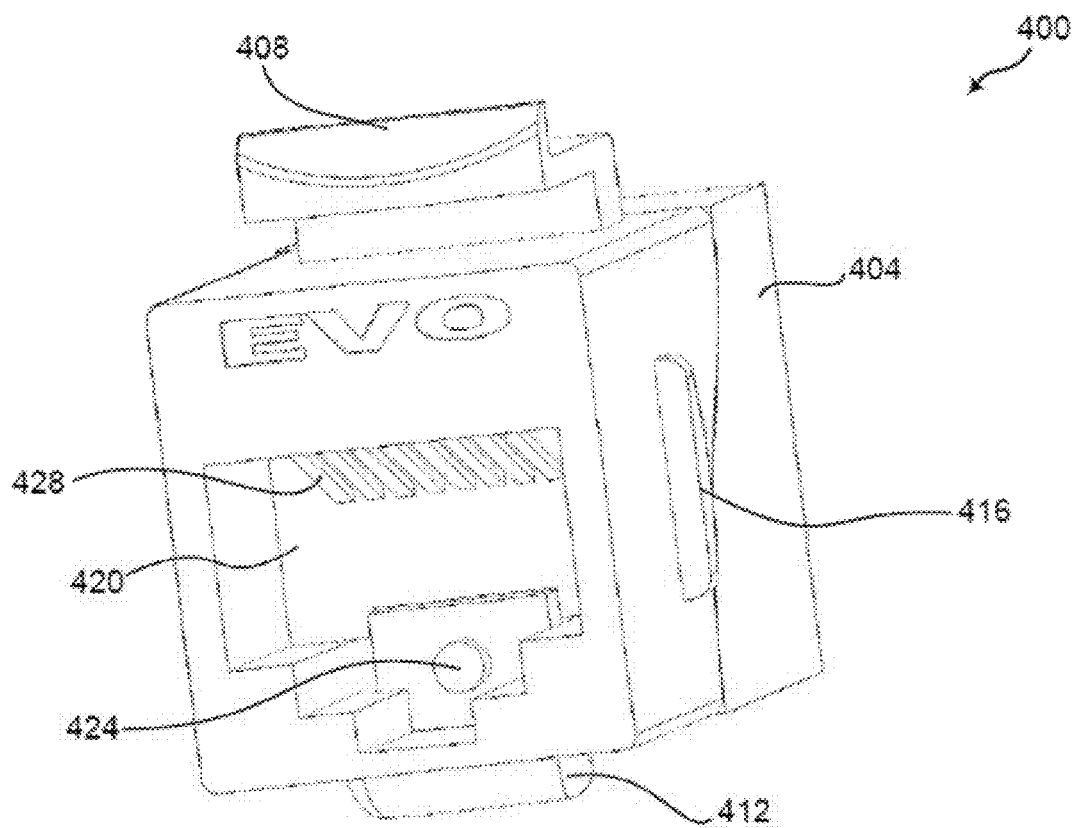
FIG. 4A illustrates a front, upper perspective view of a network cable connector according to one aspect of the present disclosure.
Figure 4B:
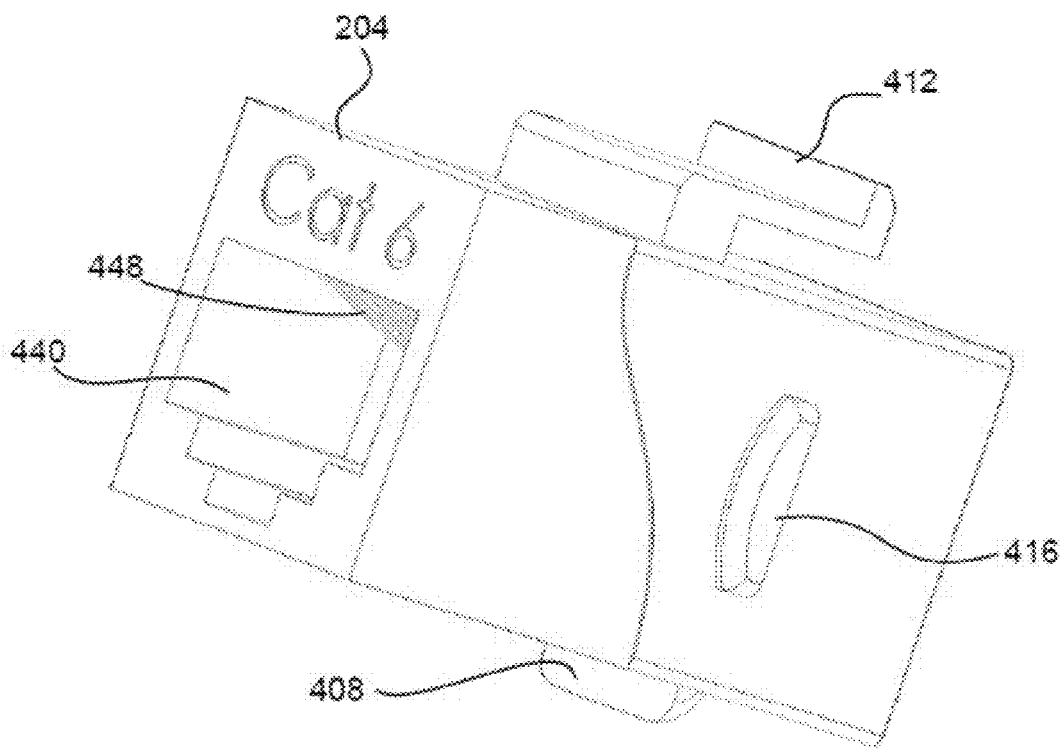
FIG. 4B illustrates a back, lower perspective view of a network cable connector according to one aspect of the present disclosure.
Figure 4C:
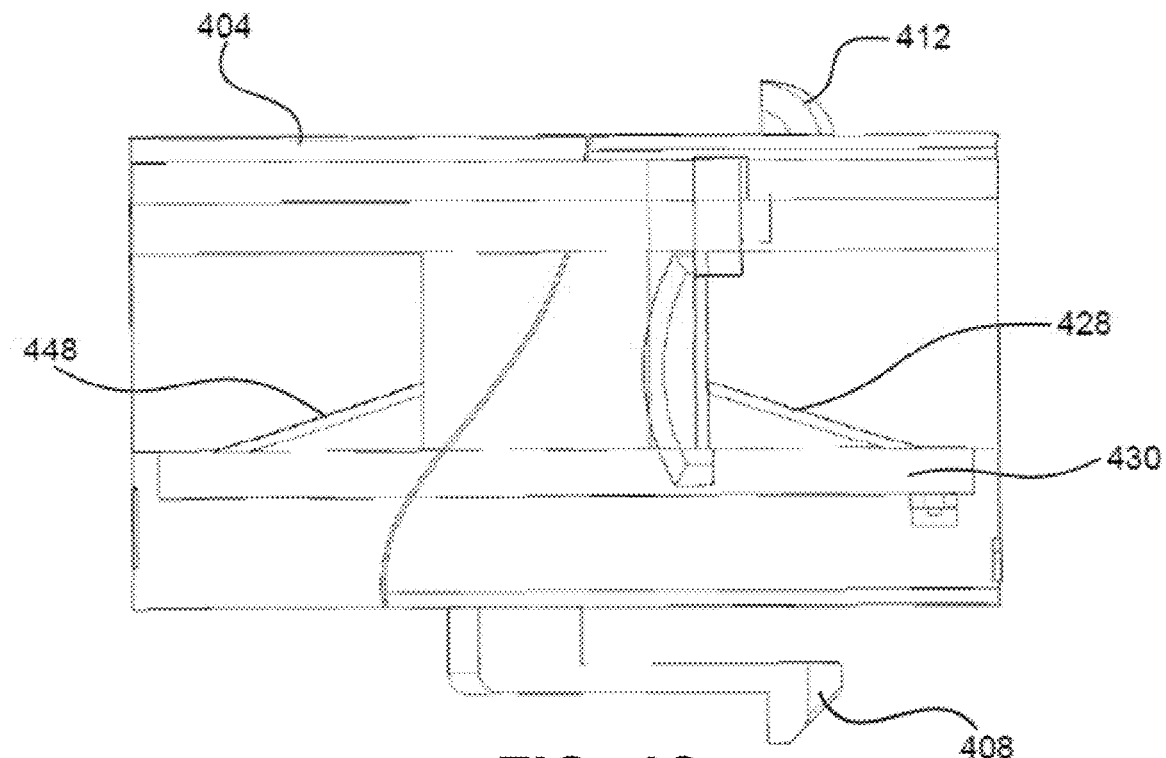
FIG. 4C illustrates a side cross-sectional view of a network cable connector according to one aspect of the present disclosure.
Figure 4D:
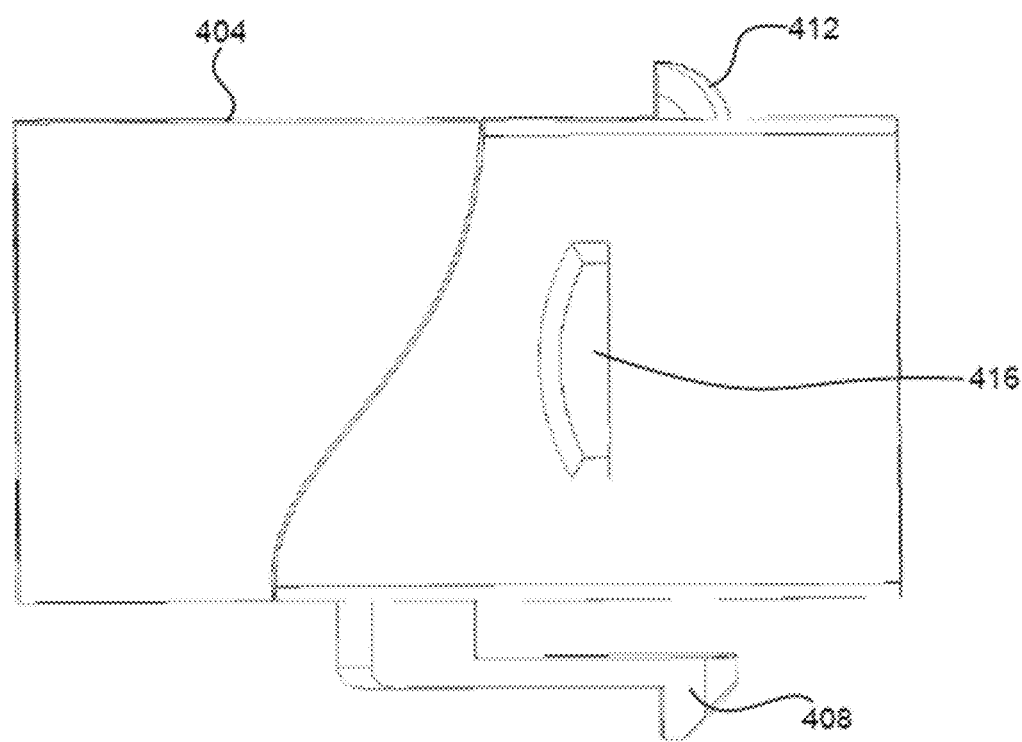
FIG. 4D illustrates a side view of a network cable connector according to one aspect of the present disclosure.
Figure 4E:
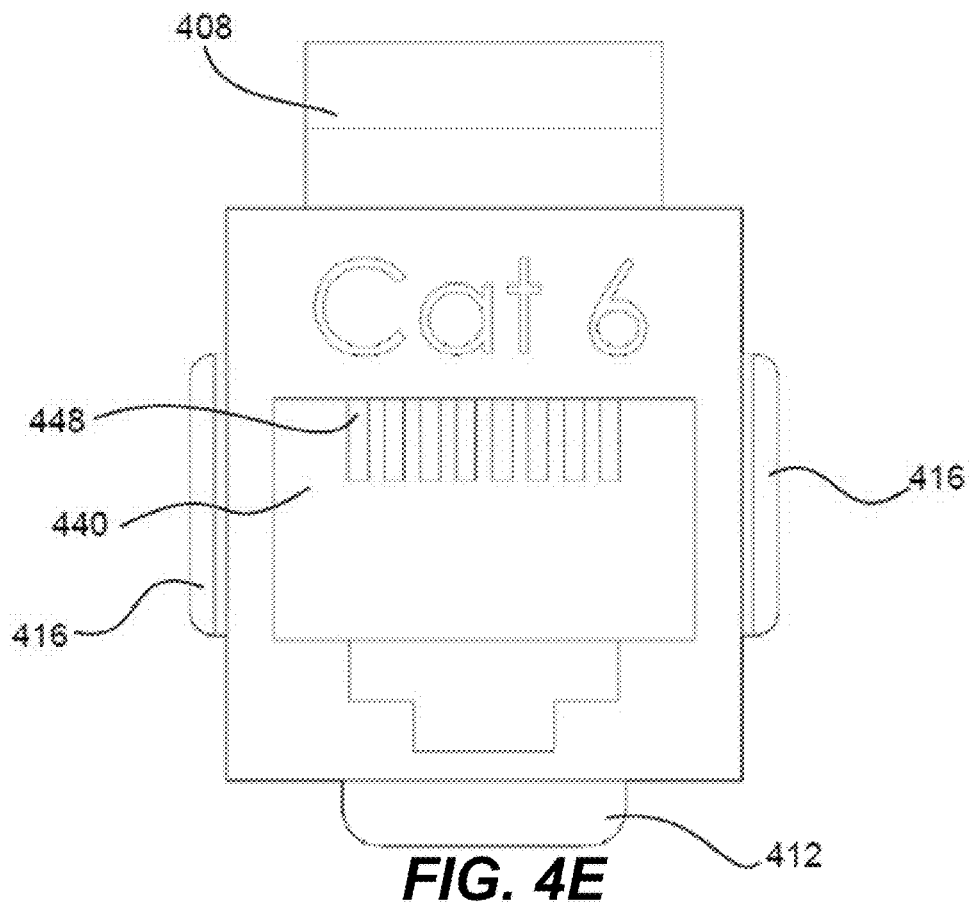
FIG. 4E illustrates a back view of a network cable connector according to one aspect of the present disclosure.
Figure 4F:
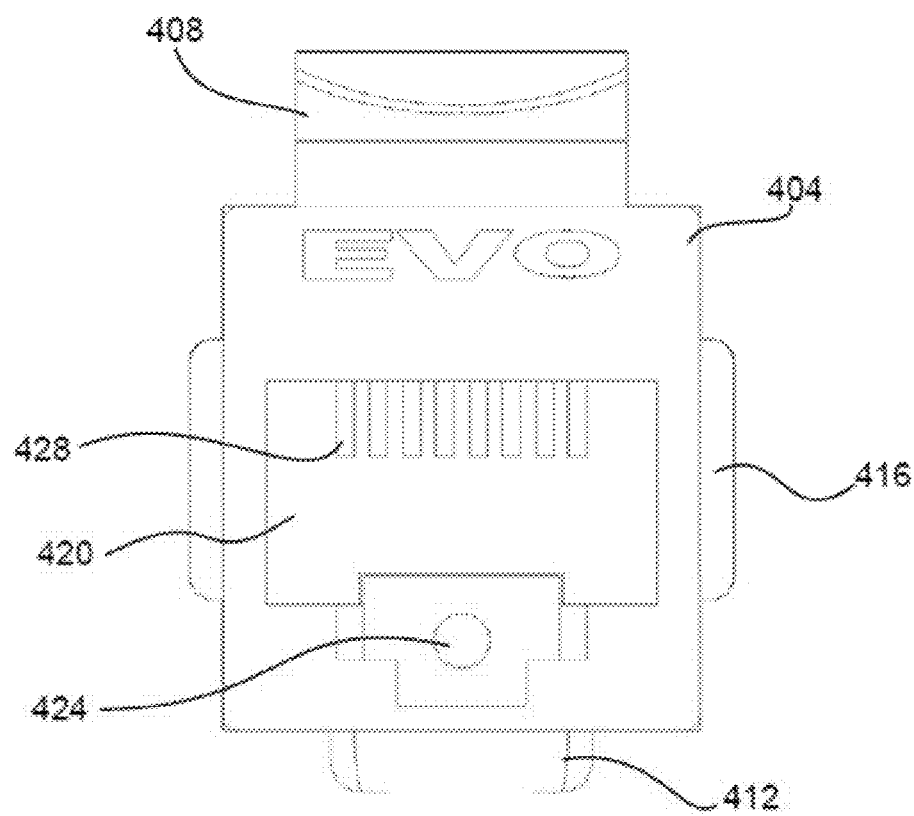
FIG. 4F illustrates a front view of a network cable connector according to one aspect of the present disclosure.

FIGS. 4A-4F depict an embodiment of a network cable connector 400 that may be used in the networked environment of FIG. 1 or other similar networked environment. FIGS. 4A-4F each illustrates a different view of network cable connector 400. FIG. 4A illustrates a front, upper perspective view, FIG. 4B illustrates a back, lower perspective view, FIG. 4C illustrates a side cross-sectional view, FIG. 4D illustrates a side view, FIG. 4E illustrates a back view, and FIG. 4F illustrates a front view. As shown, network cable connector 400 is configured as a coupler to couple two network cables. For example, network cable connector 400 may include or correspond to network cable connector 150, 160, 170, 190 or 192 of FIG. 1.

As depicted in FIGS. 4A-4F, connector 400 includes a hood 404 (e.g., housing) with a first opening 420 and a second opening 440 deposed on two sides connector 400. Although first opening 420 and second opening 440 are shown as being on opposite sides of network cable connector 400, in other implementations, first opening 420 and second opening 440 may be positioned on adjacent sides or the same side of network cable connector 400. In some implementations, network cable connector 400 may include or correspond to a keystone coupler.

First opening 420 and second opening 440 may each be configured to receive a plug, such as a network cable plug. A first array of contact pins 428 and a second array of contact pins 448 may be coupled to two different sides of printed circuit 430. First contact pins 438 may be exposed to first opening 420 and configured to be coupled to a plug inserted into first opening 420. Second contact pins 448 may be exposed to second opening 440 and configured to be coupled to a plug inserted into second opening 440. In some embodiments, first and contact pins 328, 348 may each include 8 pins, making network cable connector 400 compatible with 8P8C connector interfaces, such as RJ-45, RJ-48, or RJ-61 interfaces. In some embodiments, first and second contact pins 428, 448 may each include 10 pins, making network cable connector 400 compatible for 10P10C connector interfaces, such as RJ-50 interfaces. Thus, network cable connector 400 may configured to connect one device to another, like cable connectors 150, 160 on panel 120 or hubs 112, 116 described in FIG. 1.

Devices connected by network cable connector 400 may be external power sources, networking devices (such as routers, hubs, panels, etc.), computers, printers, storage devices, etc., as illustrative, non-limiting examples. For example, network cable connector 300 may be connected to a POE PD through first opening 420 and to a PSE through second opening 440, such that the PD may request power from PSE over Ethernet cables. In some implementations, first opening 420 may be designated and/or configured to be coupled to PSE and second opening 440 may be designated and/or configured to be coupled to PD. Alternatively, in other implementations, first opening 420 may be designated and/or configured to be coupled to PD and second opening 440 may be designated and/or configured to be coupled to PSE. In a particular implementation, network cable connector 400 is configured such that either of first opening 420 and second opening 440 may be coupled to PSE while the other is coupled to PD.

In some embodiments, network cable connector 400 may be configured as a wall jack (e.g., receptacle). For example, network cable connector 400 may be attached to a plate (e.g., 194). Network cable connector 400 may include a clip 408 configured to lock the connector when inserted into a wall plate or other devices, such as a hub, a router, a panel, etc. Network cable connector 400 may further include one or more side latches 416 to secure the connector to another device, such as a wall plate, a panel, a hub, etc.

A printed circuit 430, as shown in FIG. 4C, may be housed in hood 404 of network cable connector 400. Printed circuit 430 may have a similar layout, circuitry, and/or functionality as printed circuit 500 shown and described with reference to FIG. 5 or a printed circuit 1400 as shown and described with reference to FIG. 14. For example, printed circuit 430 can be configured to receive energy (e.g., 182) from and communicate data (e.g., 184) with a mobile device (e.g., 102). Printed circuit 430 may include a flex circuit and/or may be included in a printed circuit board. In a particular implementation, printed circuit 430 includes a flexible circuit or flex circuit that is affixed to and/or molded into hood 404.

Network cable connector 400 may also include a switch 424 incorporated into hood 404. As shown, switch 424 may be exposed to first opening 420. In some embodiments, switch 424 may be configured to be easily detached from hood 404 and replaced. For example, switch 424 may be a modular component (having electrical contacts) that can be physically coupled and decoupled to hood 204 (having corresponding electrical contacts). Switch 424 may include any type of switch, such as a wirelessly operated switch, a push button switch, a toggle switch, a manual switch, an electromechanical switch, etc., as illustrative non-limiting examples. In an implementation where switch 424 is a wirelessly operated switch, printed circuit 430 may include wireless communication/control circuitry.

Switch 424 may be coupled to printed circuit 430 and configured to connect one or more components of printed circuit 430 to another device, or disconnect such one or more components from the device. Switch 424 may be manually operated by pressing, for example, pressed with a finger or pressed by a plug when the plug is inserted into first opening 420. The connecting and/or disconnecting of one or more components of the printed circuit via the operation of switch 424 is similar to the operation of switch 1432 in FIG. 14 described below. In some implementations, switch 224 may be positioned on hood 204 outside of first opening. To illustrate, switch 224 may be located on surface 292 of hood 204. In such an implementation, switch 224 may be manually actuated during insertion of a plug, via first opening 220, into network cable connector 200.

Network cable connector 400 may include a display 412 integrated into hood 404 and coupled to printed circuit 430. In some embodiments, display 412 may be configured to be easily detached from hood 404 and replaced. Display 412 may be a light emitting diode (LED) display, an alphanumeric display, or the like. Display 412 may be configured to display information relevant to network cable connector 400, such as connector operating status, IP address, MAC address, power status, type of equipment coupled to connector 400, location of a far end device, connector security settings, security lock-out status, etc. The information may be obtained by printed circuit 430 and then transmitted to display 412. In some implementations, display 212 may be positioned on surface 292 of hood 204. In a particular implementation, both display 212 and switch 224 are positioned on surface 292. In yet another implementation, display 212 and switch 224 may be configured such that switch is actuated by touching or pressing display 212.

Figure 5:
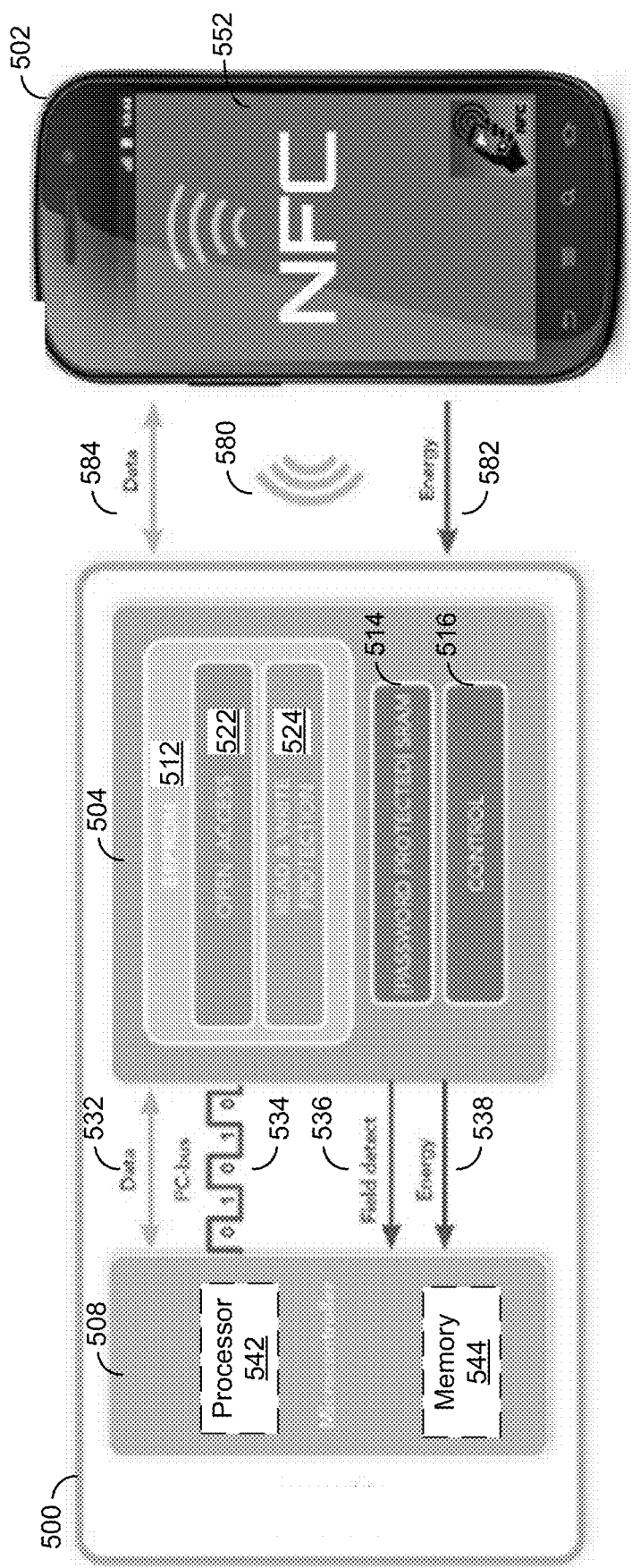
FIG. 5 illustrates a block diagram of a printed circuit for network cable connector according to one aspect of the present disclosure.

FIG. 5 illustrates a block diagram showing some components of printed circuit 500, which may be used in network cable connectors 200, 300, 400 described above in connection with FIGS. 2A-2F, 3A-3G, 4A-4F and network cable connectors described further herein at least with reference to FIGS. 10A-10B, 11A-11B, and 12A-12B. Printed circuit 500 may include a flex circuit and/or may be included in a printed circuit board. A flex circuit (e.g., a flexible printed circuit board) may include an insulating polymer film having one or more conductive circuit patterns affixed thereto and may include a coating (e.g., a polymer coating) to protect the conductor circuits. In a particular implementation, printed circuit 500 includes a flexible circuit or flex circuit that is affixed to and/or molded into a hood or plate.

Printed circuit 500 is configured to communicate with mobile device 502. Mobile device 502 may include or correspond to mobile device 102 of FIG. 1. In some implementations, mobile device 502 include an RFID device, such as an RFID reader. In a particular implementation, the RFID device corresponds to an NFC device, such as a NFC reader. In some such implementations, mobile device 502 includes one or more antennas, one or more inductors, or a combination thereof, to transmit data and/or energy to printed circuit 500. For example, mobile device 502 may inductively couple with printed circuit 500 and transmit power (e.g., energy 582) and data 584. To illustrate, an inductor of mobile device 502 generates an electric or magnetic field 580 which causes printed circuit 500 to receive power and/or data signals.

In the depicted embodiment, printed circuit 500 includes controllers 504, 508 connected to each other by a bus 534, such as a PC bus. The controllers 504, 508 are configured to send and receive data 532 from each other via the bus. In other implementations, controllers 504, 508 are integrated into a single controller. Controller 504, 508 may each include one or more processors and one or more memories, such as processor 542 and memory 544. To illustrate, a particular memory stores executable instructions and a particular processor coupled to the memory is configured to execute the instructions to perform and/or initiate one or more operations associated with the network cable connector that includes the printed circuit 500. In other implementations, printed circuit 500 may include one or more other processors, microprocessors, controllers, microcontrollers, and/or ASICs.

In some implementations, controller 504 is configured to detect an electric or magnetic field and harvest energy from the electric or magnetic field. To illustrate, when the electric field generated by the mobile device is adjusted or fluctuates, voltage (and thus current) are induced in an inductor of the printed circuit 500. Additionally, or alternatively, controller 504 is configured to generate and process a data signal from the electric or magnetic field. For example, controller 504 includes filters and/or analog processing circuitry to convert signals from an antenna/inductor to into data (e.g., first data). In some implementations, controller 504 is further configured to transmit data (e.g., second data) to mobile device 502. The data (e.g., second data) transmitted back to the mobile device 502 may be sent responsive to first data sent from the mobile device 502.

In some implementations, controller 508 is configured to receive data (e.g., first data) from controller 504 and to process the data to provide output data (e.g., second data) or adjust settings. For example, the first data may include or correspond to a request for information, and the controller 508 is configured to generate or retrieve the second data and to provide the second data to controller 504 for transmission or display. As another example, the first data may include or correspond to a parameter adjustment command, and the controller 508 is configured to adjust a component of the printed circuit 500 or the networked environment based on the first data. For example, a device can be adjusted by printed circuit 500 coupled to a network cable that is connected to the device. To illustrate, adjusting the operation of the device and/or network cable includes adjusting a security access control, enabling or disabling Internet of Things (IoT) device access, turning off or on service (e.g., POE power), enabling or disabling read and/or write access, enabling or disabling read and/or write controls, or a combination thereof.

In a particular implementation, controller 504 includes an EEPROM 512 and an SRAM 514. For example, EEPROM 512 may include an open access portion 522 and a read/write protection portion 524. EEPROM 512 may be configured to control energy harvesting and/or field detection operations. For example, EEPROM 512 may be coupled to sensing circuitry and output a field detection signal 536 and/or harvest energy signal 538 based on a sense signal from the sensing circuitry. Additionally, or alternatively, the SRAM 514 may be a password protected SRAM 514. In some such implementations, a memory of controller 504 stores instructions configured to interpret and process data signals received from the antenna/inductor. The instructions may be stored in EEPROM 512, SRAM 514, or both.

In some implementations, controller 504 includes control 516 Control 516 is configured to store firmware for implementing application logic or instructions of controller 504. Control 516 may include a command interpreter, anti-collision sequences, arbiter/state registers, a memory interface, etc.

Printed circuit 500 includes an antenna (not shown) coupled to one or more of controllers 504, 508, such as controller 504, and configured to communicate with mobile device 502. In some implementations, the antenna includes or corresponds to an electromagnetic radiation antenna (e.g., a dipole antenna) and is configured to radiate electromagnetic radiation signals. In some such implementations, the antenna is configured to enable Far Field RFID communications. In other implementations, the antenna includes or corresponds to one or more inductors and is configured to inductively/magnetically couple with the mobile device 502 to receive and/or transmit data, and optionally receive power from the mobile device 502. In some such implementations, the antenna is configured to enable Near Field RFID communications, such as NFC type communications.

In some implementations, printed circuit 500 includes a display (not shown) configured to output information. For example, the display may include or correspond to a light emitting diode (LED) or a liquid crystal display (LCD) and is configured to output information about a networked environment (and/or components thereof) that includes the printed circuit 500 or is coupled of the printed circuit 500. In some implementations where the display is an LED, the controllers 504 or 508 may be configured to adjust operation of the LED to output information. For example, the controllers 504 or 508 are configured to cause the LED to blink and indicate a code or status of a component of the networked environment.

In some implementations, printed circuit 500 includes or is coupled to a power supply or a direct current power source. For example, printed circuit 500 can be coupled to a PSE, a PSE POE, coupled to an external battery, include an internal battery, or a combination thereof. Additionally, or alternatively, printed circuit 500 includes a power management unit (not shown) configured to receive the power signal from the inductor(s) and to provide power to one or more components of printed circuit 500. For example, the power management unit is configure to provide power to controllers 504, 508 to enable operation of controllers 504, 508, such as processing of data signals, transmission of data, etc.

In some implementations, the power management unit includes a converter or a rectifier and is configured to convert an AC signal received from the inductor to a DC signal. Additionally, or alternatively, the power management unit is configured to condition the power signal for use in the printed circuit 500. For example, the power management unit is configured to adjust a voltage and/or current of the power signal and to provide an adjusted power signal to the controllers 504, 508. In some such implementations, where printed circuit 500 includes a battery, the power management unit may be configured to charge (e.g., slow charge or trickle charge) the battery based on the power signal(s) received from the inductor.

In some implementations where printed circuit 500 includes an antenna, printed circuit 500 may further include an inductor. For example, the inductor may be coupled to controller 504 and is configured to receive wireless energy and generate the power signal. To illustrate, inductor 520 generates current/voltage when exposed to an electric field generated by the mobile device 502, and provides the current/voltage to controller 504, or the power management unit, or both.

In some implementations, printed circuit 500 may be connected to a power over Ethernet (POE) power sourcing equipment (PSE), such as via contact pins. Printed circuit 500 may be complaint with POE standards or technical specifications such as IEEE 802.3af, IEEE 802.3.at, Cisco Inline Power, etc., and configured to draw power from a POE PSE. When incorporated into a network cable connector (such as network cable connectors 200, 300, 400), the power drawn from a POE PSE by printed circuit 500 may be consumed wholly or partly by the network cable connector (e.g., by printed circuit 500 and/or display 552) and/or an external powered device (PD) connected to network cable connector (e.g., via an opening of the network cable connector). A switch of the printed circuit 500 may connect or disconnect one or more components of printed circuit 500 to or from the mobile device, the POE PSE, or both.

When the network cable connector including printed circuit 500 is active (e.g., powered by an electrical field generated by the mobile device 502), at least one of controllers 504, 508 may be configured to obtain information relevant to the connector and communicate all or part of the information wirelessly to the mobile device 502, display all or part of the information on display 552, or a combination thereof. Such information may include operating status, IP address, MAC address, power status (e.g., whether POE is connected or other types of power source is connected), type of equipment connected to the connector, location of far end, connector security settings, security lock-out status, etc.

A network cable connector including printed circuit 500 (such as network cable connectors 200, 300, 400) may be operated as follows. The following example is described based on network cable connector 200 with printed circuit 500. Mobile device 502 generates an electric or magnetic field 580 to transmit data and optionally power. Antenna/inductor of printed circuit 500 generates a data signal based on the electric or magnetic field 580 and provides the data signal to controller 504. Controller 504 receives power from a power source and uses the power to power components thereof to process the data signal. Controller 504 generates data (e.g., first data) from processing the data signal, and provides the data to controller 508. Controller 508 receives power from the power source and processes the data using the power. Based on processing the data, controller 508 can activate or control display 552. For example, controller 508 provides second data to controller 504 configured to cause controller 504 to operate display 552. To illustrate, controller 504 may supply power to display 552 intermittently to cause display (e.g., an LED) to flash. As another example, controller 508 provides power to display 552 to operate display 552. Because mobile device generates an electric field 580, multiple printed circuits 500 in the electric field 580 may output information via a corresponding display. Thus, printed circuit 500 enables identification of one or more components without having to physically access the components or disconnect the components. Additionally, the display can be powered by a remote device, and thus a battery coupled to the printed circuit can be reduced or eliminated.

Additionally, or alternatively, based on processing the data, controller 508 can initiate transmission of data to mobile device 502. For example, controller 508 sends second data to controller 504 configured to cause controller 504 to send a data signal to mobile device 502 via inductor 520. In some implementations, an application on the mobile device 502 is configured to generate passwords and/or communicate securely with printed circuit 500. For example, the printed circuit 500 may provide different levels of access (e.g., access and/or transmit different type of data) based on incoming data signals. To illustrate, the memory of controller 504 may be read only unless a password is provided. Thus, printed circuit 500 enables secure wireless communication of information of one or more components to mobile device 502.

In some implementations, when printed circuit 500 includes an inductor or another wireless power receiving means, the printed circuit 500 can be powered by the mobile device 502. Accordingly, maintenance and down time is reduced by not having to replace batteries. Additionally, a size of the printed circuit 500 may be reduced because the battery can be reduced in size or eliminated.

One or more printed circuits 500 may be included in a kit with one or more components of the networked environment 100. Thus, the printed circuit 500 may be coupled or affixed to any components of the networked environment 100 during setup or maintenance and provide the functionality and benefits described herein.

It should also be noted that in some embodiments, the methods described below may not comprise every step set forth in the following flow charts. Rather, in some embodiments, the method described below may comprise a subset of the steps set forth in the flow charts and the steps may be in a different order than the order presented in the flow charts.

Figure 6:
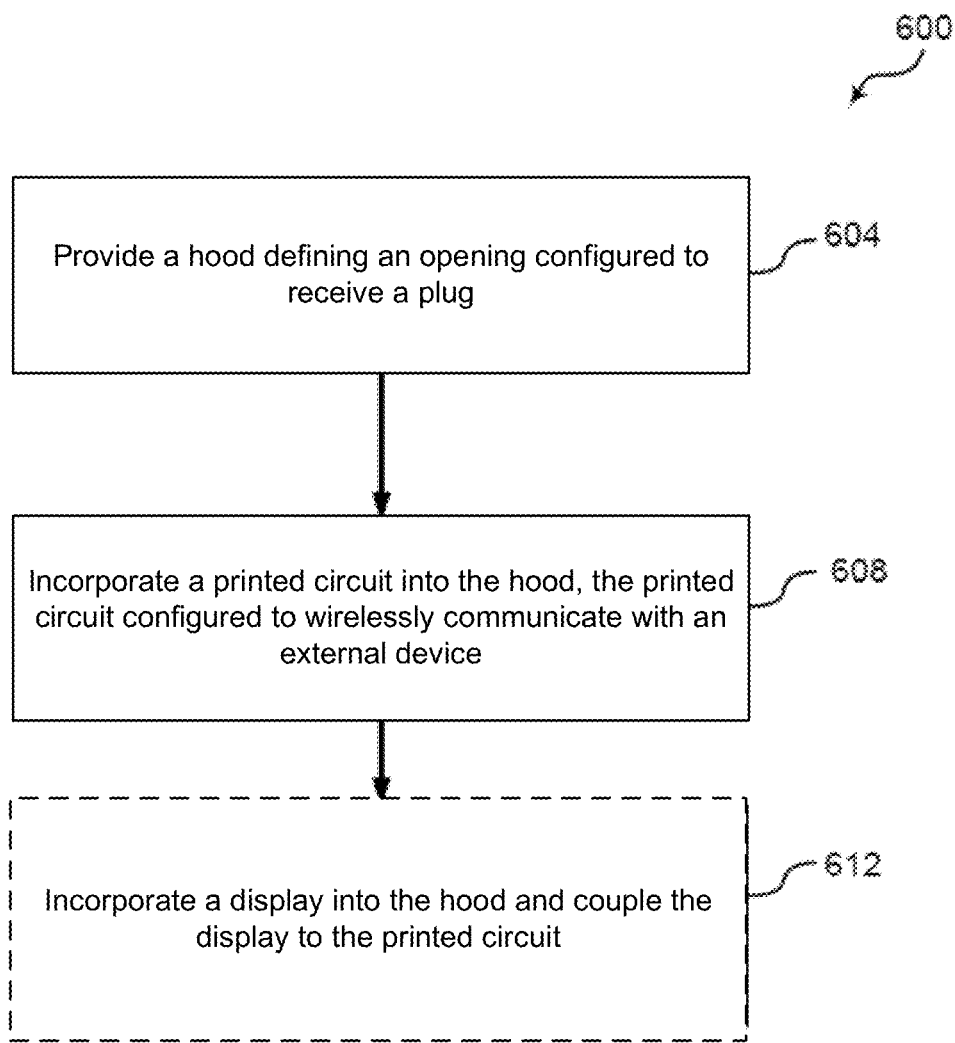
FIG. 6 illustrates a flow chart for a method for making a network cable connector according to one aspect of the present disclosure.

FIG. 6 illustrates one embodiment of a method 600 for making a network cable connector according to one aspect of the disclosure. The network cable connector may include or correspond to one of network cable connectors 200, 300, 400 described above in connection with FIGS. 2A-2F, 3A-3G, 4A-4F and/or network cable connectors described further herein at least with reference to FIGS. 10A-10B, 11A-11B, and 12A-12B. In the depicted embodiment, step 604 provides a hood (or plate) defining an opening configured to receive a plug. The plug may be a RJ-45, RJ-48, RJ-50, or RJ-61 plug. The hood may include an additional opening to receive a cable connecting the cable connector to another device. Step 608 incorporates a circuit (e.g., a printed circuit) into the hood. The printed circuit may be configured to configured to wirelessly communicate with an external device (as illustrated), to wirelessly couple to an external power source via an inductor, or both. One or more components of the printed circuit may receive power from the external power source when the printed circuit is wirelessly/inductively coupled to the external power source (e.g., mobile device 102, 502). Optional step 612 incorporates a display into the hood and couples the display to the printed circuit. The display may be configured to display information relevant to the network cable connector, such as the information described above in connection with FIGS. 2A-2F, 3A-3G, 4A-4F. The information may be obtained by the printed circuit and transmitted to the display, which is optionally powered by the external device.

In some embodiments, method 600 may also include incorporating a switch into the hood and coupling the switch to the printed circuit. The switch may be operated to connect or disconnect one or more components of the printed circuit to or from the external power.

Figure 7:
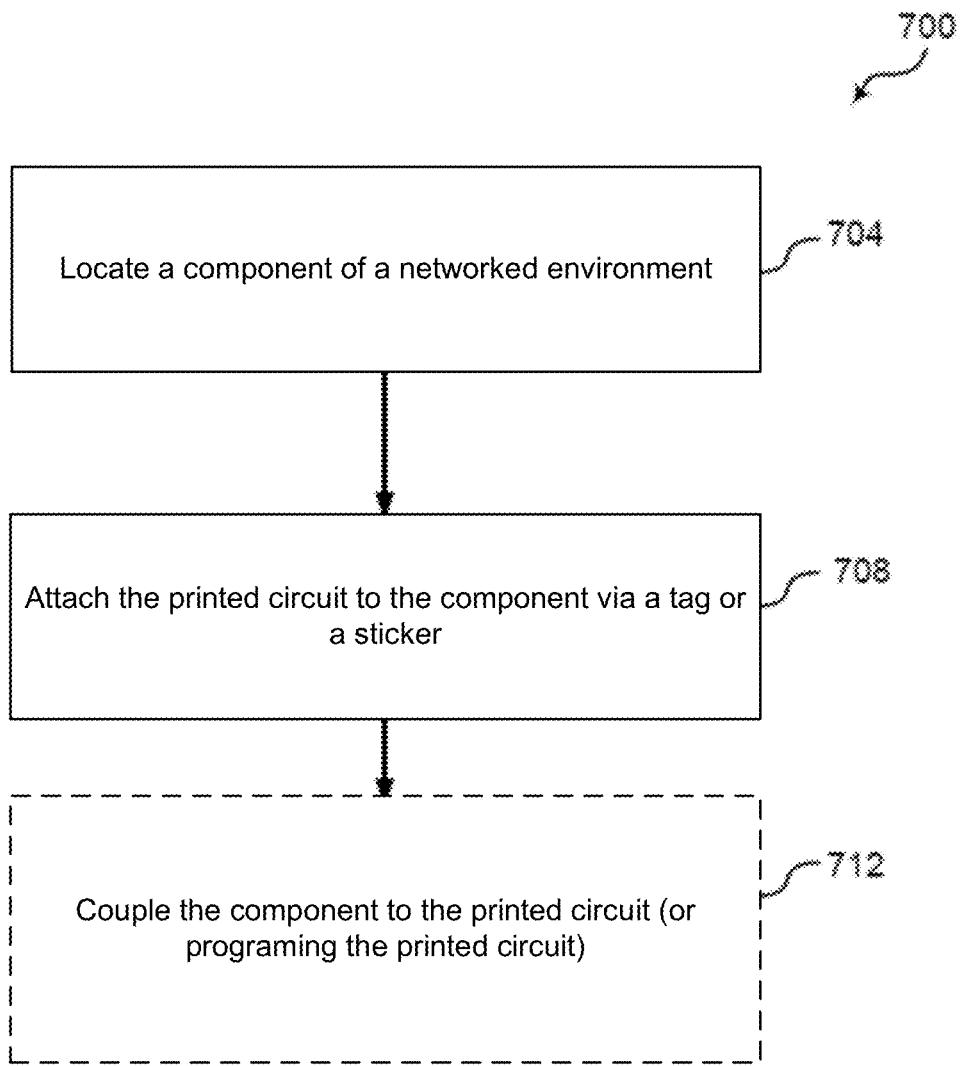
FIG. 7 illustrates a flow chart for a method for affixing a printed circuit to component of a networked environment according to one aspect of the present disclosure.

FIG. 7 illustrates one embodiment of a method 700 for affixing a printed circuit to a component (e.g., a network cable connector) of a networked environment according to one aspect of the disclosure. The network cable connector may include or correspond to one of network cable connectors 200, 300, 400 described above in connection with FIGS. 2A-2F, 3A-3G, 4A-4F and/or network cable connectors described further herein at least with reference to FIGS. 10A-10B, 11A-11B, and 12A-12B. In the depicted embodiment, step 704 locates a component of a networked environment. The component may be any component of networked environment 100. Step 708 attaches the printed circuit to the component via a tag or a sticker, such as the tag or sticker described further with reference to FIG. 13. Optional step 712 couples the component to the printed circuit. By coupling the printed circuit to the component, the printed circuit may determine or be able to retrieve information about the networked environment. Alternatively, the printed circuit may be programmed with information by the mobile device 102, 502. Thus, component of a networked environment can have printed circuits affixed to them, allowing retrofitting components of the networked environment with wireless communication and/or power receiving capability to output information about the networked environment.

Figure 8:
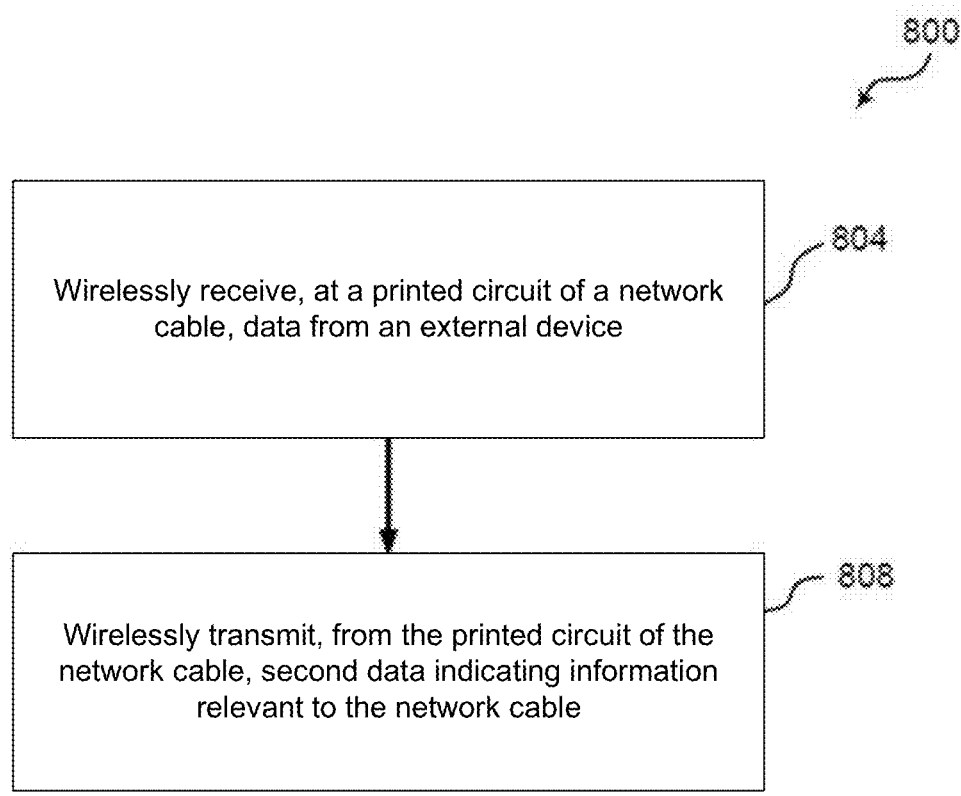
FIG. 8 illustrates a flow chart for operating a network cable according to one aspect of the present disclosure.

FIG. 8 illustrates one embodiment of a method 800 for operating a network cable according to one aspect of the disclosure. The network cable connector may include or correspond to one of network cable 178 or 278. In the depicted embodiment, step 804 wirelessly receives, at a printed circuit of a network cable, data from an external device. The printed circuit may be coupled to a connector of the network cable in some implementations. Step 808 wirelessly transmit, from the printed circuit of the network cable, second data indicating information relevant to the network cable. In some embodiments, the printed circuit also wirelessly receives power from the external device. In a particular implementation, the power is used to charge a battery coupled to the printed circuit. Additionally, or alternatively, the printed circuit may receive data indicating a command and may adjust operation of the network cable based on the command. To illustrate, the printed circuit may adjust which data the network cable transmits or may enable/disable access to a device coupled to the network cable.

Figure 9:
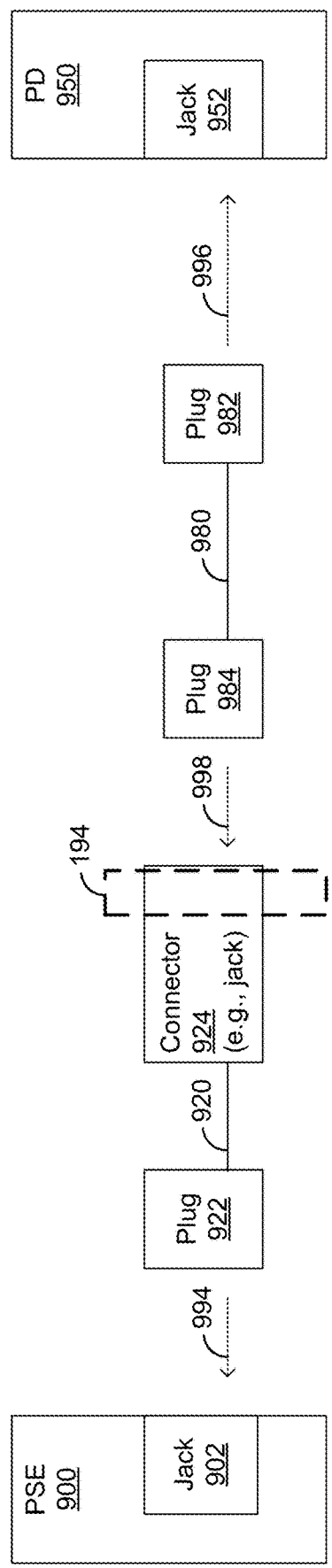
FIG. 9 illustrates a schematic view of another example of a networked computer environment.

Referring to FIG. 9, and example of a networked environment is shown. The networked environment may include or correspond to network environment 100. Network environment of FIG. 9 includes PSE 900 and PD 950. PSE 900 include jack 902 (e.g., network connector/interconnect) and PD 950 include jack 952 (e.g., network connector/interconnect).

A first network cable 920 includes include plug 922 (e.g., network connector/interconnect) and connector 924 (e.g., network connector/interconnect). First network cable 920 may include or correspond to network cable 178 or network cable 278. Connector 924 may include or correspond to network cable connector 190, 192, 200, or 400. In some implementations, jack 952 may include a coupler, such as network cable connector 300, into which a plug of network cable 920 is inserted. In some implementations, connector 924 is coupled (or mounted) to a plate (e.g., 194). For example, connector 924 may be coupled to or integrated with plate 194 as described further herein at least with reference to FIGS. 10A-10B, 11A-11B, and 12A-12B. A second network cable 980 includes plug 984 (e.g., network connector/interconnect) and plug 982 (e.g., network connector/interconnect). Second network cable 980 may include or correspond to cable 178 or cable 278.

In some implementations, one more of jacks 902, connector 924, and jack 952 may include a keystone jack. In implementations where connector 924 includes a coupler, connector 924 may include or correspond to a keystone coupler.

During operation, plug 922 is inserted into jack 902 as indicated by arrow 994. The connector 924 includes one or more components, such as a switch, a display, a printed circuit, and a connection hood (e.g., a hood). The connector 924, when coupled to PSE 900, may request and/or negotiate power with PSE 900.

Plug 982 of second network cable is inserted into jack 952 as indicated by arrow 996. After plug 982 is inserted in jack 952, plug 984 is inserted into connector 924, as indicated by arrow 998, while connector 924 is powered by PSE. Although described as plug 982 being plugged into jack 952 prior to plug 984 being plugged into connector 924, this is for illustration purposes only, and other sequences of coupling jacks, plugs, and connectors is possible.

A switch of the connector 924 may be operated such that at least one component of the connector 924 is disconnected from the PSE when plug 984 is connected to the cable connector. Disconnecting the at least one component may reduce the interference to the power negotiation between the PSE 900 and PD 950. The PSE 900 may then adjust the power to be supplied to the external PD 950. Because the circuitry (or a portion thereof) of the connector 924 is disconnected from the PSE 900 during power negotiation(s) between the PD 950 and PSE 900, the PSE 900 is able to determine/categorize a power need of the PD 950 without the circuitry (or portion thereof) of the connector 924. Therefore, disconnecting some components of the connector 924 from the PSE 900 (when coupling the PD 950 to the PSE) may allow the PSE to correctly classify the external PD. The PSE 900 may then adjust the power to be supplied to the external PD 950 according to the classification and power may be saved.

Further, disconnecting some components of connector 924 from the PSE 900 may allow the PSE 900 to correctly detect that external PD 950 has been disconnected from connector 924 (e.g., plug 984 is removed from connector 924 or plug 982 is removed from jack 952. To illustrate, the PSE 900 disconnects power to the PD 950 when the PSE 900 stops receiving a power signature from the PD 950 when the circuitry (or portion thereof, such as a resistor) of the connector 924 is in a disconnected state. If the circuitry (or portion thereof, such as a resistor) of the connector 924 were not disconnected (or otherwise bypassed) when the power signature from the PD 950 stops, the PSE 900 would continue to supply power to the connector 924 based on previous power negotiation between the PD 950 and the PSE 900.

Figure 10B:
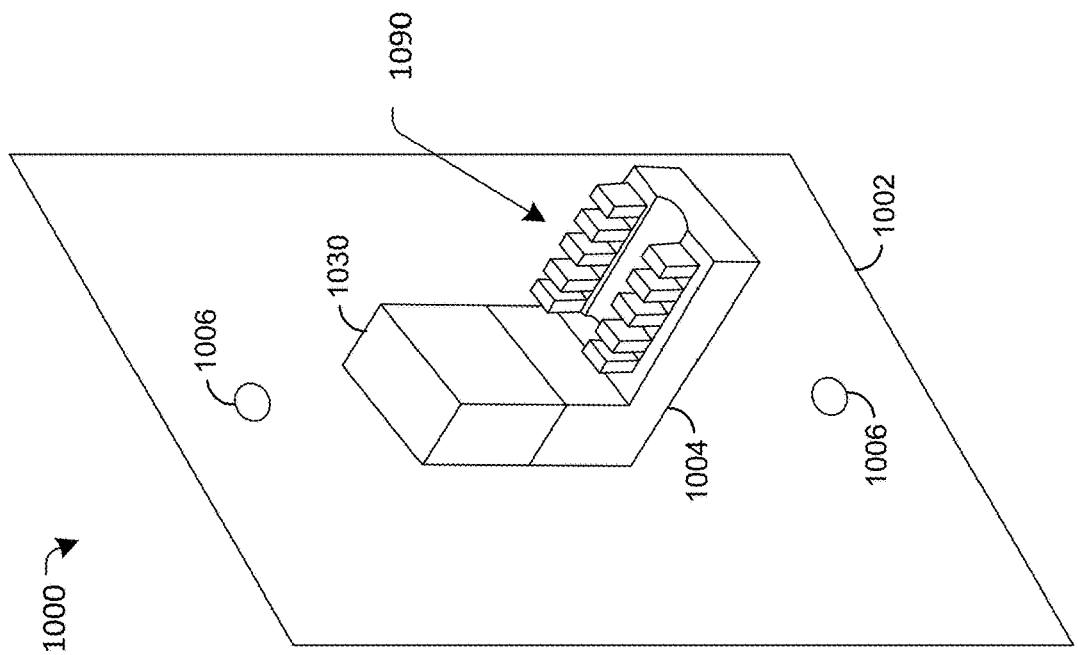
FIG. 10B illustrates a rear perspective view of the plate of FIG. 10A.
Figure 10A:
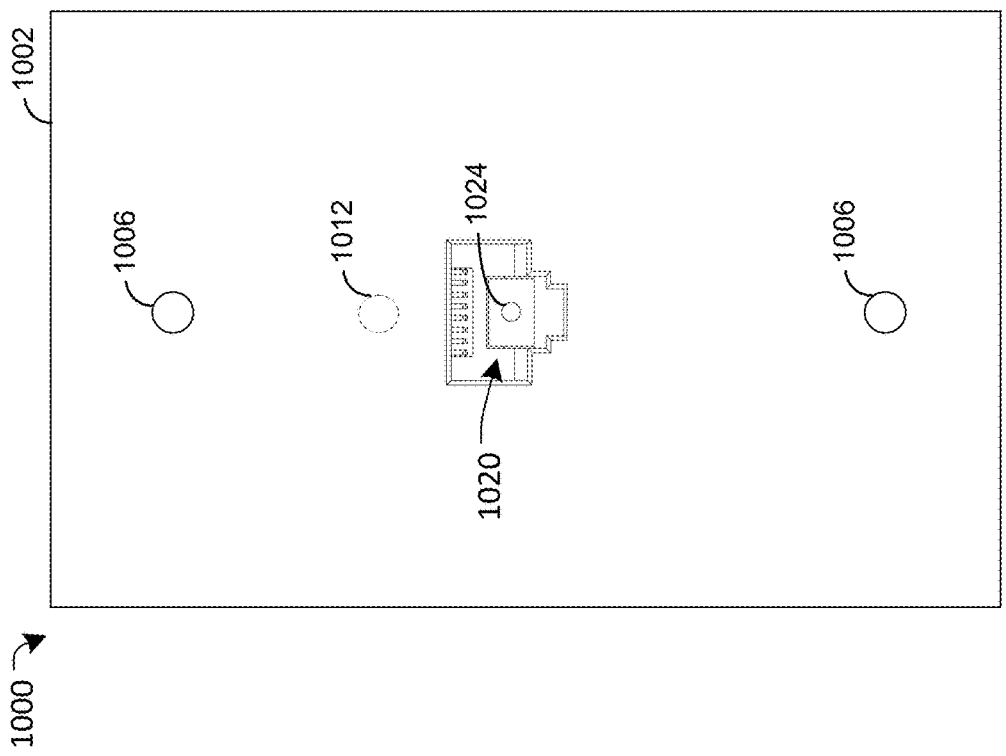
FIG. 10A illustrates a front view of a plate that includes a network cable connector according to one aspect of the present disclosure.

FIGS. 10A-10B depict an example of plate 1000 that includes a network cable connector, as described herein, that may be used in the networked environment of FIG. 1 or other similar networked environment. For example, plate 1000 may include or correspond to plate 194. FIGS. 10A-10B each illustrates a different view of plate 1000. FIG. 10A illustrates a front view and FIG. 10B illustrates a rear perspective view.

Plate 1000 includes a plate portion 1002 having mounting holes 1006 for mounting plate 1000 to a structure, such as a wall. Plate 1000 also includes an opening 1020 associated with a network cable connector. Opening 1020 is configured to receive and coupled to a network plug via contact pins of plate 1000. The pins of plate 1000 may include or correspond to contact pins 228, 328, 348, 428, 448, 528 as described herein. Plate 1000 may also include a switch 1024. Switch 1024 may include or correspond to switch 224, 324, 424, as described herein. Plate 1000 includes printed circuit 1030 which is coupled to switch 1024. Printed circuit 1030 may include or correspond to printed circuit 230, 330, 430, 500 as described herein. Plate 1000 may optionally (as indicated by dashed circle) include a display 1012. Display 1012 may include or correspond to display 212, 312, 412, 552, as described herein.

Plate 1000 also includes body 1004 that is coupled to plate portion 1002. In a particular implementation, plate portion 1002 and body 1004 may include a single unitary component. Plate 1000 also includes wire connectors 1090. The wire connectors 1090 may include or correspond to connectors 260 as described herein and may be configured to be coupled to a network cable, such as network cable 178. The wire connectors 1090 may be electrically coupled to pins of plate 1000 that are accessible to a plug via the opening 1020.

FIGS. 11A-11B depict an example of plate 1100 that includes a network cable connector, as described herein, that may be used in the networked environment of FIG. 1 or other similar networked environment. For example, plate 1100 may include or correspond to plate 194. FIGS. 11A-11B each illustrates a different view of plate 1100. FIG. 11A illustrates a front view and FIG. 11B illustrates a rear view.

Plate 1100 includes a plate portion 1102 having mounting holes 1106 for mounting plate 1100 to a structure, such as a wall. Plate 1100 also includes an opening 1120 associated with a network cable connector. Opening 1120 is configured to receive and coupled to a network plug via contact pins of plate 1100. The pins of plate 1100 may include or correspond to contact pins 228, 328, 348, 428, 448, 528 as described herein. Plate 1100 may also include a switch 1124. Switch 1124 may include or correspond to switch 224, 324, 424, as described herein. Plate 1100 includes printed circuit 1130 which is coupled to switch 1124. Printed circuit 1130 may include or correspond to printed circuit 230, 330, 430, 500 as described herein. Plate 1100 may optionally (as indicated by dashed circle) include a display 1112. Display 1112 may include or correspond to display 212, 312, 412, 552, as described herein.

Plate 1100 also includes body 1104 that is coupled to plate portion 1102. In a particular implementation, plate portion 1102 and body 1104 may include a single unitary component. Plate 1100 also includes wire connectors 1190. The wire connectors 1190 may include or correspond to connectors 260 as described herein and may be configured to be coupled to a network cable, such as network cable 178. The wire connectors 1190 may be electrically coupled to pins of plate 1100 that are accessible to a plug via the opening 1120.

Figure 12B:
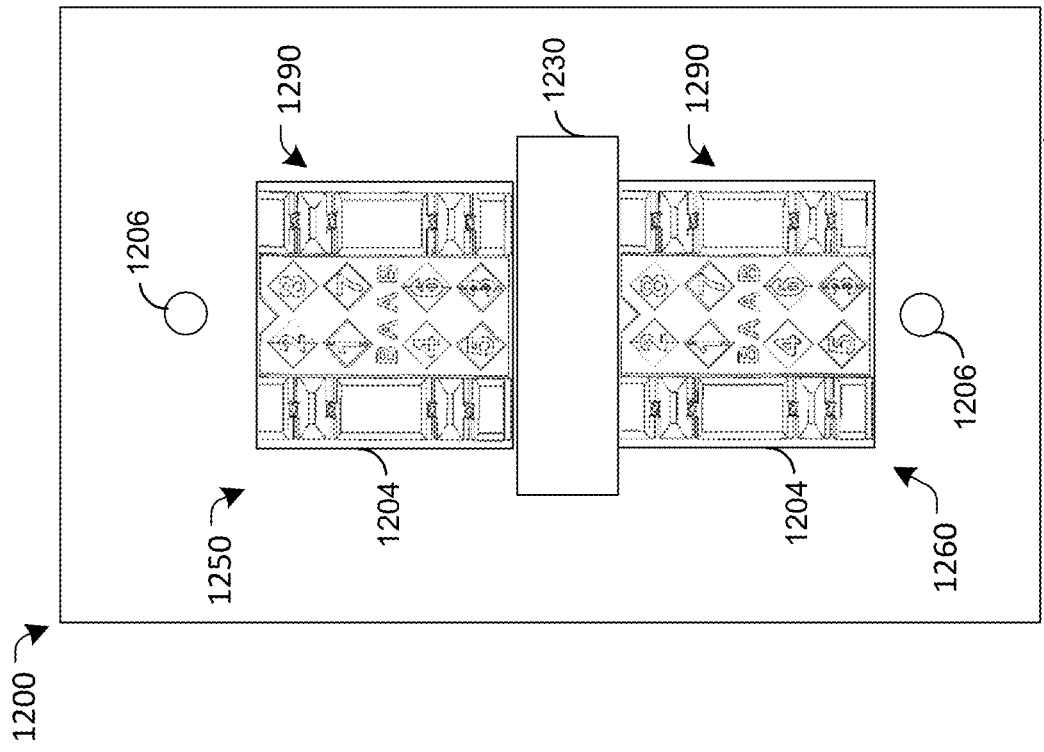
FIG. 12B illustrates a rear view of the plate of FIG. 12A.
Figure 12A:
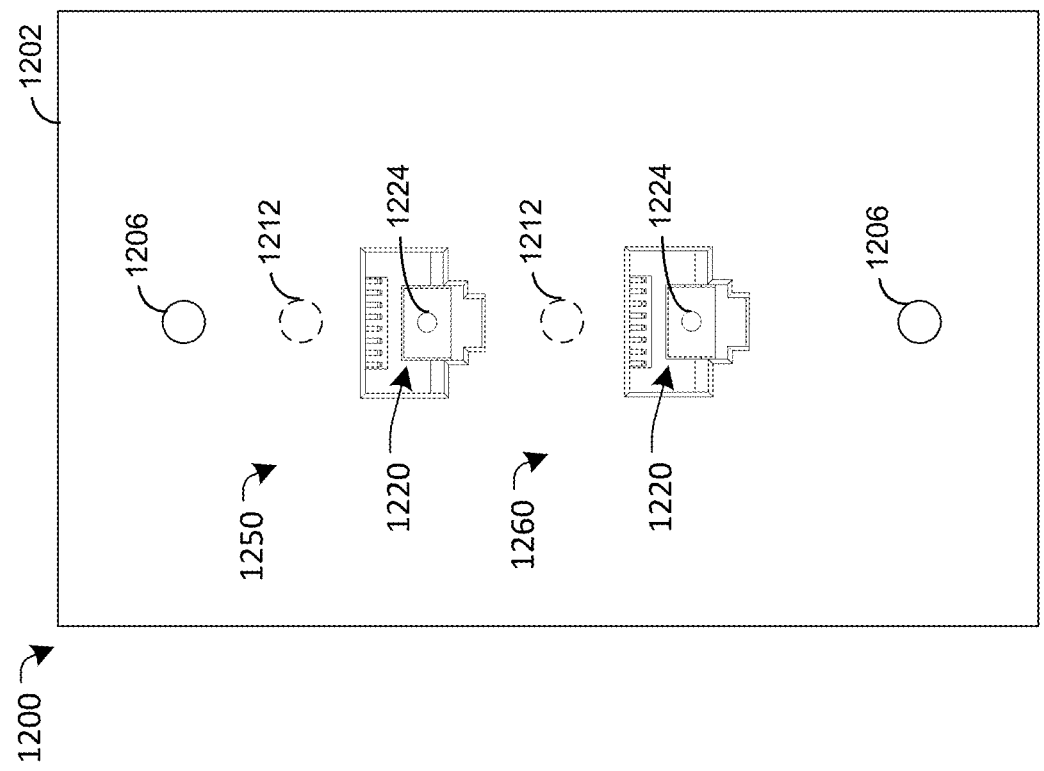
FIG. 12A illustrates a front view of a plate that includes a network cable connector according to one aspect of the present disclosure.

FIGS. 12A-12B depict an example of plate 1200 that includes multiple network cable connectors, as described herein, that may be used in the networked environment of FIG. 1 or other similar networked environment. For example, plate 1200 may include or correspond to plate 194. FIGS. 12A-12B each illustrates a different view of plate 1200. FIG. 12A illustrates a front view and FIG. 12B illustrates a rear view.

Plate 1200 includes a plate portion 1202 having mounting holes 1206 for mounting plate 1200 to a structure, such as a wall. As shown, plate 1200 include a first network connector 1250 and a second network connector 1260. Although plate 1200 is described as having two network connectors, in other implementations, plate 1200 may include more than two network connectors.

Each of the network connectors 1250, 1260 includes an opening 1220 associated with the network cable connector. Openings 1220 are each configured to receive and coupled to a network plug via contact pins of plate 1200. The pins of plate 1200 may include or correspond to contact pins 228, 328, 348, 428, 448, 528 as described herein. Each network connector 1250, 1260 may also include a switch 1224. Switches 1224 may include or correspond to switch 224, 324, 424, as described herein. Plate 1200 includes printed circuit 1230 which is coupled to each of switches 1224. Printed circuit 1230 may include or correspond to printed circuit 230, 330, 430, 500 as described herein. As shown, plate 1200 includes a single printed circuit 1230 that is configured for operation with each of network connectors 1250, 1260. Alternatively, plate 1200 may include multiple printed circuits 1230, where each printed circuit corresponds to a different network connector. Each network connector 1250, 1260 may optionally (as indicated by dashed circle) include display 1212. Display 1212 may include or correspond to display 212, 312, 412, 552, as described herein.

Each network connectors 1250, 1260 also includes body 1204 that is coupled to plate portion 1202. In a particular implementation, plate portion 1202 and bodies 1204 may include a single unitary component. Each network connectors 1250, 1260 also includes wire connectors 1290. The wire connectors 1290 may include or correspond to connectors 260 as described herein and may be configured to be coupled to a network cable, such as network cable 178. The wire connectors 1290 may be electrically coupled to pins of a respective network connector 1250, 1260.

Figure 13:
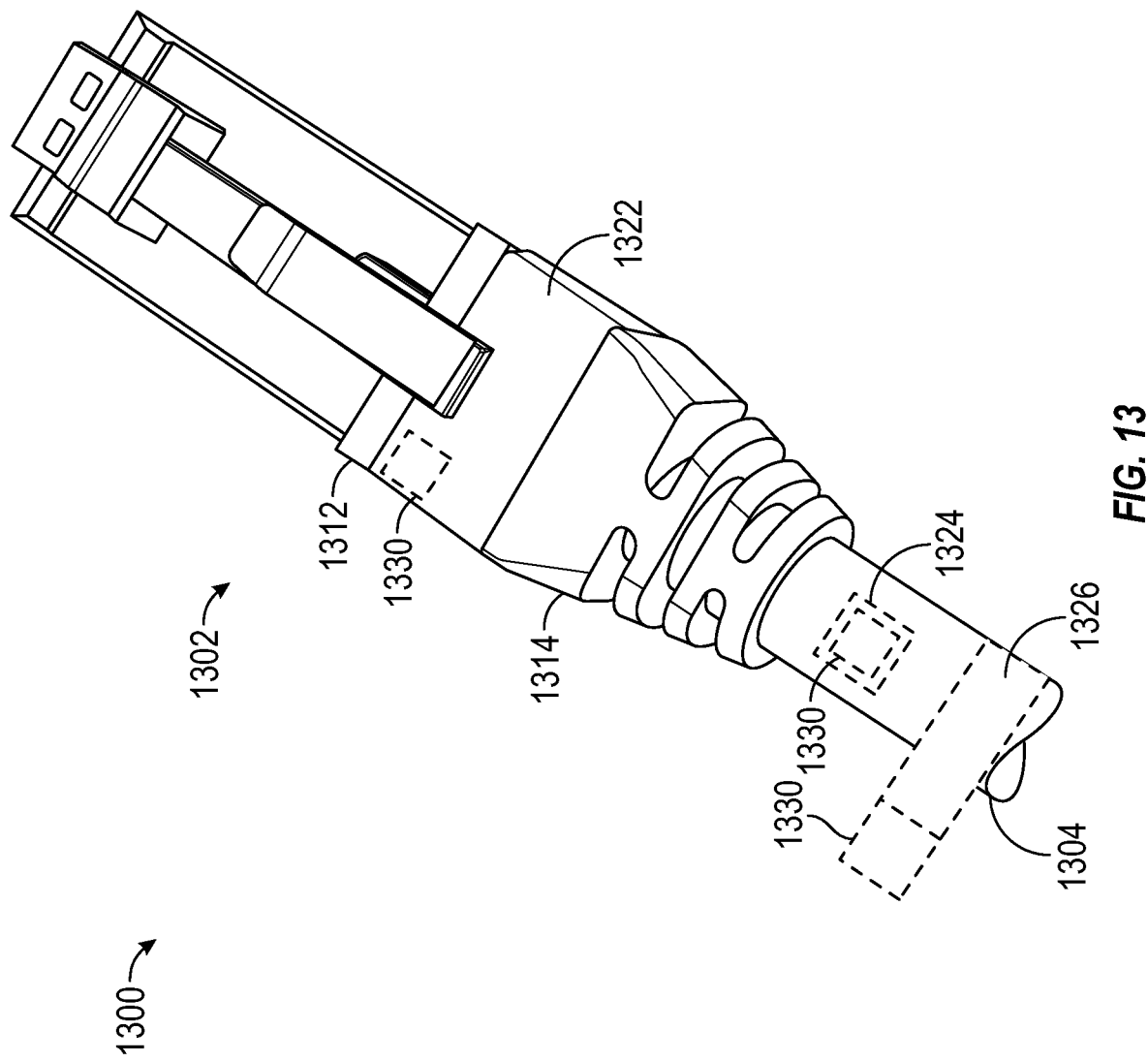
FIG. 13 illustrates a perspective view of a network cable connector according to one aspect of the present disclosure.

FIG. 13 depicts examples of a network cable 1300 comprising a printed circuit 1330, as described herein, that may be used in the networked environment 100 of FIG. 1 or other similar networked environments. For example, network cable 1300 may include or correspond to network cable 178 or network cable 278. The printed circuit 1330 of network cable 1300 may include or correspond to printed circuit 230, 330, 430, 500, 1030, 1130, or 1230.

In some implementations, the printed circuit 1330 may be included in or incorporated in a clip 1322 that is coupled to network cable 1300. As illustrated in FIG. 13, clip 1322 is attached to a boot 1314 of a hood 1302 of the network cable 1300. In some implementations, boot 1314 may define a recess or an opening that is configured to receive clip 1322. In some such implementations, printed circuit 1330 is configured to couple to one or more conductor wires of network cable 1300 via the recess or opening. In other implementations, clip 1322 is affixed to other portions of network cable 1300, such as sheath 1304, other components of the hood 1302 (e.g., a connector 1312), an extender (not shown), etc.

Accordingly, costs of the cable and connector can be reduced by incorporating a port into the hood into which a clip (including a printed circuit) can be inserted which wirelessly communicates network and/or identification information to an external device, such as mobile device 102, 502. Also, such a clip can be used as a back-up transmitter, when a primary transmitter in the connector fails or in case the cable and connector only have a primary transmitter on one end of the cable (e.g., upstream or server side end).

In other implementations, the printed circuit 1330 may be included in or incorporated in a sticker 1324 that is affixed to network cable 1300. As illustrated in FIG. 13, sticker 1324 is attached to sheath 1304 of the network cable 1300. In other implementations, sticker 1324 is affixed to other portions of network cable 1300, such as hood 1302 (e.g., connector 1312 or boot 1314 thereof), an extender, etc.

In another implementation, the printed circuit 1330 may be included in or incorporated into a tag 1326 that is coupled (e.g., attached) to network cable 1300. As illustrated in FIG. 13, tag 1326 is attached to sheath 1304 of the network cable 1300. In other implementations, tag 1326 is coupled to other portions of network cable 1300, such as hood 1302 (e.g., connector 1312 or boot 1314 thereof), an extender, etc. As another example, the printed circuit board 500 may be included in a device that is configured to plug into an extension (e.g., extender or telltale) of the network cable 1300 or the connector thereof. Thus, by affixing clips, stickers, and/or tags to components, existing networks can be retrofitted with printed circuits and enable component tracking.

Figure 14:
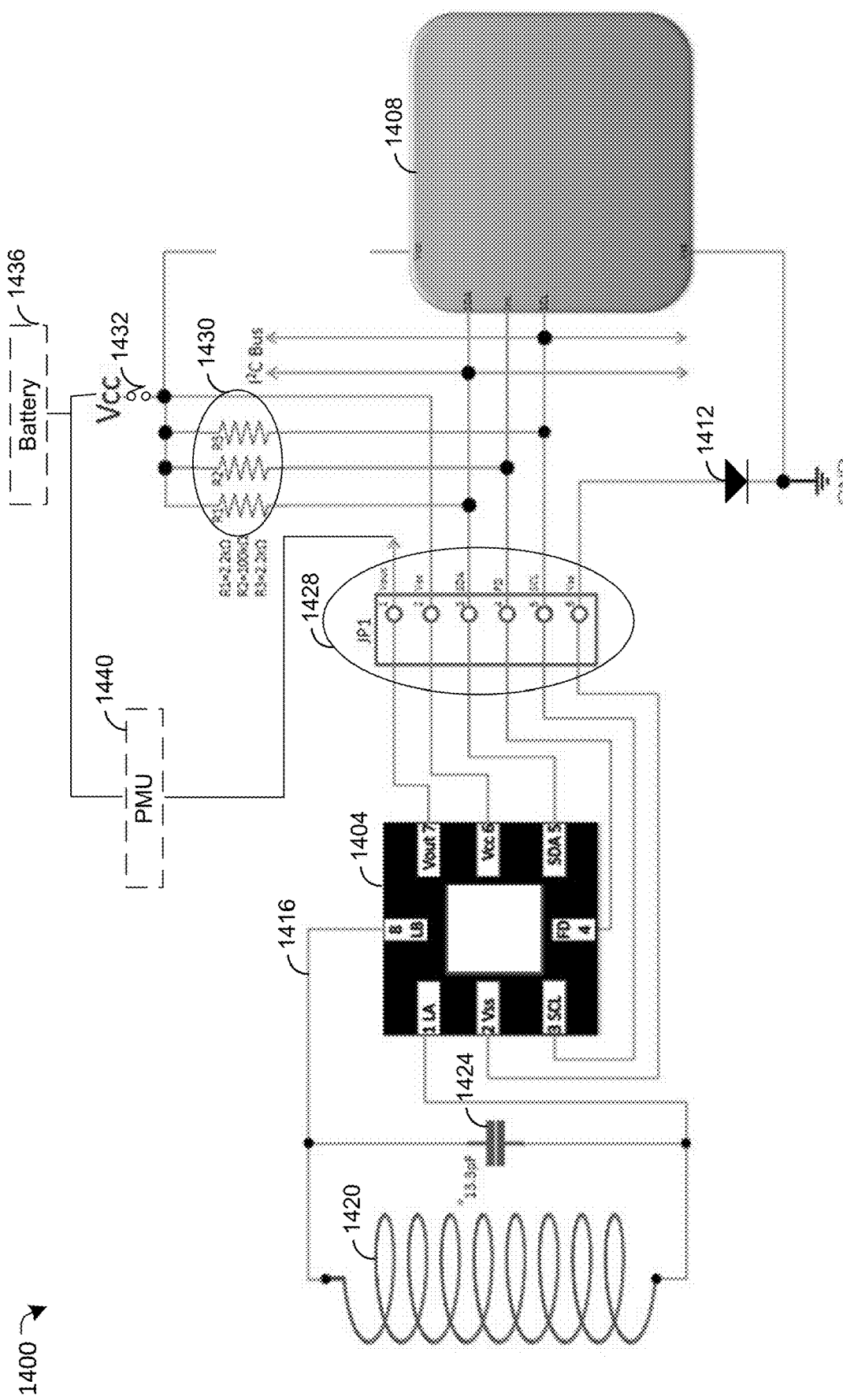
FIG. 14 illustrates a circuit diagram of a printed circuit for network cable connector according to one aspect of the present disclosure.

FIG. 14 illustrates a block diagram showing some components of printed circuit 1400, which may be used in network cables 178, 278, network cable connectors 200, 300, 400 described above in connection with FIGS. 2A-2F, 3A-3G, 4A-4F, network cable connectors described with reference to FIGS. 10A-10B, 11A-11B, and 12A-12B, and/or plates 1000, 1100, 1200 described with reference to FIGS. 10A-10B, 11A-11B, and 12A-12B. Printed circuit 1400 may include a flex circuit and/or may be included in a printed circuit board. A flex circuit (e.g., a flexible printed circuit board) may include an insulating polymer film having one or more conductive circuit patterns affixed thereto and may include a coating (e.g., a polymer coating) to protect the conductor circuits. Printed circuit 1400 may include or correspond to printed circuit 230, 330, 430, 500, 1030, 1130, 1230, or 1330. In a particular implementation, printed circuit 1400 includes a flexible circuit or flex circuit that is affixed to and/or molded into a hood or plate.

In the depicted embodiment, printed circuit 1400 includes controllers 1404, 1408, which are coupled to each other via a plurality of conductor wires 1416. The plurality of conductor wires 1416 may include or correspond to a bus, such as a PC bus configured to provide data (e.g., first data and second data) between controllers 1404, 1408. Controller 1404 may include or correspond to controller 504. Controller 1408 may include or correspond to controller 508. In some implementations, controller 1408 includes or corresponds to a microcontroller.

Controllers 1404, 1408 may be connected to one or more energy consuming components, such as resistors 1430. As illustrated in FIG. 14, controllers 1404, 1408 and resistors 1430 are in turn connected to contact pins 1428 through the plurality of conductor wires 1416. Optionally, the controllers 1404, 1408 are connected to each other via one or more diodes (not shown) and/or one or more switches (not shown).

Printed circuit 1400 further includes an inductor 1420 coupled to controller 1404 and configured to receive wireless energy and generate a signal, such as a data signal and/or a power signal. To illustrate, inductor 1420 generates current/voltage when exposed to an electric field generated by an external device (e.g., mobile device 102, 502), and provides the current/voltage to controller 1404. Additionally, printed circuit 1400 may include multiple inductors 1420, such as one or more additional inductors 1420 configured to receive wireless energy and/or generate a power signal. To illustrate, a first inductor 1420 may be configured to generate the data signal and a second inductor 1420 may be configured to generate the power signal. The second inductor 1420 may be configure to provide the power signal to controllers 1404, 1408, provide a power signal to one or more other components of the printed circuit 1400 (e.g., a power management unit 1440), provide a power signal to one or more other components of a connector, charge an internal battery (e.g., a battery 1436) coupled to printed circuit 1400, or a combination thereof. In FIG. 14 inductor 1420 is illustrated as being separate from controller 1404; in other implementations, inductor 1420 is included in controller 1404. Although printed circuit 1400 includes inductor 1420 in FIG. 14, in other implementations printed circuit 1400 includes an antenna or another wireless communication means for receiving and/or transmitting data and/or another wireless power receiving means for wireless receiving power.

In some implementations, printed circuit 1400 includes capacitor 1424. As illustrated in FIG. 14, capacitor 1424 is coupled in parallel between inductor 1420 and controller 1404. Capacitor 1424 is configured to tune the signal(s) provided by inductor 1420 to controller 1404. For example, capacitor 1424 is configured to adjust the current/voltage of the signal(s), smooth the signal(s), reduce interference of the signal(s), or a combination thereof.

In some implementations, printed circuit 1400 further includes a display 1412 coupled to one or more of controllers 1404, 1408. Display 1412 is configured to output a visual indication. As illustrated in FIG. 14, display 1412 includes an LED and is coupled to (e.g., controlled by) controller 1408. In other implementations, display 1412 can include another type of display (e.g., LCD, OLED, etc.) and/or may be coupled to another component or in another location of printed circuit 1400. The visual indication may indicate information about the component in which the printed circuit 1400 is coupled and/or the networked environment in which the component is operating. The visual indication may include blinking, color changes, patterns, etc.

As illustrated in FIG. 14, printed circuit 1400 includes battery 1436. In other implementations, battery 1436 is coupled to printed circuit 1400, such as coupled to a connector or hood thereof. Alternatively, printed circuit 1400 is coupled to an external power source, such as a DC power source or receives power via a cable into which printed circuit 1400 is coupled to, such as by POE. Battery 1436 (or another power source coupled to printed circuit 1400) is configured to provide power to one or more components of printed circuit 1400.

In some implementations, printed circuit 1400 further includes a power management unit 1440. Power management unit 1440 is configured to receive the power signal from inductor 1420 and to provide power to one or more components of printed circuit 1400. For example, the power management unit 1440 is configure to provide at least a portion of the power used by controllers 1404, 1408 to enable operation of controllers 1404, 1408, such as processing of data signals, transmission of data, etc. In some implementations, the power management unit 1440 includes a converter or rectifier and is configured to convert an AC signal received from the inductor to a DC signal. Additionally, or alternatively, the power management unit 1440 is configured to condition the power signal for use in the printed circuit 1400. For example, the power management unit 1440 is configured to adjust a voltage and/or a current of the power signal and provide an adjusted power signal to the controllers 1404, 1408. In some such implementations, where printed circuit 1400 includes a battery 1436, the power management unit 1440 may be configured to charge (e.g., slow charge or trickle charge) the battery 1436 based on the power signal(s) received from the inductor.

In some implementations, printed circuit 1400 further includes a switch 1432 coupled to one or more of controllers 1404, 1408. Switch 1432 is configured to decouple one or more components of printed circuit 1400 from power (e.g., from battery 1436). Additionally, or alternatively, switch 1432 is configured to decoupled one or more components of the printed circuit 1400 from a mobile device (e.g., 102, 502). For example, the switch 1432 may decouple inductor 1420 (or an antenna) from one or more components of the printed circuit 1400, such as controller 1404, controller 1408, or power management unit 1440, to wirelessly decouple the printed circuit 1400 (e.g., controllers 1404, 1408 thereof) from the mobile device.

In some embodiments where printed circuit 1400 is coupled to an external power source, the external power source may include a power over Ethernet (POE) power sourcing equipment (PSE). The POE PSE may be connected to printed circuit 1400 through contact pins 1428. Printed circuit 1400 may be complaint with POE standards or technical specifications such as IEEE 802.3af, IEEE 802.3.at, Cisco Inline Power, etc., and configured to draw power from a POE PSE. When incorporated into a network cable connector (such as network cable connectors 200, 300, 400), the power drawn from the external power source by printed circuit 1400 may be consumed wholly or partly by the network cable connector (e.g., by printed circuit 1400 and/or display 1412) and/or an external powered device (PD) connected to network cable connector (e.g., via an opening of the network cable connector). Switch 1432 of the printed circuit 1400 may connect or disconnect one or more components of printed circuit 1400 to or from the external power source.

When the network cable connector including printed circuit 500 is active (e.g., powered by an electrical field generated by the mobile device 502), at least one of controllers 504, 508 may be configured to obtain information relevant to the connector and communicate all or part of the information wirelessly to the mobile device 502, display all or part of the information on display 552, or a combination thereof. Such information may include operating status, IP address, MAC address, power status (e.g., whether POE is connected or other types of power source is connected), type of equipment connected to the connector, location of far end, connector security settings, security lock-out status, etc.

A network cable connector including printed circuit 1400 (such as network cable connectors 200, 300, 400) may be operated as follows. The following example is described based on network cable connector 200 with printed circuit 1400. First, network cable connector 200 with printed circuit 1400 is exposed to an electric field generated by an external device. Switch 1432 is closed and printed circuit 1400 starts to request power using resistors 1430 (which have resistances of, e.g., 2.2 k Ohm, 100 k Ohm, and 2.2 k Ohm). The power requested by the printed circuit 1400 may come from the power management unit 1440, the battery 1436, or a combination thereof. Since printed circuit 1400 includes components, such as controllers 1404, 1408 and resistors 1430, to consume energy from the external supply, the printed circuit 1400 may be regarded as a powered device (PD).

Inductor 1420 generates a data signal and/or a power signal based on the electric field and provides the data signal and/or the power signal to controller 1404. In some implementations where controller 1404 receives the data signal and/or the power signal, controller 1404 detects that an electric (or magnetic) field is present and initiates operation. In some such implementations where controller 1404 receives the power signal, controller 1404 may detect that energy harvesting is possible and generate energy harvesting activation signal. The energy harvesting activation signal may be provided to controller 1408, power management unit 1440, or both. Additionally, or alternatively, controller 1404 provides the power signal to power management unit 1440. Power management unit 1440 extracts or harvests power from the power signal to provide power to printed circuit 1400.

Controller 1404 receives power from the power management unit 1440, the battery 1436, or a combination thereof. In some implementations, controller 1404 may use power from the power management unit 1440 (which was extracted from the electric field) to power components thereof to process the data signal. Controller 1404 generates data from processing the data signal, and provides the data to controller 1404. Controller 1408 receives power from the power management unit 1440, the battery 1436, or a combination thereof, and processes the data using the power. In some implementations, controller 1408 may use power from the power management unit 1440 (which was extracted from the electric field) to power components thereof to process the data. Based on processing the data, controller 1408 can activate or control display 1412. For example, controller 1408 provides second data to controller 1404 configured to cause controller 1404 to operate display 1412. To illustrate, controller 1404 may supply power to display 1412 intermittently to cause display 1412 (e.g., LED) to flash. As another example, controller 1408 provides power to display 1412 to operate display 1412.

Thus, printed circuit 1400 enables identification of components of a networked environment without having to physically access the components (e.g., a network cable connector) or connect a device to the components (e.g., terminals of the network cable). By using printed circuit 1400 components of a networked environment can be programmed or diagnosed with having to physically disconnect cables and/or connect cables to a PSE. Also, printed circuit 1400 enables easier access, as compared to printed circuits and components which use wired or contact-based communication means, because you don't have to physically access a connector or hood. Also, printed circuit 1400 can decrease maintenance and setup time. For example, a mobile device can control or power multiple components at one using wireless communication. To illustrate, the electric field generated by the mobile device (e.g., a smartphone with an NFC reader) may cause multiple devices, each including printed circuit 1400, to respond to the mobile device with identifying information.

Additionally, or alternatively, based on processing the data, controller 1408 can initiate transmission of data to the mobile device. For example, controller 1408 sends the second data to controller 1404 which is configured to cause controller 1404 to send a second data signal to external device via inductor 1420. The second data signal indicates the component and/or network information. In some implementations, an application on the mobile device is configured to generate passwords and/or communicate securely with printed circuit 1400. For example, the printed circuit 1400 may provide different levels of access based on incoming data signals. To illustrate, the memory of controller 1404 may be read only unless a password is provided. Thus, printed circuit 1400 enables secure wireless communication of data to a device external to a networked environment.

FIGS. 15A-15G illustrate diagrams of graphical user interfaces (referred to herein as screens) of a mobile device which can interact with and control RFID tags (e.g., printed circuits 230, 330, 430, 500, 1030, 1130, 1230, 1330, or 1400) incorporated with or attached to network components. The mobile device may include or correspond to mobile device 102 or mobile device 502. The RFID tag may include or correspond to an NFC tag in a particular implementation. Additionally, controlling RFID tags, which are coupled to circuits of network components or that are included in circuits of network components, may enable the application to control operation of the network components.

Referring to FIG. 15A, FIG. 15A illustrates an example of a home screen of an application of the mobile device for controlling RFID tags (e.g., printed circuits 230, 330, 430, 500, 1030, 1130, 1230, 1330, or 1400). As illustrated in FIG. 15A, the home screen has a menu including navigational bars for "TASKS", "NDEF", "TOOLS", and "REPORT". The navigational bars (e.g., buttons) when selected are configured to cause the mobile device and the application to display other screens or user interfaces (e.g., update the display of the mobile device). In some implementations, the home screen (and optionally one or more additional screens of the application may include a "Cancel" button. The Cancel button may be configured to exit the application, close the application, and/or return to the home screen depending on which screen the Cancel button is displayed. In other implementations, the home screen includes one or more additional navigational bars or buttons, includes other navigational bars or buttons than illustrated in FIG. 15A, or a combination thereof.

Referring to FIG. 15B, FIG. 15B illustrates an example of a task screen of the application. The task screen includes control buttons for controlling or adjusting visual and/or audio outputs of the RFID tag. As illustrated in FIG. 15B, the task screen includes control buttons configured to control a blink speed and a color of a display (e.g., LED) of the RFID tag, such as display 1412 of printed circuit 1400 of FIG. 14. Additionally, the task screen includes control buttons for controlling a tone output by an audio output device (e.g., speaker) of the RFID tag. In FIG. 15B, the tone control buttons include a tone slider configured to change a type of tone (e.g., change a type of output sound, a pitch of the output audio, etc.) and a volume slider configured to control (e.g., increase and decrease) volume of the output audio.

The tone control buttons (or the task screen) may further include one or more paring buttons (e.g., "Pair 1", "Pair 2", etc.) configured to couple and decouple the mobile device from the RFID tags. To illustrate, when paired, the mobile device may output data via an antenna or inductor thereof addressed to a particular tag or tags and/or may display data received from the particular tag or tags. When not paired (or decoupled), the mobile device may output data via the antenna or inductor thereof which is not addressed to the particular tag or tags and/or may not display data received from the particular tag or tags.

Referring to FIG. 15C, FIG. 15C illustrates an example of a Near Field Communication Date Exchange Format (NDEF) screen. As illustrated in FIG. 15C, NDEF screen is a "Read NDEF" screen. The Read NDEF screen is configured to display NDEF messages associated with one or more RFID tags. In the example of FIG. 15C, the Read NDEF screen includes an NDEF content box which displays identifying information of one or more RFID tags. A user can select a particular RFID tag of the one or more RFID tags to view a corresponding NDEF message of (stored at) the particular RFID tag. In other implementations, the NDEF content box displays messages and identifying information of one or more RFID tags.

Figure 15E:
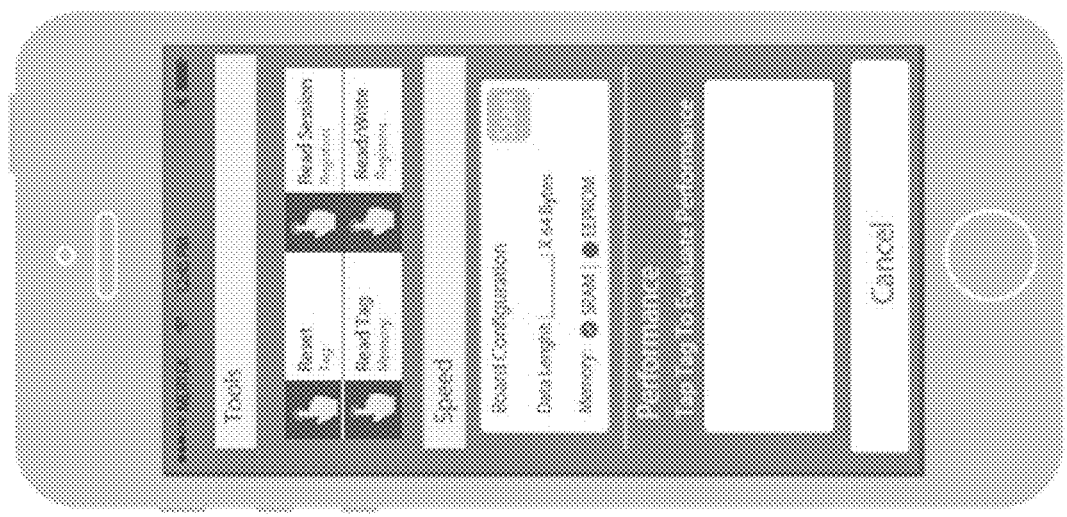
FIG. 15E illustrates a diagram of another user interface of an application for controlling RFID tags associated with network components.
Figure 15D:
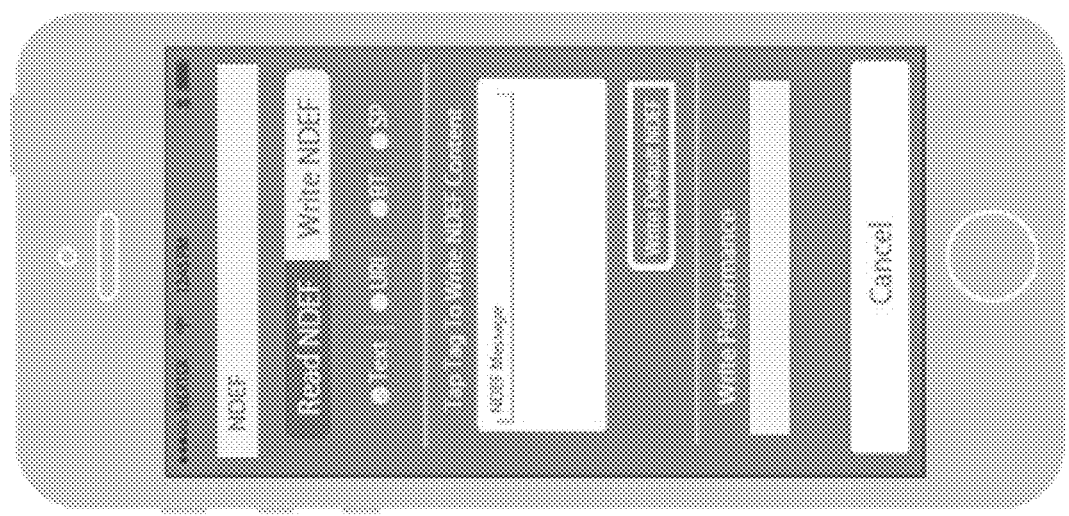
FIG. 15D illustrates a diagram of another user interface of an application for controlling RFID tags associated with network components.

In some implementations, the Read NDEF screen includes toggle buttons to switch between the Read NDEF screen and a "Write NDEF" screen, such as example Write NDEF screen illustrated in FIG. 15D. The Read NDEF screen may further include a read performance section to indicate information on a read status of the RFID tag or tags, an Enable NDEF read loop button to control reading multiple RFID tags and/or storing of NDEF messages.

Additionally, or alternatively, the Read NDEF screen includes a read performance section configured to display read performance information of one or more RFID tags. Selection of a particular RFID tag causes the read performance section to display read performance data regarding the particular RFID tag. Exemplary read performance data includes performance data of the RFID tag itself, such as read speed, memory usage, signal strength, etc.

Referring to FIG. 15D, FIG. 15D illustrates another example of an NDEF screen. As illustrated in FIG. 15D, NDEF screen is a Write NDEF screen. The Write NDEF screen is configured to display NDEF messages associated with one or more RFID tags. In the example of FIG. 15D, the Write NDEF screen includes a NDEF content box which displays identifying information of one or more RFID tags. A user can select a particular RFID tag of the one or more RFID tags to view a corresponding NDEF message of (stored at) the particular RFID tag. In other implementations, the NDEF content box displays messages and/or identifying information of one or more RFID tags. Upon selection of a particular RFID tag, the application enables a user to enter or edit text of the NDEF message of the selected RFID tag.

In some implementations, the Write NDEF screen includes a Write Default NDEF button configured to write default data to the RFID tag. In a particular implementation, the default data for an NDEF message is adjustable by the user via the application. The default data may include or correspond to location data of the mobile device or RFID tag, time data, user data (e.g., user ID), component data (e.g., to which component is RFID tag attached), or a combination thereof. To illustrate, a user may select one or more default data types to be sent to the RFID tag to enable writing the default NDEF message to a memory of the RFID tag.

Additionally, or alternatively, the Write NDEF screen includes a write performance section configured to display write performance information of one or more RFID tags.

Selection of a particular RFID tag causes the write performance section to display write performance data regarding the particular RFID tag. Exemplary write performance data includes performance data of the RFID tag itself, such as write speed, memory usage, signal strength, etc.

Referring to FIG. 15E, FIG. 15E illustrates an example of a tools screen. In FIG. 15E, the tools screen includes one or more buttons to control or configure RFID tags. For example, the tools screen may include one or more of a Reset button, a Read button, a Read Session button, a Read/Write button, or a combination thereof. The Reset button is configured to send a reset signal to the RFID tag to reboot the RFID tag, reset the RFID tag (i.e., clear one or more memories of registers thereof), or a combination thereof. The Read button is configured to send a signal to the RFID tag to cause the RFID tag to send data from a memory of the RFID tag to the mobile device. Similarly, the Read session and Read/Write buttons send signals to the RFID tag to enable a user to read data from and/or write data to one or more registers of the RFID tag.

In some implementations, the tools screen displays tag configuration information. As illustrated in FIG. 15E, the tools screen display a Board Configuration section which displays a data length of the SRAM (e.g., 514) and/or EEPROM (e.g., 512) of the RFID tag. Additionally, or alternatively, the tools screen includes a performance section configured to display performance information of one or more RFID tags. Selection of a particular RFID tag causes the performance section to display performance data regarding the particular RFID tag. Exemplary performance data includes performance data of the RFID tag itself, such as battery level, memory usage, signal strength, etc., performance data of the network component to which the RFID tag is coupled, such as status, speed, capacity, etc., or a combination thereof.

Figure 15G:
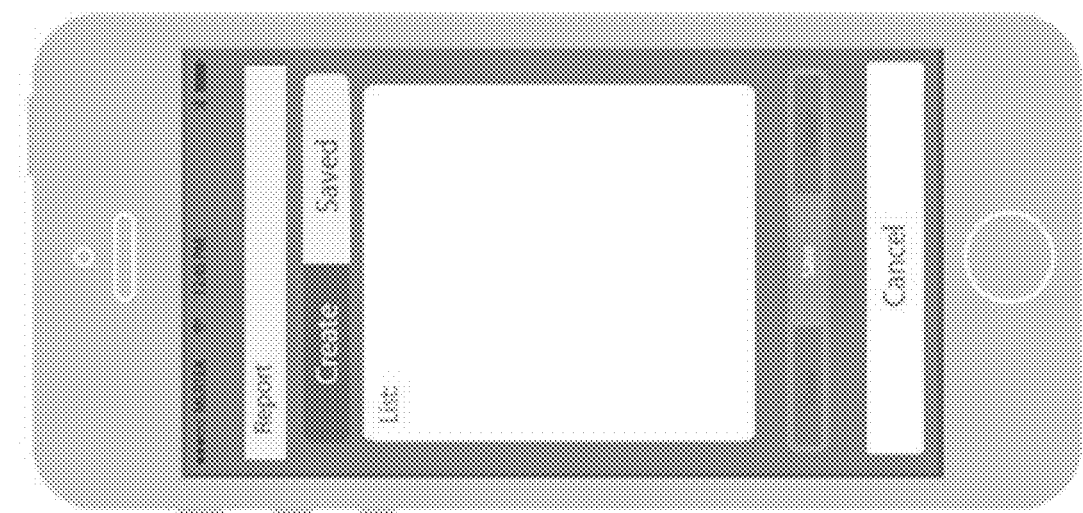
FIG. 15G illustrates a diagram of another user interface of an application for controlling RFID tags associated with network components.
Figure 15F:
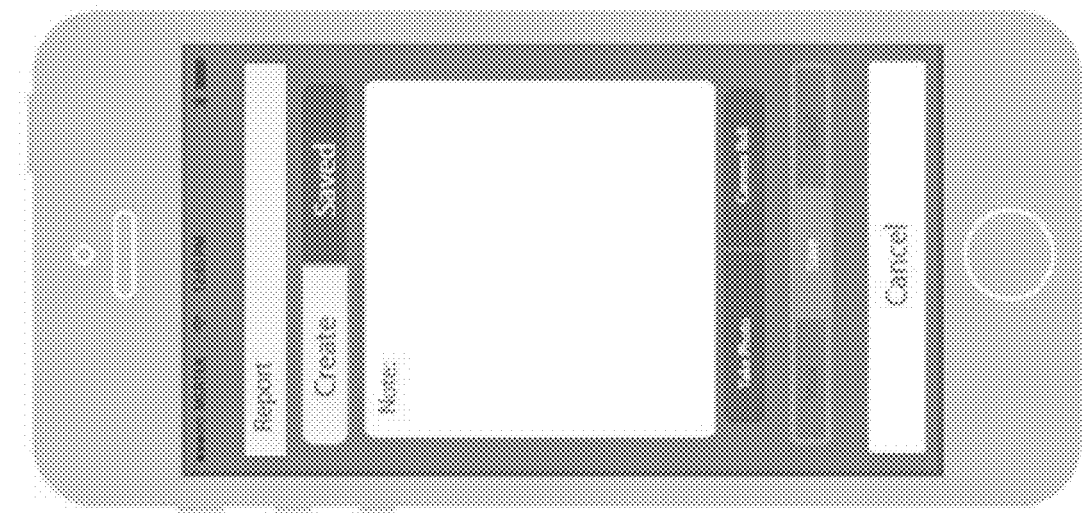
FIG. 15F illustrates a diagram of another user interface of an application for controlling RFID tags associated with network components.

Referring to FIG. 15F, FIG. 15F illustrates an example of Report screen. In FIG. 15G, the Report screen corresponds to a create report screen configured to enable creation of reports including one or more notes, such as a list of completed tasks or log of activity of a session of the application. In some implementations, the create report screen enables sending of the created reports, such as to a server or database. The report and notes thereof can be controlled by one or more buttons or pop-up windows of the Report screen. As illustrated in FIG. 15F, the Report screen includes view, save, and send buttons. Additionally, the Report screen can include buttons to import data, such as pictures, from one or more sources, such as from a camera or from saved photos. In some implementations, the application can generate reports (or a portion thereof) automatically. For example, the application may log communications and/or actions during a session for inclusion into a report Referring to FIG. 15G, FIG. 15G illustrates another example of a Report screen. In FIG. 15G, the Report screen corresponds to a save report screen configured to enable display of saved of reports generated by the application based on information received from the RFID tags, information sent to the RFID tags, or a combination thereof. The Report screen of FIG. 15G displays a list of saved reports and buttons for interacting with the saved reports. As illustrated in FIG. 15G, the Report screen includes view, save, and delete buttons for managing reports. Selection of a particular report may cause the application to display the create report screen of FIG. 15F to enable editing of the saved report.

During operation of the mobile device, the application may be downloaded from an application server and installed on the mobile device. The mobile device runs the application and displays one or more user interfaces as described with reference to FIGS. 15A-15G. The mobile device generates an electrical and/or magnetic field to power one or more RFID tags and to communicate with the one or more RFID tags. The mobile device sends and receives data to the one or more RFID tags to enable identification of the one or more RFID tags, obtaining information from the one or more RFID tags about the RFID tags and network components, writing information about the RFID tags and/or network components to the one or more RFID tags, or a combination thereof.

In some implementations, the application generates one or more reports responsive to communications sent and received by the mobile device, user inputs, or a combination thereof. The application can send the one or more reports to a central server or database for storing information about the RFID tags, the network components, or both. The information about the network components may include an operating status of the connector, a power connection status of the connector, a security setting of the connector, an Internet protocol (IP) address of a device coupled to the connector, a media access control (MAC) address of a device coupled to the connector, or a combination thereof, as illustrate examples.

Accordingly, the application and user interfaces described in FIGS. 15A-15G enable a mobile device (e.g., a smartphone) to interact with RFID tags attached to device to enable identification of the RFID tags and the network components to which they are associated with. The application and user interfaces can enable a mobile device to identify individual RFID tags from plurality of RFID tags with minimal output devices associated with the RFID tags. To illustrate, because the application can set different blinking patterns, colors, or tones, the application enables the mobile device to identify tags using basic output devices and obtain information from the RFID tags for display on the mobile device, as opposed to including expensive, complicated and large output devices (e.g., LCD displays) which directly output information. Thus, the application enables low cost and reduced size printed circuits to be coupled to network components to facilitate network management.

Figure 16A:
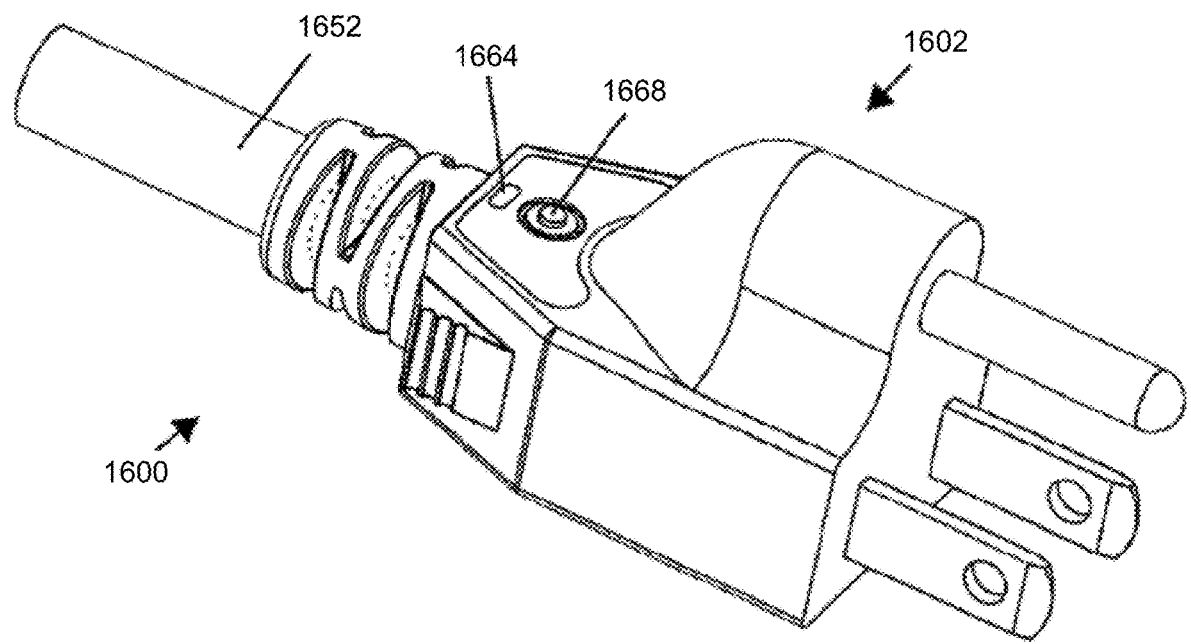
FIGS. 16A-16C are various views of one embodiment of a male connector for embodiments of the present power cables.
Figure 16B:
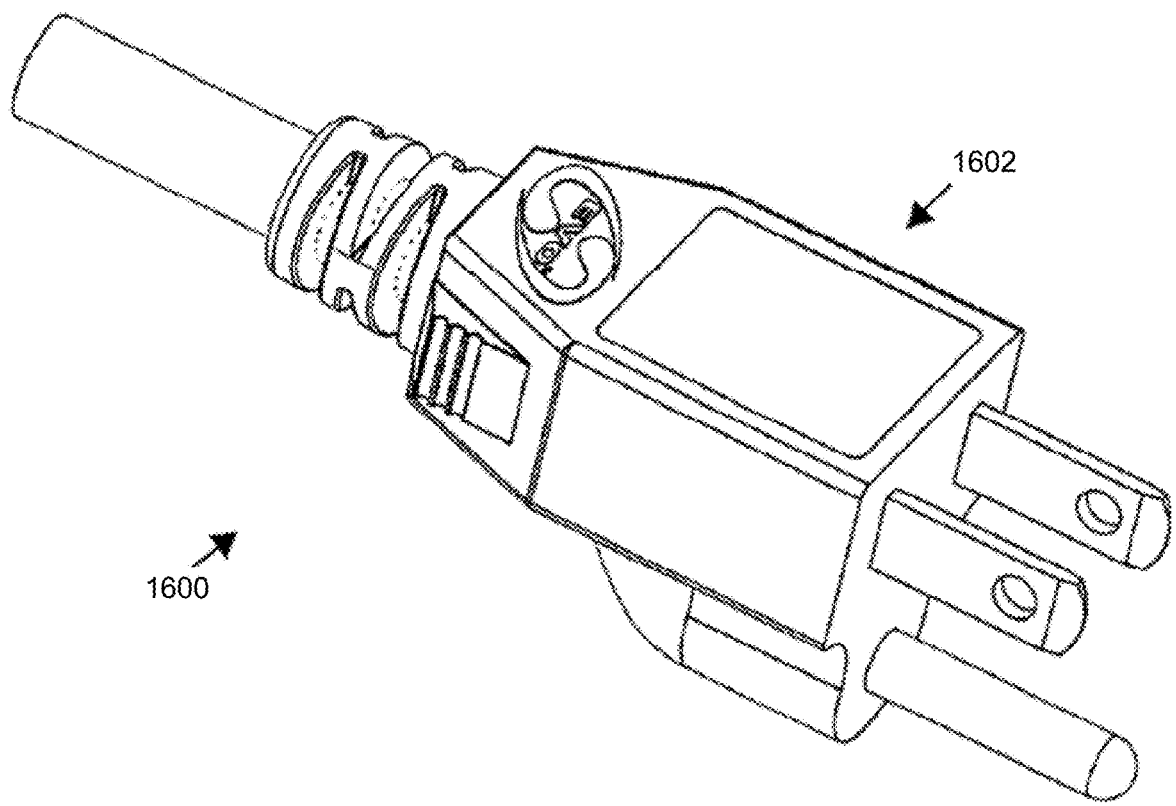
Figure 16C:
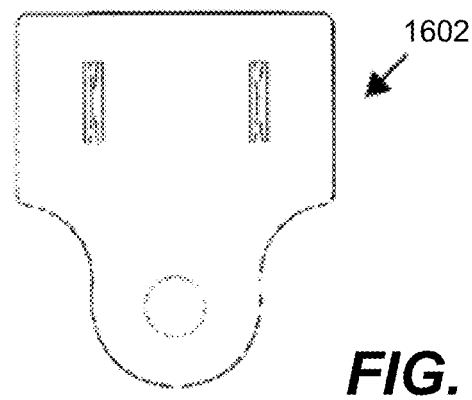
Figure 17A:
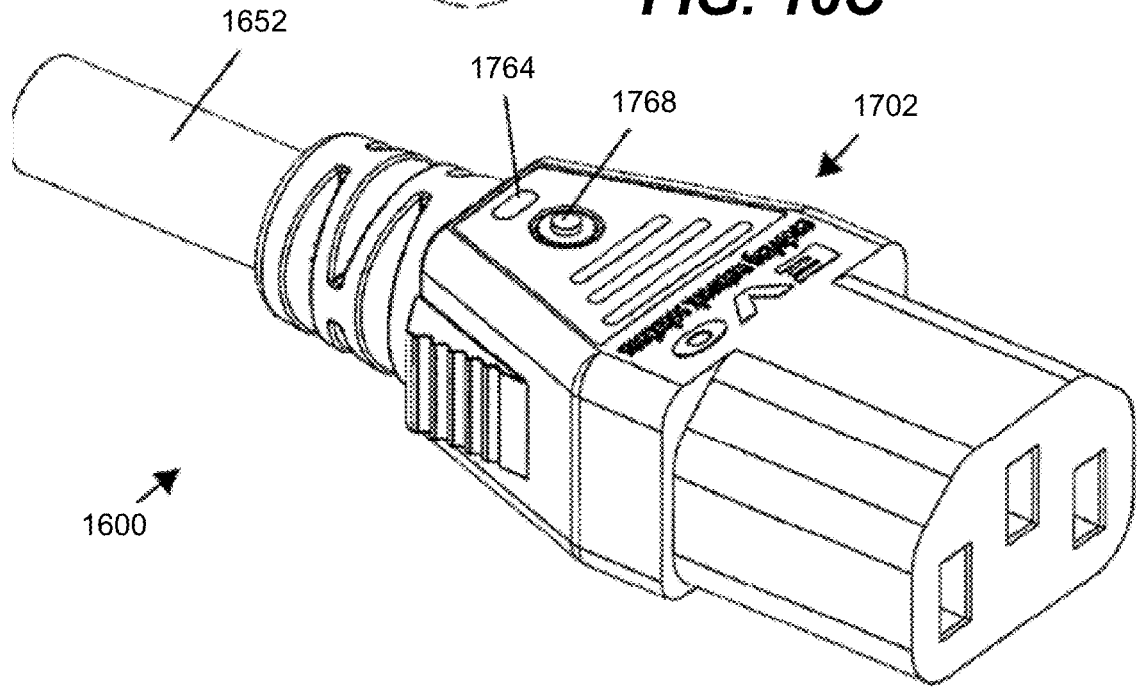
FIGS. 17A and 17B are perspective and end views, respectively, of one embodiment of a female connector for embodiments of the present power cables.
Figure 17B:
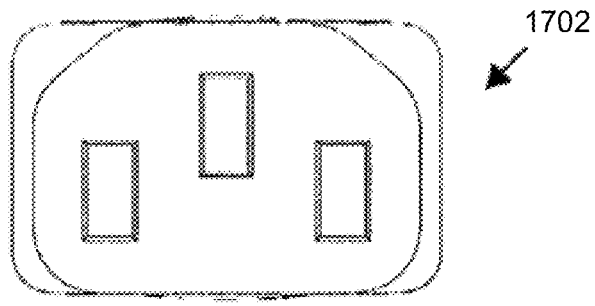

Referring now to FIGS. 16A-17B, an embodiment of a power cable is illustrated. FIGS. 16A-16C depict various views of one embodiment of a cable 1600 including a male connector hood 1602; FIGS. 17A-17B depict perspective and end views, respectively, of one embodiment of a cable 1600 including a female connector hood 1702. In the embodiments shown, cable 1600 is a power delivery cable or electrical cable and configured to carry alternating current (AC) power (e.g., at 110V) from an external power source (e.g., a wall plug or outlet) to a powered device (e.g., a computer, a server, etc.). Referring to FIGS. 16A-16C, the cable 1600 includes a male connector hood 1602 at a first end that is configured to be connected to a standard grounded wall outlet (i.e., a three prong plug that includes two blades and a ground pin). Other embodiments may exclude the ground pin (e.g., have only two blades) such that the cable 1600 will not provide a grounded connection to the wall outlet.

Referring to FIGS. 17A and 17B, cable 1600 includes an example of a female connector hood 1702 at a second end. Female connector hood 1702 is configured (e.g., is configured to receive three blades, with the center blade vertically offset form the two outer blades as shown in FIG. 17B) to be connected to any of various devices (e.g., computer, server, printer, etc.). In the embodiment shown, cable 1600 includes a power cable 1652 with two or more conductors (e.g., three conductors, with one for ground) in a flexible outer sheath.

In some implementations, the male connector hood 1602, the female connector hood 1702, or both, include a printed circuit (e.g., 230, 330, 430, 500, 1030, 1130, 1230, 1330, or 1400). The printed circuit may have a similar layout, circuitry, and/or functionality as printed circuit 500 shown and described with reference to FIG. 5 or a printed circuit 1400 as shown and described with reference to FIG. 14. For example, the printed circuit can be configured to receive energy (e.g., 182) from and communicate data (e.g., 184) with a mobile device (e.g., 102). The printed circuit may include a flex circuit and/or a circuit included in a printed circuit board. In a particular implementation, printed circuit 230 includes a flexible circuit or flex circuit that is affixed to and/or molded into a hood, such as 1602 or 1702. In power cable implementations, the printed circuit may receive power from the power cable and may be configured to communicate with a mobile device wirelessly using power from the power. Thus, the printed circuit may not need circuit components (e.g., an inductor or inductors) to receive power wirelessly from the mobile device. In other implementations, the printed circuit is affixed to another portion of cable 1600, such as the power cable 1652.

In the embodiments shown, male connector hood 1602 includes an electrically activated telltale 1664 and a button 1768, both of which can function as further herein. While not shown in FIGS. 16A-17B, the internal components (e.g., electric power source, manually operated switch, controller, printed circuit, etc.) and functionality of cable 1600 are similar to the internal components and functionality of the networking cables described above, with the primary exception that POE is not implemented over cable 1600 and, thus, the POE-specific functionality described above need not be included in embodiments of the present power cables. For example, power cable 1652 can include one or more tracer or indicator conductors (e.g., a pair of indicator wires) running the length the cable (e.g., in addition to the power conductors in the cable). As another example, embodiments of power cable 1600 can include a charging circuit (e.g., as described above) coupled to two or more of the power conductors in the power cable such that if the power cable is coupled to an external electric power source (e.g., a wall plug, generator, etc.), the charging circuit can communicate electric current from the external electric power source to the power source (e.g., a controller in the power cable can be configured to direct electrical current from the external power source (e.g., via an AC-DC converter in or in communication with the circuit that provides the tracing function) to the battery if the voltage of the battery falls below a threshold voltage). Similar to boot 1314, connector hoods 1602 and 1702 may be overmolded onto cable 1652 in one or more pieces (e.g., a single piece or a boot and a connector).

Figure 18A:
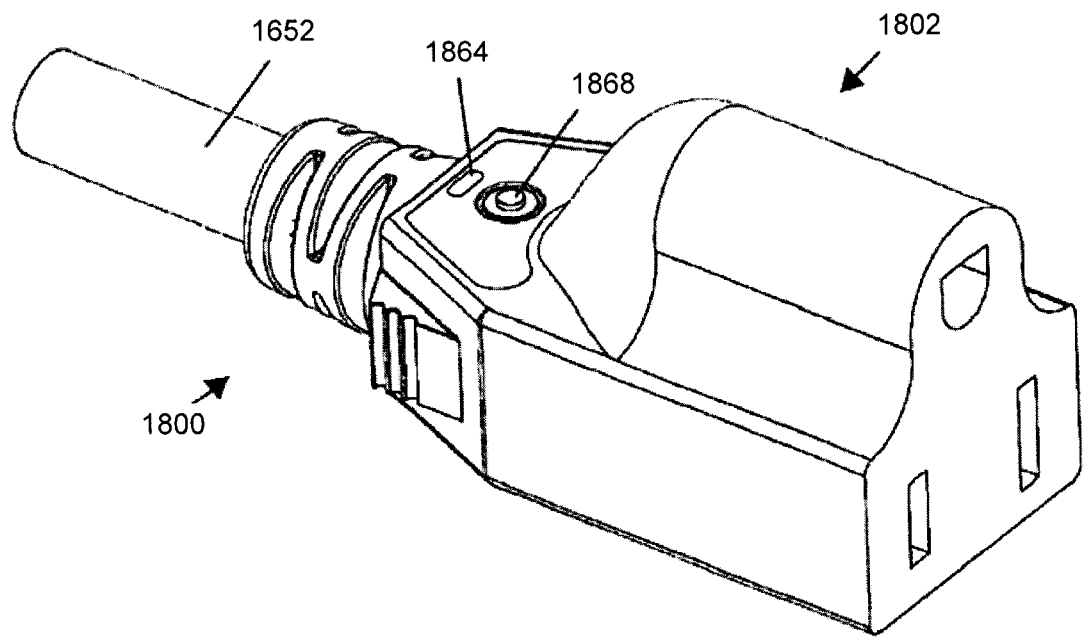
FIGS. 18A and 18B are perspective and end views, respectively, of another embodiment of a female connector for embodiments of the present power cables.
Figure 18B:
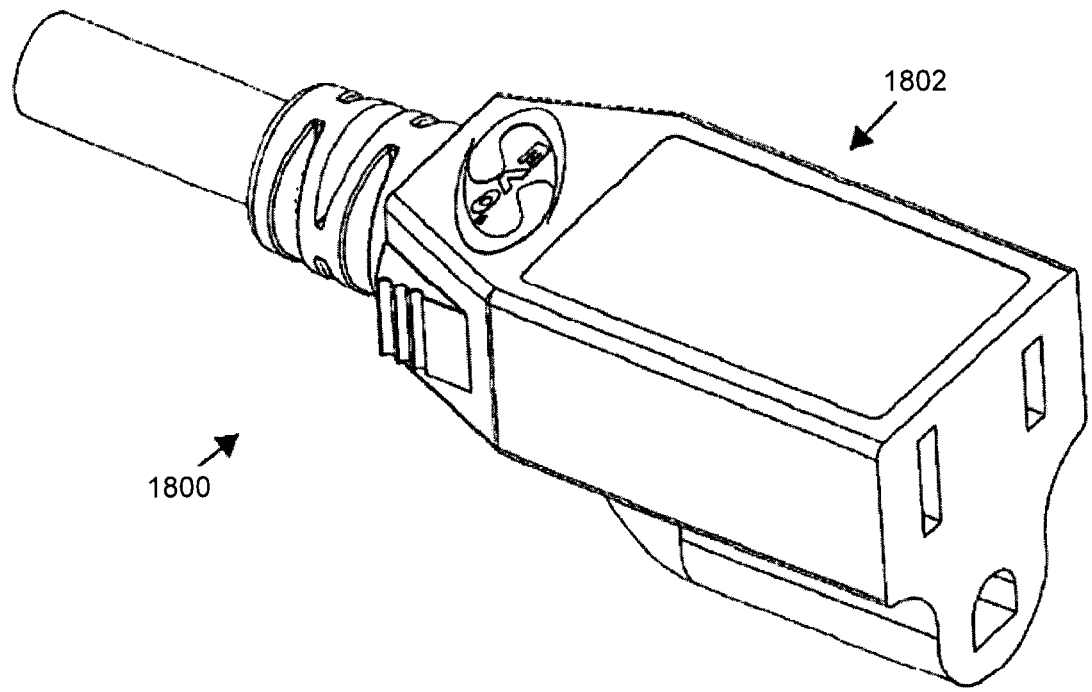

FIGS. 18A-18B depict perspective and end views, respectively, of another embodiment of a female connector hood 1802 for embodiments of the present power cables. In the depicted alternate embodiment, cable 1800 includes a power cable 1652 and a female connector hood 1802. The female connector hood 1802 can be coupled to one or more ends of the power cable 1652. For example, the female connector hood 1802 may be coupled to a first end of power cable 1652, a second end of power cable 1652 (e.g., in place of female connector hood 1702), or both. As shown, female connector hood 1802 is configured to receive a standard male connector, such as a connector of male connector hood 1602. In the embodiment shown, female connector hood 1802 is similar to female connector hood 1702, with the primary exception being the physical configuration (i.e., a prong instead of a blade). For example, female connector hood 1802 includes similar components to female connector hood 1702. To illustrate, female connector hood 1802 includes the printed circuit (e.g., 500, 1440), an electronically activated telltale 1864 and a button 1868, any of the components and/or functions described above, or a combination thereof.

A telltale 1864 may be configured to produce a visual and/or an audio signal. As used herein, an electrically activated telltale is any electrically triggered device that emits a visual or audio signal that can be detected by a human. One example of a suitable telltale is a light emitting diode (LED), but may alternatively or additionally include one or more other visual indicators (e.g., an incandescent or conventional light bulb, a liquid crystal visual indicator, etc.). In the embodiment shown, the cable also includes a button 1868 that is configured to be manually pressed to engage a manual switch (e.g., 224, 324, 424) incorporated into at least one of the connector hoods and configured to activate the telltale by initiating electrical communication between the electric power source and the telltale (e.g., via one or more of the conductors, such as, for example, a conductor wire, a conductor wire pair, an indicator wire, and/or indicator wire pair). For example, the switch can complete an indicator circuit that includes an LED to cause the LED to flash repeatedly for a predetermined time. In some embodiments, the indicator circuit includes the indicator wire or wire pair that runs the complete length of the cable.

In some embodiments, the present cables (e.g., networking, power, fiber optic, etc.) include a first hood of on a first or "left" end of the cable, and a second hood (same or different from the first hood) on the second or "right" end of the cable (e.g., such that the two hoods are in electrical communication connection via a conductor wire, a conductor wire pair, an indicator wire, and/or indicator wire pair). For example, in an embodiment with a connector hood at each end of the cable, where each connector hood includes a switch and a telltale, the operation of either switch can activate both telltales if the telltales are not activated, or the operation of either switch can deactivate both telltales if the telltales are activated, as described in more detail below.

Telltale 1864 and button 1868 are shown in one suitable configuration relative to a hood; in other embodiments, telltale 1864 and/or button 1868 can be incorporated into a hood (e.g., 1802) at any suitable position in the hood. In other embodiments, the present cables can include connector hoods spaced apart from the terminal or end connectors of the cable. For example, some embodiments of the present cables can include a connector hood spaced inward relative to an end of the cable (e.g., by 1, 2, 3, 4, 5, or more inches), and the inwardly-spaced connector hood can include one or more of the tracing features or elements (e.g., a button, telltale, etc.) described in this disclosure.

In the embodiment shown, button 1868 is coupled (e.g., connected physically) to a switch that, when manually engaged, completes an electrical circuit that powers telltale 1864. As explained above, the cable (e.g., a hood thereof) may comprise a printed circuit (e.g., 230, 330, 430, 500, 1030, 1130, 1230, 1330, or 1400) to which the switch is coupled, and the printed circuit is configured to have at least some of the functionality described in this disclosure, such as wireless power reception and wireless communication. In a particular implementation, the telltale 1864 lights up to provide an indication responsive to wireless communication with a mobile device to provide information about the cable or a system to a user.

Embodiments with two connector hoods may include a controller and/or battery in each of the two connector hoods (e.g., with one controller a "master" and one controller a "slave"), or can include a single controller and/or a single battery. For example, in some embodiments, the cable includes a single controller and a single battery in one of the two connection hoods, but includes a switch and telltale in each of the two connection hoods, such that depressing a switch at either end of the cable activates the telltales at both ends of the cable. In such embodiments, a similar printed circuit may be used in the hood without a controller or power source to provide the circuit between the switch and telltale. Additionally, U.S. Pat. No. 9,952,258 is incorporated by reference to the extent it provides details on various versions of power delivery cables or electrical cables referred to as power cables.

Referring now to FIGS. 19-23, examples of fiber optic cable including wireless power delivery and/or wireless communication are illustrated. Fiber optic cables generally comprise one or more optical fibers configured to transmit data as an optical signal (e.g., light), and optionally one or more conductors (e.g., conductive wires) to communicate electrical current along the length of the optical fiber(s) to enable the tracing functionality. Examples of connectors for optical-fiber cables include single-fiber (e.g., LC) connectors, multi-fiber (e.g., MPO and/or MTP) connectors, and/or any other optical-fiber connectors (e.g., SC, ST, and the like).

Figure 19:
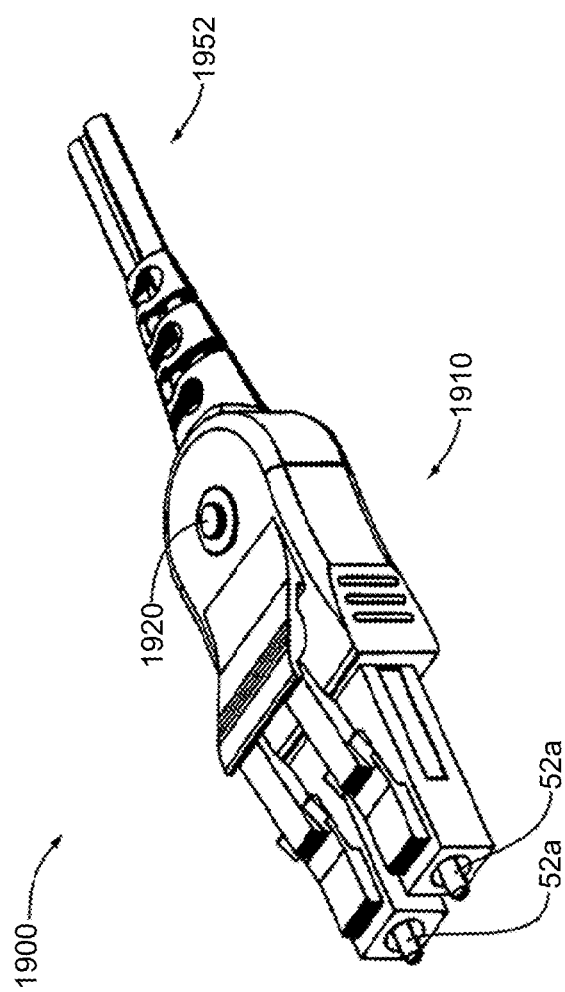
FIG. 19 is a perspective view of a fiber optic cable connector hood.
Figure 20:
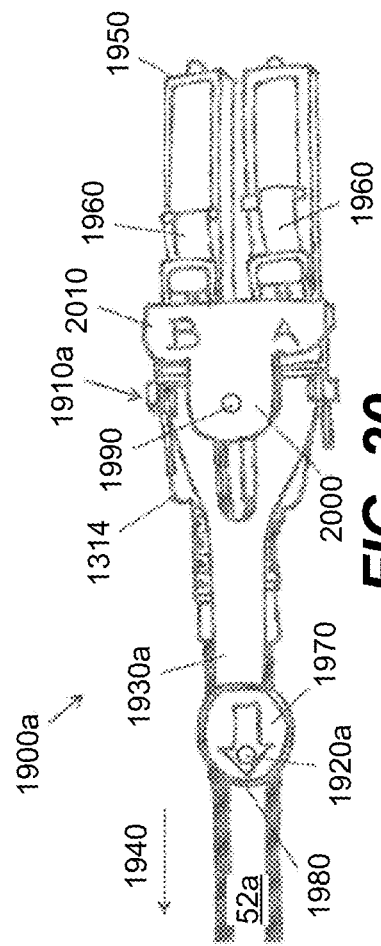
FIG. 20 is a plan view of a first embodiment of a dual-fiber optic cable connector hood with a remote release tab.

The electronics and functionality of the tracer testing may be very similar, if not identical, to that described above for the conductive-wire networking cables. For example, FIG. 19 illustrates one end of a traceable fiber optic cable system. An example of a cable 1900 that includes a dual-fiber optic connector 1910 is shown. The dual-fiber optic connector 1910 may include a button 1920 that also serves as electrically activated telltale (i.e., a lighted button, in this embodiment). In other implementations, button 1920 and/or the electrically activated telltale is not included. Dual-fiber optic connector 1910 includes two transmission lines 52a. In other implementations, cable 1900 include a connector with fewer transmission lines or more transmission lines. Cable 1900 further includes a fiber optical cable 1952 enclosed in a sheath. Additionally, because cable 1900 is a fiber optic cable, a separator need not be included.

The enclosure, dual-fiber optic connector 1910, contains one or more other elements (electric power source, PCB board, etc.) described above with reference to other network cables and power cables and such elements may operate in the same way as in the non-fiber optic embodiments described above. To illustrate, the dual-fiber optic connector 1910 may include a printed circuit (e.g., 230, 330, 430, 500, 1030, 1130, 1230, 1330, or 1400). The printed circuit may have a similar layout, circuitry, and/or functionality as printed circuit 500 shown and described with reference to FIG. 5 or a printed circuit 1400 as shown and described with reference to FIG. 14. For example, the printed circuit can be configured to receive energy (e.g., 182) from and communicate data (e.g., 184) with a mobile device (e.g., 102). The printed circuit may include a flex circuit and/or a circuit included in a printed circuit board. In a particular implementation, printed circuit 230 includes a flexible circuit or flex circuit that is affixed to and/or molded into a hood, such as 1902. In other implementations, the printed circuit is affixed to another portion of cable 1900, such as an optical cable portion or sheath of cable 1900 (e.g., 1952).

FIGS. 20-23 depict various embodiments of cables 1900a, 1900b, and 1900c with fiber optic cable connector hoods 1910a, 1910b, and 1910c respectively. Each of connector hoods 1910a, 1910b, and 1910c are similar in some respects to the remote-release connectors disclosed in U.S. Pat. No. 8,465,317 (the '317 patent, which is incorporated by reference to the extent it provides details of various versions of remote-release connectors) in that each includes an extender or remote release tab (1930a, 1930b, 1930c), which improves the ease of releasing the respective connector in high-density environments. To illustrate, the extender or remote release tab can simply be pulled by a user in a direction 1940 away from a distal end 1950 of the connector to laterally compress the lever(s) (1960) of the connector toward the transmission line(s) 52a (e.g., optical fiber(s), in the embodiment shown).

Each of connector hoods 1910a, 1910b, and 1910c can be configured in any of various ways. For example, connector hood 1910a of FIG. 20 includes a manually operated switch or button 1920a incorporated into (e.g., disposed in and/or on) a lateral surface 1970 (e.g., outwardly facing, relative to the optical fibers) of a proximal end 1980 of extender 1930a, and an electrically activated telltale 1990 (i.e., LED, in this embodiment) incorporated into a lateral surface 2000 of connector body 2010. In this embodiment, the other components of the circuit, such as the power source (e.g., battery 2390), integrated circuit or chip 2330 (e.g., a printed circuit, such as 230, 330, 430, 500, 1030, 1130, 1230, 1330, or 1400), and the various conductive paths between the components can be included in extender 1930a and/or connector body 2010 (including boot 1314). For example, in some embodiments, the various components can be connected by a flexible circuit coupled to and extending along at least a portion of extender 1930a, and which can be soldered or otherwise coupled to the tracing conductor(s) running along the length of the transmission line(s) (e.g., conductive pairs or fiber optic cables) to communicate with the second connector hood at the opposite end of the cable. While not shown, the embodiment depicted in FIG. 20 includes a second connector hood 1910a at an opposite end of the cable and connected via the tracing conductor(s) (not independently shown, but running the length of fiber optic cable 1952).

FIG. 21 depicts a first end of a second embodiment of the present fiber optic cables. Cable 1900b is similar to cable 1900a with the primary exception that, in cable 1900b, electrically activated telltale 1990 (i.e., LED, in this embodiment) is incorporated into a proximal surface 2020 (facing away from distal end 1950) of proximal end 1980 of extender 1930b.

FIG. 22 depicts a first end of a third embodiment of the present fiber optic cables. Cable 1900c is similar to cables 1900a and 1900b with the primary exception that, in cable 1900c, electrically activated telltale 1990 (i.e., LED, in this embodiment) is incorporated into lateral surface 1970 of proximal end 1980 of extender 1930c.

Figure 23:
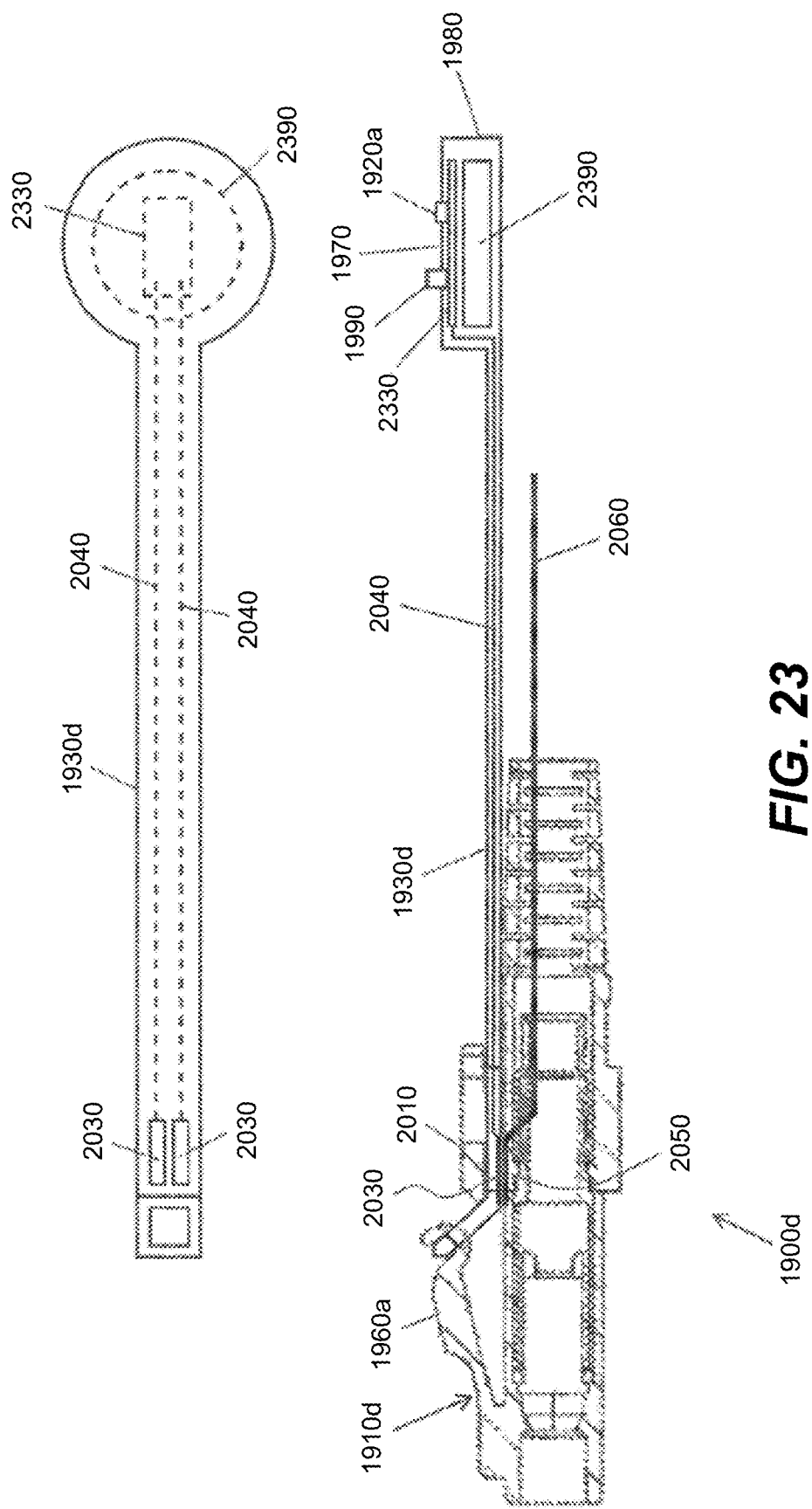
FIG. 23 includes a cutaway side view of a fourth embodiment of a single-fiber optic cable connector hood with a remote release tab, and an inset bottom view of an extender of the connector hood.

FIG. 23 depicts a cutaway side view of a first end of a fourth embodiment of the present fiber optic cables. Cable 1900d is similar to cable 1900c with the primary exception that cable 1900d includes only a single fiber optic cable (which is omitted for clarity). As described in U.S. Pat. No. 8,465,317 (the '317 patent), connector hood 1910d includes extender 1930d that is configured to be removably coupled to connector body 2010 such that extender 1930d can slide relative to connector body 2010 to depress or compress lever

1960*a*. In this embodiment, manually operated switch or button 1920*a* and electrically activated telltale 1990 are incorporated into (e.g., disposed in and/or on) a lateral surface 1970 (e.g., outwardly facing, relative to the optical fibers) of proximal end 1980 of extender 1930*d*, and the other components of the circuit, such as the power source (e.g., battery 2390), integrated circuit or chip (e.g., printed circuit 230) are also incorporated into extender 1930*a*. In this and other embodiments, the tracing circuit also includes at least one (e.g., two, in the embodiment shown) first conductive contact 2030 disposed on and/or otherwise exposed to an exterior of extender 1930*d* and coupled to the tracing circuit via one or more (e.g., two, in the embodiment shown) conductors 2040 (which may be unitary with contact(s) 2030). In this and other embodiments, cable 1900*d* further includes at least one (e.g., two, in the embodiment shown) second conductive contacts 2050 incorporated into (e.g., disposed on and/or in connector body 2100 or boot 1314 and in electrical communication (e.g., unitary) with the at least one (e.g., two, in the embodiment shown) tracing conductor 2060 running along the length of the transmission line(s). In this embodiment, the at least one first conductive contact (2030) is configured to contact the at least one second conductive contact (2050) to provide an electrical connection between the tracing circuit and the at least one conductor (2060) that can be maintained during movement of extender 1930*d* relative to connector body 2010. In this embodiment, conductors 2040 and/or printed circuit (e.g., 230) can be included in a flexible circuit or flex circuit (e.g., 2330) that is affixed to and/or molded into extender 1930*d*. Additionally, U.S. Pat. No. 10,215,935 is incorporated by reference to the extent it provides details on various versions of fiber optic cables.

Figures 24A, 24B:
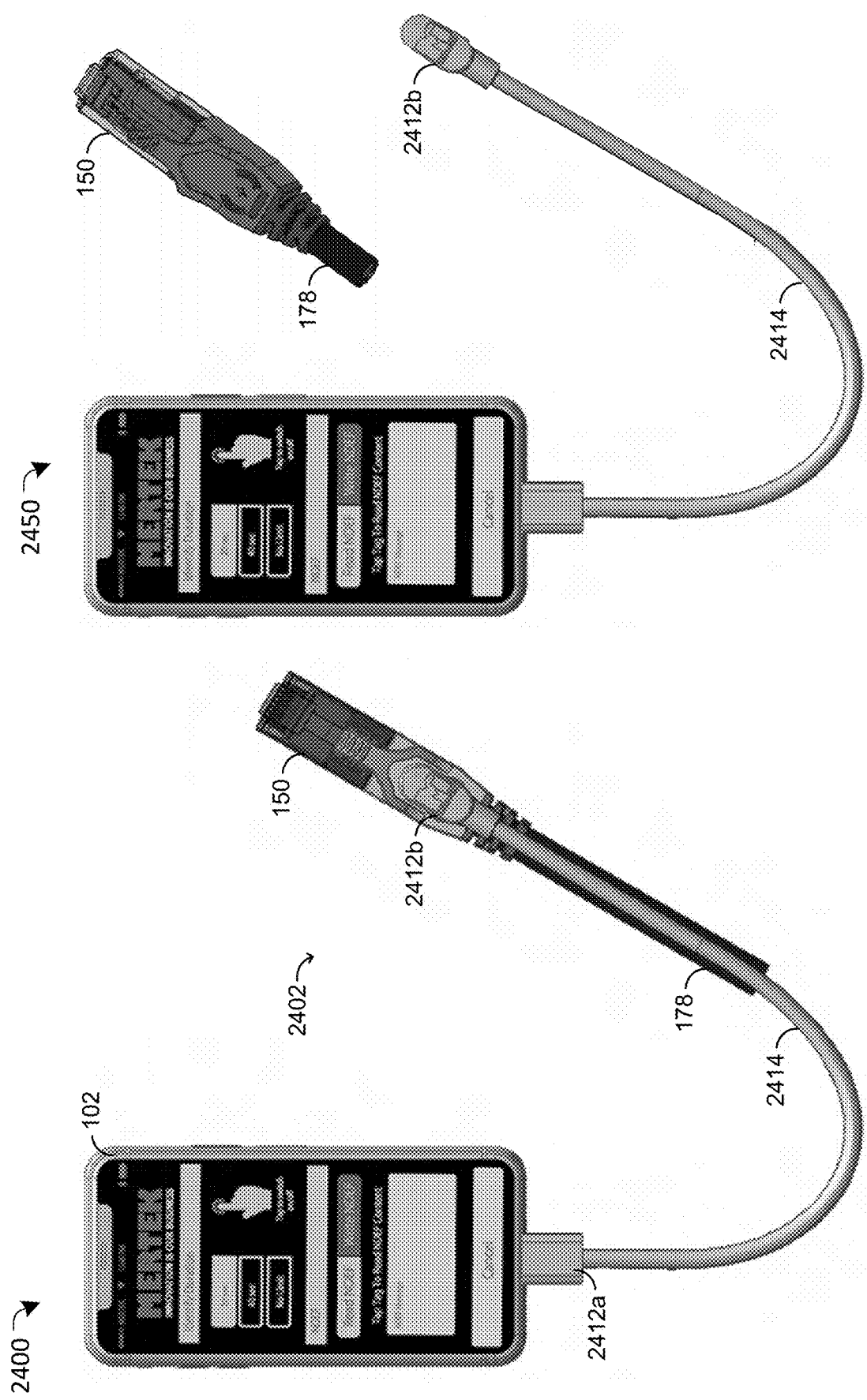
FIGS. 24A and 24B are perspective views of a peripheral device of a mobile device which can interact with and control RFID tags.

FIGS. 24A and 24B depict views 2400, 2450 of a peripheral device 2402 of a mobile device, such as mobile device 102 or mobile device 502. FIG. 24A depicts the peripheral device 2402 coupled to a connector 150, and FIG. 24B depicts the peripheral device 2402 decoupled from the connector 150. Peripheral device 2402 may include or correspond to an attachment, adapter, or a dongle for mobile device 102. In a particular implementation, peripheral device 2402 includes or corresponds to a wireless signal (RFID or NFC) extender. Peripheral device 2402 includes one or more connectors 2412, a sheath 2414, and wires (within sheath 2414 and not shown). The connectors 2412 may include USB connectors, such as USB type C connectors, mini USB connectors, or micro USB connectors, lightning connectors, thunderbolt connectors, tracer connectors, an RFID transmitter, an NFC transmitter, or other proprietary and nonproprietary connectors.

As illustrated in FIGS. 24A and 24B, peripheral device 2402 includes a first connector 2412*a* configured to couple to mobile device 102 and a second connector 2412*b* configured to couple (e.g., wirelessly couple) to a connector 150 of a cable (e.g., network cable 178). In such implementations, peripheral device 2402 is configured to transmit data and/or power to and/or from connector 150. To illustrate, an application on mobile device 102 may cause mobile device 102 to send data and/or power to connector 150, such a printed circuit thereof, via the peripheral device 2402. Additionally, or alternatively, the printed circuit may send data to the mobile device 102 via the peripheral device 2402. Accordingly, the connector 150 and cable 178 may be identified by the mobile device 102 as described herein. Thus, the peripheral device 2402 may enable a larger mobile device 102 to accurately communicate with a particular connector 150 (e.g., a printed circuit thereof) that is in a small space (e.g., not accessible by the mobile device 102) and/or that is in close proximity to other connectors 150, such as when the connectors 150 are coupled to a network device, by coupling the mobile device to the particular connector 150 (e.g., an extender or a telltale thereof) via the peripheral device 2402.

As illustrated in FIG. 24A, the second connector 2412*b* includes or corresponds to a wireless transmitter and/or receiver at a distal end opposite the first connector 2412*a*. For example, the mobile device 102 may use the peripheral device 2402 device to wirelessly receive and transmit data and/or power to the connector 150 (e.g., a printed circuit thereof, such as printed circuit 500). Thus, the peripheral device 2402 may enable a larger mobile device 102 to accurately communicate with a particular connector 150 (e.g., a printed circuit thereof) wirelessly that is in a small space (e.g., not accessible by the mobile device 102) and/or that is in close proximity to other connectors 150, such as when the connectors 150 are coupled to a network device, by positioning the distal end of the peripheral device 2402 near the particular connector 150.

In other implementations, the second connector 2412*b* includes or corresponds to a plug or jack. In such implementations, the second connector 2412*b* can be coupled to a plug or a jack of the second connector 2412*b* or to an auxiliary/secondary plug or jack of an extender or a telltale of the second connector 2412*b*.

Alternatively, when a cable (e.g., 178) includes a printed circuit that is affixed to the cable, as opposed to the printed circuit being integrated into a connector and as described with reference to FIG. 13, the peripheral device 2402 may be coupled physically or wirelessly with the affixed printed circuit. Although connector 150 is illustrated as a network cable connector and part of network cable 178, in other implementations, connector 150 may include a power cable connector or an optical cable connector for a power cable or an optical cable as described herein.

FIGS. 25A and 25B depict views 2500, 2550 of a remote device 2502. FIG. 25A depicts the remote device 2502 coupled to a connector 150, and FIG. 25B depicts the remote device 2502 decoupled from the connector 150. Remote device 2502 may include or correspond to a dedicated mobile device (e.g., 102) for interacting with connectors of a network. Remote device 2502 includes housing 2510 which includes a battery 2512, circuitry (e.g., a processor 2514 and a memory 2516), a display 2518, and an interface 2520. Remote device 2502 optionally includes one or more connectors 2412, a sheath 2414, and wires (within sheath 2414 and not shown) outside of or remote to the housing 2510. The connectors 2412 may include USB connectors, such as USB type C connectors, mini USB connectors, or micro USB connectors, lightning connectors, thunderbolt connectors, tracer connectors, an RFID transmitter, an NFC transmitter, or other proprietary and nonproprietary connectors.

As illustrated in FIGS. 25A and 25B, remote device 2502 includes a connector 2412*b* configured to couple (e.g., wirelessly couple) to a connector 150 of a cable (e.g., network cable 178). In such implementations, remote device 2502 is configured to transmit data and/or power to and/or from connector 150 via connector 2412*b*. For example, processor 2415, via interface 2520, may send data and/or power to connector 2412*b*, and connector 2412*b* sends data and/or power to connector 150, such a printed circuit thereof. Additionally, or alternatively, the printed circuit may send data to the remote device 2502 via connector 2412*b*. Accordingly, the connector 150 and cable 178 may be identified by the remote device 2502 as described herein. Thus, the remote device 2502 and/or connector 2412b may enable accurate communication with a particular connector 150 (e.g., a printed circuit thereof) that is in a small space (e.g., not accessible by a mobile device) and/or that is in close proximity to other connectors 150, such as when the connectors 150 are coupled to a network device, by coupling remote device 2502 to the particular connector 150 (e.g., an extender or a telltale thereof).

In FIG. 25A, the remote device 2502 is configured to couple to the connector 150 wirelessly via the connector 2412b, i.e., a wireless transmitter. Additionally, or alternatively, the remote device 2502 (e.g., interface 2520, such as wireless interface) is configured to wirelessly couple to connector 150 independent of a connector or peripheral device. In other implementations, connector 2412b may include or correspond to a physical connector that is configured to be coupled to (e.g., inserted in) the particular connector 150 (e.g., an extender or a telltale thereof).

Alternatively, when a cable (e.g., 178) includes a printed circuit that is affixed to the cable, as opposed to the printed circuit being integrated into a connector and as described with reference to FIG. 13, the remote device 2502 may be coupled physically or wirelessly with the affixed printed circuit. Although connector 150 is illustrated as a network cable connector and part of network cable 178, in other implementations, connector 150 may include a power cable connector or an optical cable connector for a power cable or an optical cable as described herein.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A network cable connector comprising:
   a hood defining an opening configured to receive a plug; and
   a printed circuit incorporated into the hood and configured to wirelessly communicate with an external device, the printed circuit including:
      a first controller configured to receive a data signal from the external device via an inductor, to process the data signal to generate data, to provide the data to a second controller, and to transmit second data to the external device; and
      the second controller configured to process the data and to provide the second data to the first controller.

2. The network cable connector of claim 1, the printed circuit including the inductor configured to receive the data signal and transmit a second data signal based on the second data.

3. The network cable connector of claim 2, wherein the inductor is further configured to receive power signals from the external device, the power signals configured to power at least a portion of the printed circuit.

4. The network cable connector of claim 1, wherein the printed circuit is configured to wirelessly transmit information to the external device, wherein the information indicates an operating status of the connector, a power connection status of the connector, a security setting of the connector, an Internet protocol (IP) address of a device coupled to the connector, a media access control (MAC) address of a device coupled to the connector, or a combination thereof.

5. The network cable connector of claim 1, further comprising a display incorporated into the hood, the display coupled to the printed circuit and configured to display information, wherein the information indicates an operating status of the connector, a power connection status of the connector, a security setting of the connector, an Internet protocol (IP) address of a device coupled to the connector, a media access control (MAC) address of a device coupled to the connector, or a combination thereof.

6. The network cable connector of claim 1, the printed circuit including an NFC tag.

7. The network cable connector of claim 1, wherein the printed circuit comprises a flex circuit or a printed circuit board, and wherein the network cable connector is integrated in a cable, and wherein the cable comprises a network cable, a power cable, a fiber optic cable, a video cable, an audio cable, or a video and audio cable.

8. The network cable connector of claim 1, wherein:
   the printed circuit is further configured to wirelessly couple to an external power source via the inductor, and one or more components of the printed circuit receive power from the external power source.

9. The network cable connector of claim 8, wherein the external power source comprises a mobile device, and further comprising a power management unit coupled to the inductor and configured to provide power to the printed circuit based on power induced in the inductor.

10. A method of making a network cable connector, the method comprising:
   providing a hood defining an opening configured to receive a plug; and
   incorporating a printed circuit into the hood, the printed circuit configured to wirelessly communicate with an external device, the printed circuit including:
      a first controller configured to receive a data signal from the external device via an inductor, to process the data signal to generate data, to provide the data to a second controller, and to transmit second data to the external device; and
      the second controller configured to process the data and to provide the second data to the first controller.

11. The method of claim 10, further comprising incorporating a display into the hood and coupling the display to the printed circuit, wherein the display is configured to display information relevant to the connector.

12. The method of claim 10, further comprising coupling a sheath and a boot to the hood, the sheath including one or more conductor wires.

13. A method of operating a network cable, the method comprising:
wirelessly receiving, at a printed circuit of the network cable, data from an external device wherein the printed circuit includes:
a first controller configured to receive a data signal from the external device via an inductor, to process the data signal to generate data, to provide the data to a second controller, and to transmit second data to the external device; and
the second controller configured to process the data and to provide the second data to the first controller; and
providing, via a display coupled to the printed circuit, a visual indication responsive to the data.

14. The method of claim 13, wherein the display comprises a light emitting diode (LED), and wherein the visual indication includes blinking, color changes, or a combination thereof.

15. The method of claim 13, wherein the display comprises light emitting diode (LED) display or a liquid crystal display (LCD), and wherein the LED display or the LCD is configured to display information relevant to the network cable, which comprises at least one of: an operating status of the network cable, a power connection status of the network cable, a security setting of the network cable, an Internet protocol (IP) address of a device coupled to the network cable, and a media access control (MAC) address of a device coupled to the network cable.

16. The method of claim 13, further comprising:
capturing, at the printed circuit, energy from an electric field used by the external device to transmit the data; and
charging a battery with the energy captured from the electric field.

17. The method of claim 13, further comprising:
wirelessly transmitting, from the printed circuit of the network cable, second data indicating information relevant to the network cable, wherein the information comprises at least one of: an operating status of the network cable, a power connection status of the network cable, a security setting of the network cable, an Internet protocol (IP) address of a device coupled to the network cable, and a media access control (MAC) address of a device coupled to the network cable.

18. The method of claim 13, further comprising:
wirelessly receiving, at the printed circuit of the network cable, power from the external device, wherein the visual indication is generated based on the power from the external device.

19. The method of claim 13, further comprising:
adjusting operation of the network cable based on the data received from the external device, wherein adjusting the operation of the network cable includes adjusting a security access control, enabling or disabling Internet of Things (IoT) device access, turning off or on service, enabling or disabling read and/or write access, enabling or disabling read and/or write controls, or a combination thereof.

* * * * *